United States Patent
Choi et al.

(10) Patent No.: US 11,179,852 B2
(45) Date of Patent: Nov. 23, 2021

(54) AUTOMATED MANIPULATION OF TRANSPARENT VESSELS

(71) Applicant: Dishcraft Robotics, Inc., San Carlos, CA (US)

(72) Inventors: Kerkil Choi, Los Gatos, CA (US); Yen-Khai Lee, Cupertino, CA (US); Paul Michael Birkmeyer, San Carlos, CA (US)

(73) Assignee: DISHCRAFT ROBOTICS, INC., San Carlos, CA (US)

( * ) Notice: Subject to any disclaimer, the term of this patent is extended or adjusted under 35 U.S.C. 154(b) by 294 days.

(21) Appl. No.: 16/363,795

(22) Filed: Mar. 25, 2019

(65) Prior Publication Data
US 2020/0306980 A1    Oct. 1, 2020

(51) Int. Cl.
| | | |
|---|---|---|
| B25J 9/16 | (2006.01) | |
| B25J 11/00 | (2006.01) | |
| G06T 7/70 | (2017.01) | |

(52) U.S. Cl.
CPC ............ B25J 9/1697 (2013.01); B25J 9/161 (2013.01); B25J 9/163 (2013.01); B25J 9/1669 (2013.01); B25J 11/0045 (2013.01); *G06T 7/70* (2017.01)

(58) Field of Classification Search
CPC ...... B25J 9/1697; B25J 11/0045; B25J 9/161; B25J 9/163; B25J 19/021; G06T 7/70; G06T 7/73; G06T 2207/20081; G06T 2207/20084; G05B 2219/39393; G05B 2219/40425; G05B 2219/40543; G06K 9/00664; G06K 9/00201
See application file for complete search history.

(56) References Cited

U.S. PATENT DOCUMENTS

| | | | |
|---|---|---|---|
| 5,150,307 A | 9/1992 | McCourt | |
| 5,898,169 A | 4/1999 | Nordbryhn | |
| 6,137,074 A | 10/2000 | Doak | |
| 9,981,382 B1* | 5/2018 | Strauss | ............... B25J 9/1666 |
| 10,089,575 B1* | 10/2018 | Redmon | ............... G06N 3/049 |
| 2011/0166694 A1 | 7/2011 | Griffits | |
| 2017/0136632 A1* | 5/2017 | Wagner | ............... B25J 9/1612 |
| 2018/0050453 A1 | 2/2018 | Peters et al. | |

(Continued)

OTHER PUBLICATIONS

Non-Final Office Action, U.S. Appl. No. 16/363,708; 81 pages (dated Sep. 11, 2020).

(Continued)

*Primary Examiner* — Khoi H Tran
*Assistant Examiner* — Tanner L Cullen
(74) *Attorney, Agent, or Firm* — Loza & Loza, LLP

(57) ABSTRACT

An actuator and end effector are controlled according to images from cameras having a surface in their field of view. Vessels (cups, bowls, etc.) and other objects are identified in the images and their configuration is assigned to a finite set of categories by a classifier that does not output a 3D bounding box or determine a 6D pose. For objects assigned to a first subset of categories, grasping parameters for controlling the actuator and end effector are determined using only 2D bounding boxes, such as oriented 2D bounding boxes. For objects not assigned to the first subset, a righting operation may be performed using only 2D bounding boxes. Objects that are still not in the first set may then be grasped by estimating a 3D bounding box and 6D pose.

40 Claims, 43 Drawing Sheets

(56) References Cited

U.S. PATENT DOCUMENTS

| | | | |
|---|---|---|---|
| 2019/0278983 A1 | 9/2019 | Iqbal et al. | |
| 2019/0337152 A1 | 11/2019 | Homberg et al. | |
| 2020/0151899 A1* | 5/2020 | Suzuki | G06K 9/6262 |
| 2020/0223069 A1 | 7/2020 | Tan et al. | |
| 2020/0262082 A1* | 8/2020 | Schoessler | B25J 9/1697 |
| 2021/0012524 A1* | 1/2021 | Tomochika | G06K 9/3208 |

OTHER PUBLICATIONS

Abdul Jabbar et al. "Training Deep Neural Networks For Detecting Drinking Glasses Using Synthetic Images." Neural Information Processing: 24th International Conference, ICONIP 2017, Guangzhou, China, Nov. 14-18, 2017, Proceedings, Part II (pp. 354-363).

Debidatta Dwibedi, et al. "Cut, Paste and Learn: Surprisingly Easy Synthesis for Instance Detection." ICCV Paper. Computer Vision Foundation.

Mario Fritz, et al. "An Additive Latent Feature Model for Transparent Object Recognition."

Jiaqi Guo. "Transparent Object Recognition Using Gradient Grids." Stanford University.

Cody J. Phillips et al. "Seeing Glassware: from Edge Detection to Pose Estimation and Shape Recovery." Robotics: Science and Systems, 2016. University of Pennsylvania. Philadelphia, Pennsylvania.

"Camera calibration With OpenCV." OpenCV.

"Hand-Eye Calibration." Ensenso.

"ROS + CamOdoCal Hand Eye Calibration." GitHub.com.

"LabelImg." GitHub.com.

"Tensorflow Object Detection API." GitHub.com.

"Tensorflow detection model zoo." GitHub.com.

http://cocodataset.org/#home.

Fu-Jen Chu et al. "Real-World Multi-Object, Multi-Grasp Detection." IEEE Robotics and Automation Letters. Jun. 2018.

Joseph Redmon et al. "Real-Time Grasp Detection Using Convolutional Neural Networks."

Saining Xie et al. "Holistically-Nested Edge Detection." Computer Vision Foundation.

Zhiding Yu et al. "CASENet: Deep Category-Aware Semantic Edge Detection." Computer Vision Foundation.

Yu Xiang et al. "PoseCNN: A Convolutional Neural Network for 6DObject Pose Estimation in Cluttered Scenes."

Shaoqing Ren et al. "Faster R-CNN: Towards Real-Time Object Detection with Region Proposal Networks." Microsoft Research.

Kaiming He et al. "Mask R-CNN." Facebook AI Research (FAIR).

Joseph Redmon et al. "YOLOv3: An Incremental Improvement." University of Washington.

Wei Liu et al. "SSD: Single Shot MultiBox Detector."

Tsung-Yi Lin et al. "Focal Loss for Dense Object Detection." Facebook AI Research (FAIR).

Andy Zeng et al. "Learning Synergies between Pushing and Grasping with Self-Supervised Deep Reinforcement Learning."

Kuan-Ting Yu et al. "More than a Million Ways to Be Pushed: A High-Fidelity Experimental Dataset of Planar Pushing." Cornell University. arXiv.org.

Maria Bauza et al. "A Probabilistic Data-Driven Model for Planar Pushing." Cornell University. arXiv.org.

Bugra Tekin et al. "Real-Time Seamless Single Shot 6D Object Pose Prediction." arXiv.

* cited by examiner

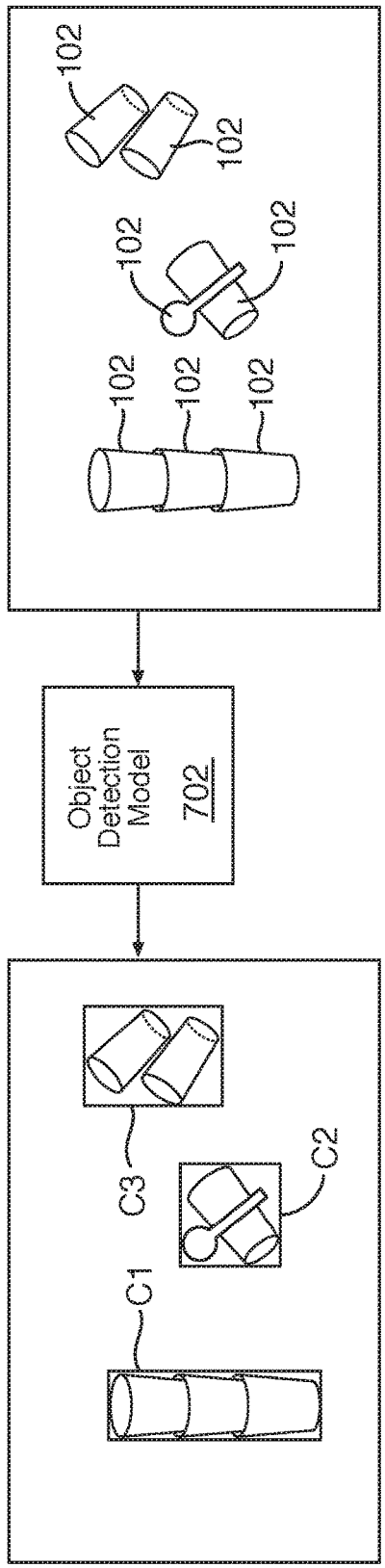
FIG. 7
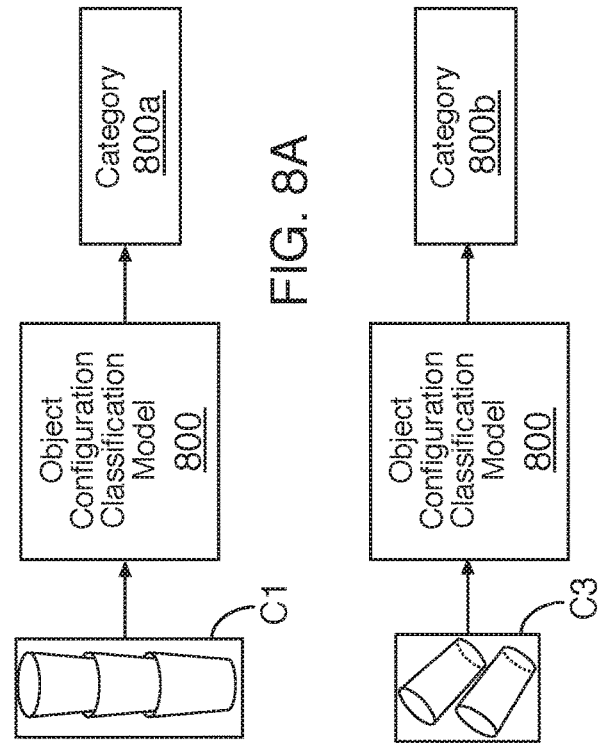
FIG. 8A
FIG. 8B

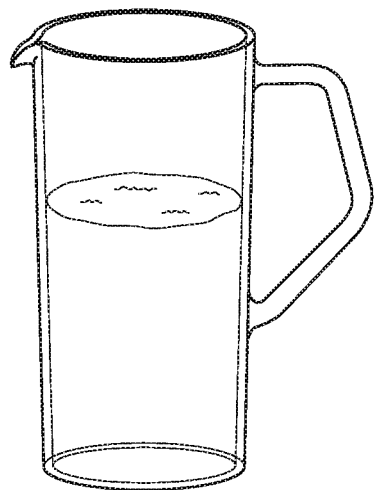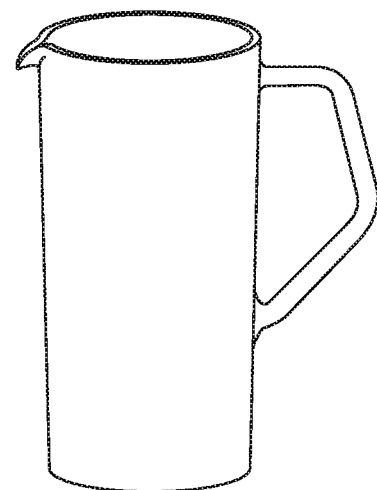
FIG. 17A FIG. 17B
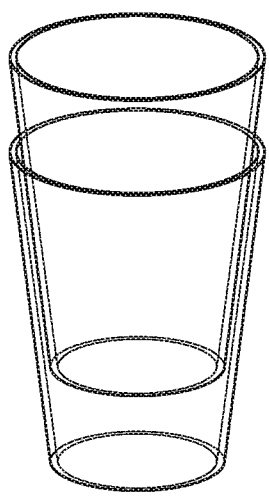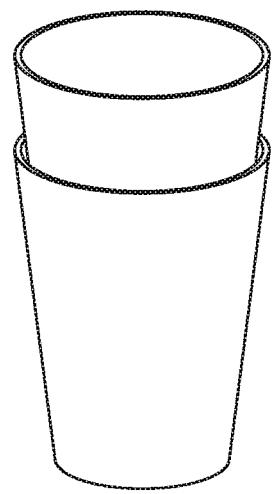
FIG. 18A FIG. 18B

AUTOMATED MANIPULATION OF TRANSPARENT VESSELS

BACKGROUND

Field of the Invention

This invention relates to machine vision and robotic actuators for handling objects, such as transparent vessels like cups, bowls, and the like.

Background of the Invention

Many restaurants serve patrons on reusable plates, bowls, silverware, and other serving dishes. Although this reduces the environmental impact of single-use plastic products, cleaning the dishes is a labor intensive process. Many serving dishes such as cups are transparent or translucent and difficult to detect and manipulate in an automated fashion.

What is needed is an improved approach for handling dishes for use in restaurants and other food-service applications.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 7 illustrates identification of clusters of objects in images in accordance with an embodiment of the present invention;

FIGS. 8A and 8B illustrate categorization of the configuration of clusters of objects in images in accordance with an embodiment of the present invention;

FIGS. 17A, 17B, 18A, and 18B illustrate generation of edge maps of vessels for use in accordance with an embodiment of the present invention;

DETAILED DESCRIPTION

Figure 1:
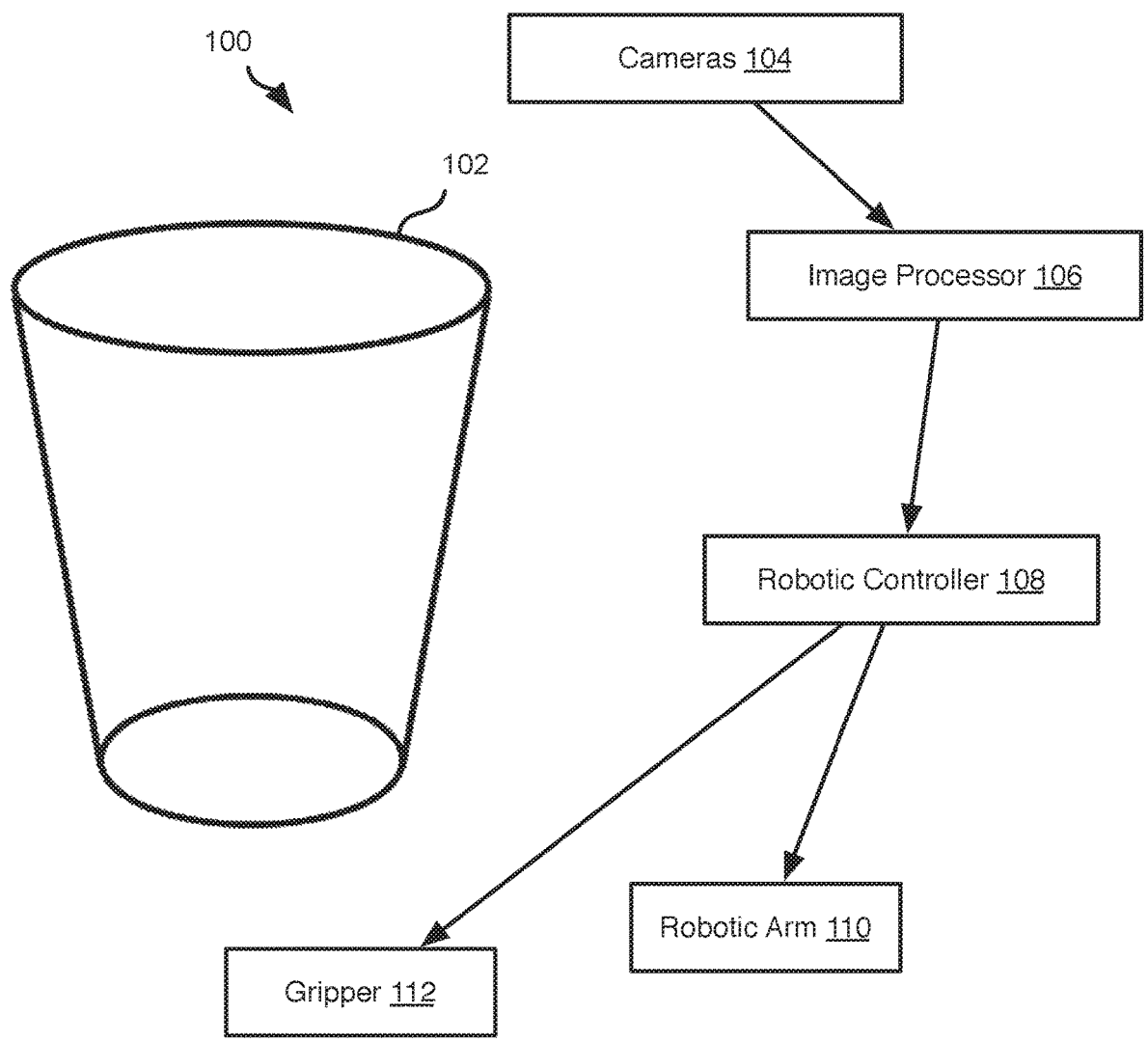
FIG. 1 is a schematic block diagram of a system for manipulating objects in accordance with an embodiment of the present invention.

Referring to FIG. 1, a system 100 may be used for robotic manipulation of objects, such as a vessel 102 embodied as a cup, bowl, or other vessel for containing food or other material. The system 100 may also be used to manipulate other objects such as utensils, serving pieces, or any other object.

For robotic manipulation, three-dimensional position information and additional three-dimensional orientation information are often necessary. These types of information are often estimated with so-called 3D point clouds in which each point in a 3D space represents the intensity or color at the point in space. Such 3D point clouds are then compared against a 3D template point cloud often generated by 3D scans or by simulation as in CAD. Such comparison yields what is called a 6D pose which has 3D translation and 3D orientation of the scene point cloud relative to the template point cloud (a.k.a., model point cloud) of which translation and orientation are known. This information allows for interring where the target object (e.g., a glass) is located in what orientation in space.

Generating a 3D point cloud for a scene typically requires depth sensors like stereo cameras or lidar, as used in autonomous car industry and research. However, these sensors do not work well with transparent objects and could produce highly incomplete and inaccurate information for producing 3D point clouds.

The systems methods disclosed herein are particularly suited for vessels 102 or other objects that may be difficult to detect using lidar sensors, cameras, or other conventional sensors. In particular, vessels that are very translucent or transparent may be difficult to detect using lidar sensors or cameras.

The systems and methods disclosed herein are disclosed in the context of processing vessels including transparent or translucent cups, bowls or other vessels but they may be applied in an identical manner to other transparent objects, such as transparent or translucent utensils or other items made of glass or transparent plastic. Although transparent and translucent items are particularly suited for the disclosed systems and methods, opaque or highly reflective vessels, utensils, or other objects may also readily be processed according to the disclosed systems and methods. Accordingly, any reference to transparent or translucent vessels, utensils, or other objects shall be understood as being exemplary rather than exclusive.

The system 100 includes one or more cameras 104. The cameras 104 may be two-dimensional (2D) cameras. Specifically, the system 100 may be simplified and made less expensive by using 2D cameras that are not part of a three-dimensional (3D) cameras system or stereoscopic vision system. The systems and methods disclosed herein advantageously enable one or more 2D cameras to perform 3D localization and orientation determination. The cameras 104 and other cameras mentioned herein may be understood to be color (e.g., Red Green Blue (RGB)) cameras.

Images from the one or more cameras 104 are provided to an image processor 106 performing the methods described disclosed hereinbelow. As will be described in greater detail, the image processor 106 provides a multi-step process by which 2D images are interpreted to determine the location and orientation of objects, such as transparent vessels. Some or all of these steps may be executed by one or more machine learning models such as some form of a convolution neural network (CNN) trained to perform one or more steps.

The location and orientation information regarding objects represented in the one or more images may be provided to a robotic controller 108 that invokes performance of actions by a robotic arm 110 and a gripper 112 at a distal end thereof. In particular, the arm 110 and gripper 112 may be motorized and the motors controlled by the robotic controller 108 in order to grasp, lift, transport, and release objects. The combined articulations of the robotic arm 110 and gripper 112 preferably enabled the gripper 112 to be oriented in at least a substantially vertical orientation (e.g. the plane of movement in which the fingers of the gripper move is oriented substantially vertically and the fingers are positioned below a point of attachment of the gripper 112 to the robotic arm) and a substantially horizontal orientation (the plane of movement of the fingers is substantially perpendicular to the action of gravity and parallel to a support surface).

As used herein, "substantially" with reference to an angle, a relative perpendicular orientation, or a relative parallel orientation shall be understood to mean within five degrees of that angle or of being relatively perpendicular or parallel unless otherwise noted.

The use of a robotic arm 110 and gripper 112 is exemplary only. For example, the robotic arm 110 may be embodied as three-dimensional gantry and the gripper 112 may be any end effector known in the art that is adapted to pick up objects being processed, such as a magnetic gripper, suction gripper, a single probe, or any other end effector for manipulating items as known in the art. Accordingly, references herein to the robotic arm 110 and gripper 112 shall be understood to be interchangeable with any other type of actuator and end effector that may be used to manipulate objects, particularly vessels such as cups, bowls, and plates and other objects such as utensils.

Figure 2A:
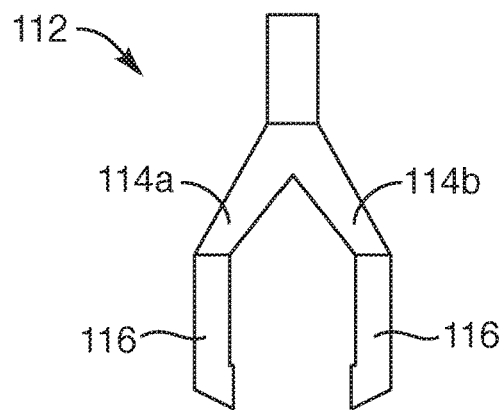
FIGS. 2A and 2B are side views of a gripper for manipulating objects in accordance with an embodiment of the present invention.
Figure 2B:
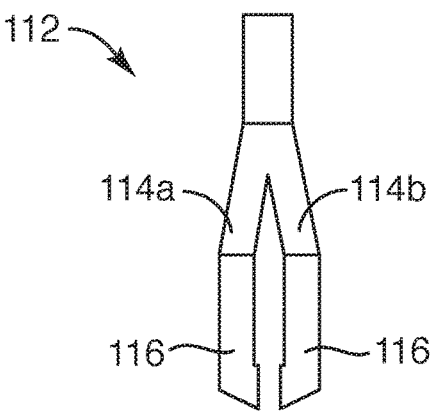

Referring to FIGS. 2A and 2B, the gripper 112 may include two fingers 114a, 114b made of metal, rigid plastic, composite (e.g., carbon fiber composite, fiberglass composite), or other material providing sufficient strength. Distal portions of the fingers 114a, 114b may include material 116 in the form of a sleeve or coating that at least covers portions of the fingers 114a, 114b that face inwardly toward one another. For example, the material 116 may include rubber, silicone, or other material that may be further textured in order to provide grip and possibly provide a degree of compressibility to provide a bumper between rigid material of the fingers 114a, 114b and vessels 102, which may be made of glass or other ceramic material. FIG. 2A illustrates the gripper 112 oriented substantially vertically with the fingers 114a, 114b spread apart and FIG. 2B with the fingers close together.

Figure 3A:
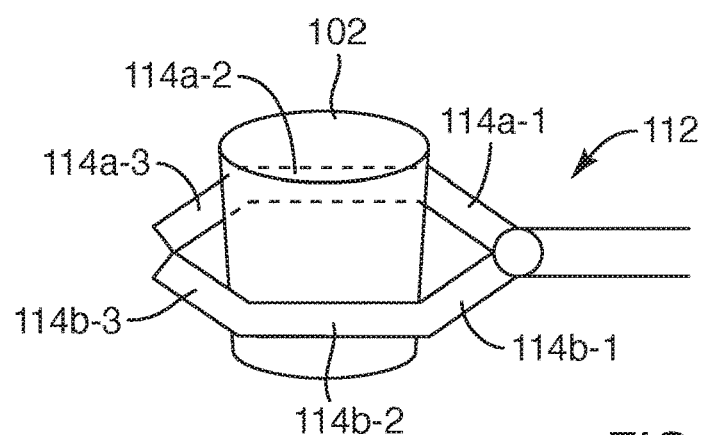
FIGS. 3A and 3B are side views showing a gripper manipulating an object in accordance with an embodiment of the present invention.
Figure 3B:
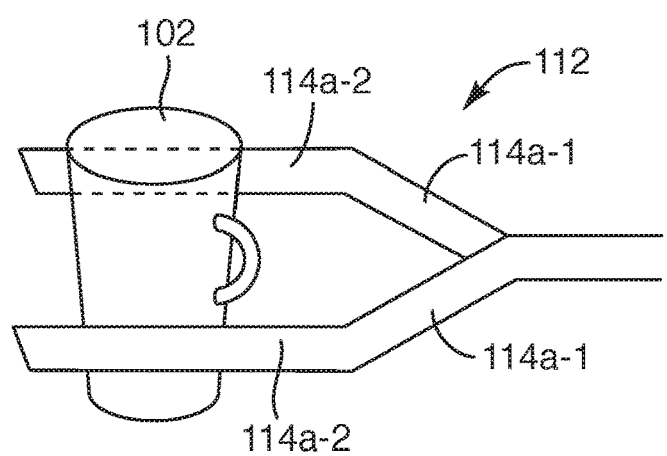

Referring to FIGS. 3A and 3B, the fingers 114a, 114b may have various shapes. In many applications, vessels 102 are cylindrical or frusto-conical in shape (e.g., a typical beverage cup). As shown in FIG. 3A, the fingers 114a-114b may therefore each include one or more straight sections 114a-1, 114a-2, 114a-3 and sections 114b-1, 114b-2, 114b-3, respectively, that are angled with respect to one another to form a convex (e.g., cupped) inner surface such that each finger 114a, 114b may have at least two, and possibly three, sections that contact a circular object when closed around it.

In other embodiments, as shown in FIG. 3B, the fingers 114a, 114b comprise two or more straight sections 114a-1, 114a-2 or sections 114b-1, 114b-2 such that the sections 114a-2, 114b-2 that engage a vessel (e.g., the portions bearing the material 116) will contact a circular object when the gripper 112 is closed around it.

The sections of the fingers 114a, 114b of either the embodiment of FIG. 3A or 3B may be straight rods with circular cross section, rectangular cross section, or other cross-sectional shape. The sections of the fingers 114a, 114b may also be curved in some embodiments and each fingers 114a, 114b may be embodied as a single contoured member rather than having distinct straight sections.

Figure 4A:
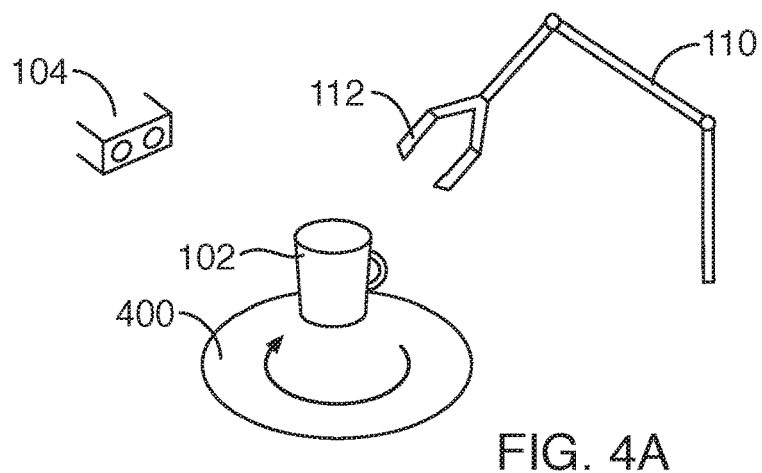
FIGS. 4A to 4C are perspective views illustrating camera configurations for visualizing objects for manipulating in accordance with an embodiment of the present invention.
Figure 4B:
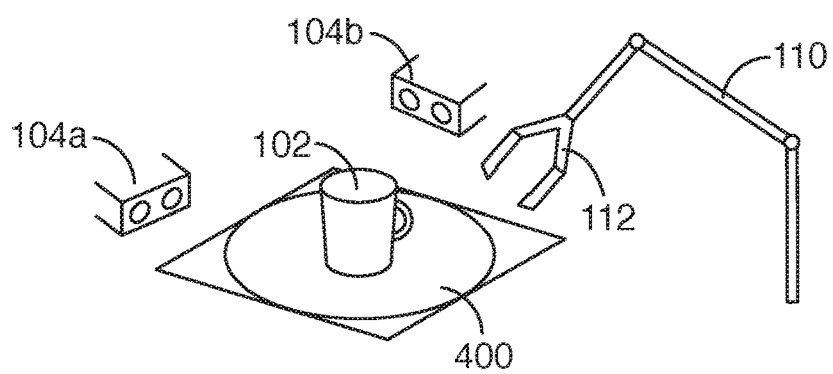
Figure 4C:
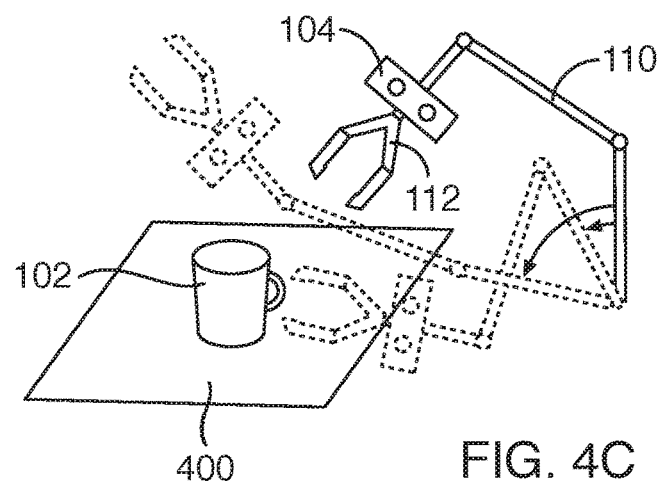

Referring to FIGS. 4A, 4B, and 4C, the cameras 104 may have various configurations relative to the robotic arm 110 and gripper 112. In particular, as shown in FIG. 4A, one or more cameras 104 may be statically mounted with respect to a support surface 400 that moves relative to the one or more cameras 104, the one or more cameras having all or part of the surface 400 in their fields of view. The motion of the surface 400 may be known such that the angular position of the surface 400 for each image captured using the one or more cameras 104 is known and may be used to relate the locations of objects in the images to three dimensional coordinates over the surface 400.

As shown in FIG. 4B, one or more cameras or groups of cameras 104a, 104b, 104c may be statically mounted relative to a static surface 400 such that each of the cameras or groups of cameras 104a, 104b, 104c has all or part of the static surface 400 in their field of view. In some embodiments, the cameras or groups of cameras 104a, 104b, 104c may be arranged substantially aligned with vertical and horizontal directions. For example, camera or group of cameras 104b may include a top view camera having its optical axis oriented substantially vertically and intersecting the surface 400. Camera or group of cameras 104a may be a side view camera having its optical axis substantially parallel to the surface 400 and extending over the surface 400 at a height corresponding to the height of objects to be manipulated (e.g., no greater than a height of the largest object expected to be manipulated). In other embodiments, no such alignment of the optical axes of the cameras or groups of cameras 104a, 104b, 104c is present. In some embodiments, the optical axis of each camera or group of cameras 104a, 104b, 104c is substantially perpendicular to the optical axes of the other cameras or groups of cameras 104a, 104b, 104c.

FIG. 4C illustrates an embodiment in which one or more cameras 104 are mounted to either the gripper 112 or robotic arm 110. The robotic arm 110 and/or gripper 112 may be actuated to capture images of the surface 400 and objects thereon at different angles. The robotic arm 110 and gripper 112 may be calibrated with respect to the surface 400 such that each image may be related to the position of the camera 104 at which the image was captured. Multiple images from the same camera may therefore be used to estimate the 3D position of objects positioned on the surface 400.

Figure 5:
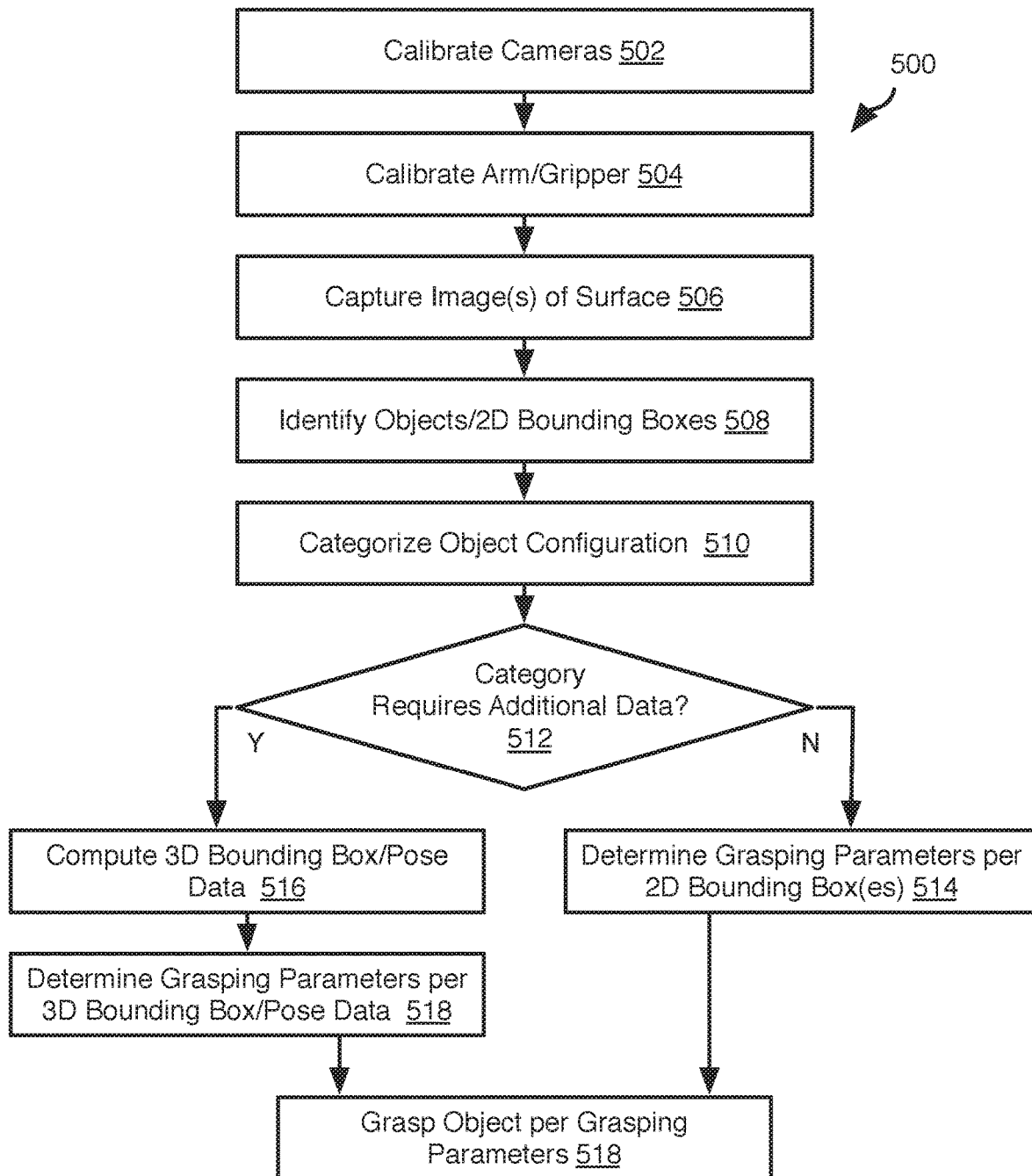
FIG. 5 is a process flow diagram of a method for categorizing object configurations and manipulating objects according to them in accordance with an embodiment of the present invention.

FIG. 5 illustrates a method 500 that may be executed by the image processor 106 and robotic controller 108 using images received from the one or more cameras 104 to control the robotic arm 110 and gripper 112.

The method 500 may include calibrating 502 the cameras 104 and calibrating 504 the robotic arm 110 and gripper 112. The calibrations 502 may include relating pixel positions in the cameras 104 to 3D space above the surface 400. The calibration 502 provides the positional information of a point in the space. The orientation and position of each camera 104 relative to the surface 400 on which an object 102 of interest sits can be found by calibrating the camera 104, which may be performed by capturing images of a reference point on the flat surface 400 and using it to determine the position and orientation of each camera. Any approach known in the art for calibrating a camera may be used. For example, the approach disclosed in the following reference, which is submitted herewith and incorporated herein by reference in its entirety:

docs.opencv.org/2.4/doc/tutorials/calib3d/camera calibration/camera calibration. html Calibrating 504 the robotic arm 110 and gripper 112 may include performing a "hand-eye" calibration that is a process of estimating a transform between a state of the robotic arm 110 and gripper 112 and the coordinate system defined by the calibration of the one or more cameras 104. As noted above, the cameras 104 or surface 400 may be movable such that this process includes using known positions and orientations of the cameras 104 and/or surface 400. The cameras 104 used for calibration at steps 502 and 504 may be 2D or 3D, though 2D cameras are advantageously less expensive.

Multiple approaches exist for solving the calibration problem of step 504, but one common version involves moving the end effector (e.g., gripper 112) using the actuator (e.g., robotic arm 112) and observing/perceiving the movement of the end effector using the cameras 104. Each move may require that the arm 112 change a position and with the following information recorded: (1) the arm 110 and gripper 112 position relative to a base of the arm 110 (2) each camera 104 position relative to a target (or fiducial). Ultimately, after collecting many data points, the transformation—which is a 4×4 spatial matrix—between the camera 104 and the end of effector (e.g., gripper 112) is solved, which allows the robot arm 112 to precisely control the position of the end effector for manipulating an object 102 observed using the one or more cameras 104.

Step 504 may be performed using the examples of calibrating an actuator and end effector relative to one or more cameras disclosed in the following references that are submitted herewith and incorporated herein by reference in their entirety:

www.ensenso.com/manual/howto handeyecalibration.htm github.com/jhu-lcsr/handeye calib camodocal The calibrations of steps 502 and 504 may be performed once upon installation of a system 100 on a premise. Alternatively, steps 502 and 504 may be performed on startup of the system 100 or at some other intervals. The subsequent steps of the method 500 may be performed repeatedly each time objects are to be manipulated by the system 100.

The method 500 may include capturing 506 one or more images of the surface 400 using the one or more cameras 104. This may include capturing images from multiple static cameras 104, capturing images from one or more static cameras 104 while a rotatable surface 400 is at multiple positions, or capturing images from one or more cameras 104 mounted to the robotic arm 110 or gripper 112 with the arm 110 and/or gripper 112 at various positions and orientations.

In either case, the result of step 506 is multiple images of the surface 400 and any objects 102 resting thereon that may be used to determine the position and orientation of the objects due to the calibration steps 502 and 504 and any position information captured along with the images (e.g., angular position of rotatable surface 400 on capture, position and orientation of robotic arm 110 and/or gripper 112 on capture).

Figure 6:
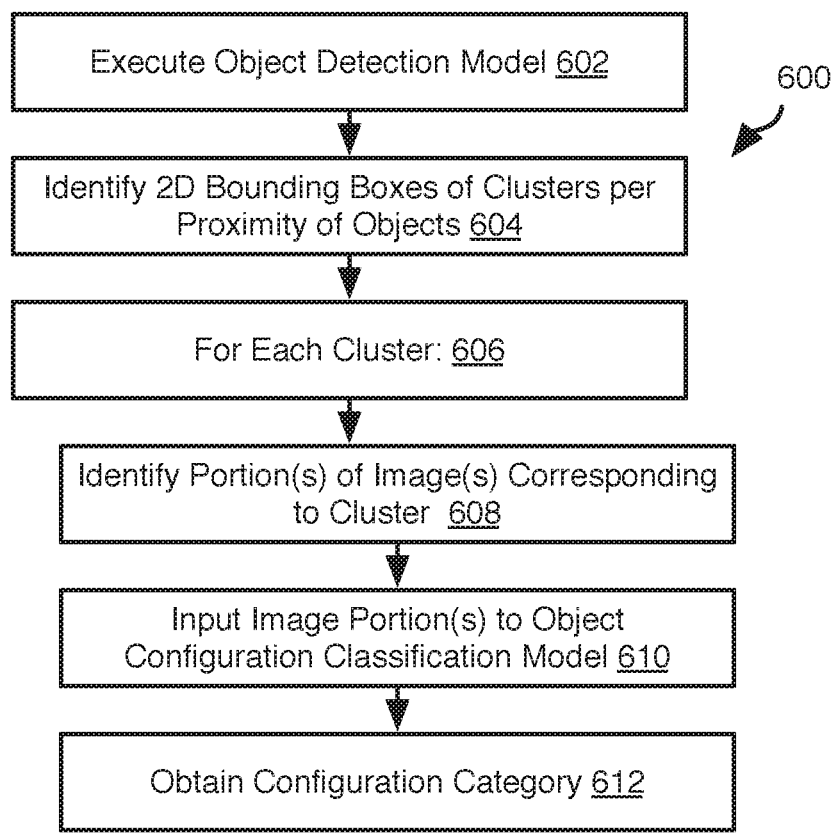
FIG. 6 is a process flow diagram of a method for identifying objects in an image and determining their configuration category in accordance with an embodiment of the present invention.

The method 500 may include processing 508 each image from step 506 to identify objects and 2D bounding boxes of individual objects or clusters of objects. The manner in which step 508 is performed is described in detail below with respect to FIGS. 6 and 7.

Once the 2D bounding of objects or clusters of objects are determined, the portions of the images enclosed in each 2D bounding box are categorized 510 to determine the configuration category of objects represented in the 2D bounding box. This process and examples of object configuration categories are described in detail below with respect to FIGS. 8A and 8B and FIGS. 9A to 9F.

The method 500 may then include, for each 2D bounding box, determining whether the object configuration category from step 510 is such that additional pose information is needed before grasping the objects represented in the each 2D bounding box. If so, then parameters sufficient to instruct the robotic arm 110 and gripper 112 to grasp one or more objects in the 2D bounding box are determined 514 using only 2D bounding box data. The 2D bounding box data may be the same 2D bounding box determined at step 508 or may include additional 2D bounding box data, e.g. second oriented 2D bounding boxes determined for individual objects in a cluster enclosed in a first 2D bounding box from step 508. Alternatively, step 508 may include identifying the 2D bounding boxes of individual objects, which are then used to determine the 2D bounding box of a cluster. In such embodiments, additional 2D bounding boxes need not be determined subsequent to the categorization step 512.

If the object configuration category is found 512 to require additional information, then them method 500 may include computing 516 some or all of a 3D bounding box, and a six-dimensional (6D) pose of the 3D bounding box, e.g. the 3D position of the centroid of the bounding box and three-dimensional angles of the 3D bounding box (e.g. angular orientation of the 3D bounding box about three different axes). Grasping parameters sufficient to instruct the robotic arm 110 and gripper 112 to grasp the objects in the 2D bounding box are then determined 518 using the 6D pose information.

In either case, the objects in each 2D bounding box is then grasped 518 according to the grasping parameters determined at either step 514 or step 518. The manner in which the grasping parameters are determined and implemented is described in greater detail below.

FIGS. 6, 7, 8A, 8B, and 9A to 9F illustrate a method 600 by which objects are identified and circumscribed with 2D bounding boxes at step 508 and assigned to object configuration categories at step 510. The method 600 may be executed by the image processor 106.

The method 600 may include executing 602 an object detection model on the one or more images from the one or more cameras 104. The object detection model 602 may be a machine vision algorithm that may be implemented using a machine learning model. For example, the machine learning model may be a convolution neural network (CNN). The output of step 602 may be 2D bounding boxes of individual objects detected using the object detection model ("2D object boxes").

Object detection at step 602 may be performed using any approach known in the art such as those described in the following references that are submitted herewith and incorporated herein by reference in their entirety: github.com/tzutalin/labelImg github.com/tensorflow/models/tree/master/research/object detection github.com/tensorflow/models/blob/master/research/object detection/g3doc/detec tion model zoo.md cocodataset.org/#home For example, the machine learning model may be trained to identify objects in an image by capturing images of many different arrangements of objects (e.g., cups, plates, bowls, etc. with or without food and other debris) on a surface, such as a tray. Each arrangement of objects may be captured from many angles. A human operator then evaluates the images and draws polygons around each object present in the image, including partially occluded objects. For example, a program known as "labelimg" may be used. Each polygon may also be labeled with a class by the human operator (e.g., plate, cup, mug, bowl, fork, spoon, etc.). As noted above, the methods disclosed herein are particularly useful for transparent and translucent objects. Accordingly, the objects on the tray may include many transparent and translucent objects that are expected to be encountered, e.g. the transparent cups or bowls used by a particular restaurant or cafeteria.

The labeled training data may then be used to train a machine learning model to identify boundaries of, and possibly classify, objects detected in images. For example, training the machine learning model may commence with using the pretrained faster_rcnn_inception_ resnet_v2_atrous_coco from the TF Object Detection API detection model zoo. The weights of this model may then be further tuned by training the model with the labeled images (polygons around objects and object classes) as described above. The classes to which detected objects are assigned may be constrained to be the 90 classes in the COCO (common objects in context) data set.

In some embodiments, object detection using 2D bounding boxes involves the use of rectangular boxes to annotate objects—including the location of the upper left coordinates (x,y) and the dimensions (width, height) of the object as well as the class type of the object. Scores ranging from 0 to 1 (with 1 most confident) for each bounding box are also assigned to each bounding box.

There are generally two types of object detection frameworks that exist in practice—two-stage detectors and single-stage detectors. The two type of detectors have speed vs accuracy tradeoffs, with two stage detectors being slower but more accurate while single stage detectors are faster but less accurate. Two stage detectors comprise of (typically) a proposal network followed by a fine tuning stage and include well known frameworks such as Faster-RCNN or Mask-RCNN. Single stage detectors make a fixed number of predictions on grids and include frameworks such as SSD, YOLO, or RetinaNet.

Training data annotations for object detectors with bounding boxes may require some or all of the objects inside each input image to be annotated. Typically, existing frameworks trained on varied data (COCO, PASCAL/VOC, OpenImages, etc.) can be leveraged that include many classes that overlap with the grasping problem at hand. It therefore may be useful to incorporate both collected data as well as the source data for these existing frameworks and fine-tune on those classes of interest.

The annotated images are input to a machine learning model (image, 2D bounding boxes, class type for each 2D bounding box. The outputs of the machine learning model may be offset x, offset y, width, height, and object class type for all known objects inside the image as well as confidence scores for some or all of these values.

The training process may work in the same way as convolutional neural networks (CNN), requiring gradient descent and learning rate decay, with modifications on the loss function to account for the type (single stage or two stage) of framework.

Training of an object detector that generates 2D bounding boxes and a class type for each 2D bounding box may be performed according to the following references submitted herewith that are hereby incorporated herein by reference in their entirety:

Faster RCNN:
papers.nips.cc/paper/5638-faster-r-cnn-towards-real-time-object-detection-with-region-proposal-networks.pdf
Mask RCNN:
research.fb.com/wp-content/uploads/2017/08/maskrcnn.pdf
YOLOv3: pjreddie.com/media/files/papers/YOLOv3.pdf
SSD: www.cs.unc.edu/~wliu/papers/ssd.pdf
RetinaNet: farxiv.org/pdf/1708.02002.pdf The method 600 may then include identifying 604 2D bounding boxes ("2D cluster box") for clusters of objects identified at step 602, For example, the proximity of the 2D object boxes to one another may be evaluated. A cluster may be defined as a group of 2D object boxes such that each 2D object box in the group is within a threshold proximity of another 2D object box in the group. The threshold proximity may be a requirement of co-located or overlapping boundaries or a separation less than or equal to a predefined distance, which may be measured in pixels or estimated distance based on analysis of the one or more images.

The 2D cluster box of a cluster may be defined as a 2D bounding box that encompasses all of the 2D object boxes of that cluster, e.g. a smallest possible box meeting this requirement.

Steps 602 and 604 may be understood with reference to FIG. 7. An image 700 from a camera 104 includes images of multiple objects 102 that are distributed over a surface 400. The objects 102 may include transparent objects, such as transparent vessels, as well as other objects such as flatware or non-transparent vessels. Some objects 102 occlude one another in the image 700 and others are physically touching or stacked together. An object detection model 702 (such as one according to the description above with respect to step 602) processes the image 700 and identifies 2D object boxes for the objects 102. These 2D object boxes are evaluated to identify clusters C1, C2, and C3 and 2D cluster boxes for each cluster are determined from the 2D object boxes of the objects.

Note that FIG. 7 shows a single image processed according to steps 602 and 604. Where multiple cameras are used, each image 700 may be processed separately according to the method 600. In other embodiments, a set of images 700 captured at the same time (e.g., capturing images of a same state of the surface 400 and objects 102 thereon) are processed simultaneously. Since the cameras 104 are calibrated to each other, the location of the same object in different images in a common global coordinate system of the calibration will be approximately the same. This improves the confidence of the detection of an object appearing in multiple images. Also, in other cases, if there is an occluded object in one image that does not show because of occlusion, the same object may show up in the other images. This allows more robust detection of objects in general.

Referring again to FIG. 6, while still referring to FIG. 7, each cluster may then be processed 606 according to some or all of steps 608-614. In particular, the portion of the image 700 within the 2D cluster box of each cluster C1, C2, C3 may be identified and input 610 to an object configuration classification model, from which an object configuration category is obtained 612. The object configuration classification model evaluates the objects represented in the image portion for a cluster and assigns the configuration to a category. The object configuration classification model does not determine a 3D bounding box, 6D pose, or any other information regarding the position or orientation of the objects represented in the image portion. Instead, the object configuration classification model determines whether the objects in the cluster match a predefined set of configurations. In some embodiments, the same model is used to perform the object and cluster detection (steps 604-608) and the object configuration classification (steps 610-612).

The object configuration classification model may be embodied as a machine vision algorithm. For example, the object configuration classification model may be a machine learning model trained to perform optical classification. The machine learning model may be a convolution neural network (CNN). The CNN may implement an object detection model, instance segmentation model, or classification model. The CNN may include one or more stages. The CNN may output a label for the image portion or may output confidence scores for a plurality of categories that the CNN is trained to recognize. The object configuration classification model may be an encoder-decoder architecture based on a CNN that generates instance or class segmentation masks. As for other embodiments, the object configuration classification model may be programmed to perform the functions ascribed to it for objects that are transparent or translucent.

For example, as shown in FIG. 8A, cluster C1 shows a stack of three cups. The image portion for cluster C1 is processed by the object configuration classifier model 800, which assigns cluster C1 to category 800a, which may, for example, be a category corresponding to stacked (e.g., nested) cups or other vessels. As shown in FIG. 8b, the image portion of cluster C2 is processed and assigned to a different category 800b, which may correspond to items lying on their side, items packed together on a surface but not stacked, or some other category.

FIGS. 9A to 9F illustrate some examples of object configuration categories. For example, FIG. 9A corresponds to category (i): a single vessel upright (e.g., resting on its flat base) on a surface and not within a threshold proximity of any other object (e.g., 2D bounding box not overlapping that of any other object or not within the threshold proximity from the 2D bounding box of any other object).

Figure 9A:
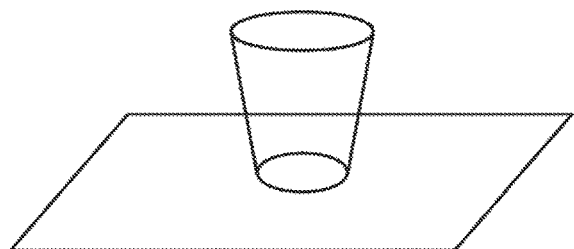
FIGS. 9A to 9F illustrate examples of object configuration categories in accordance with an embodiment of the present invention.
Figure 9C:
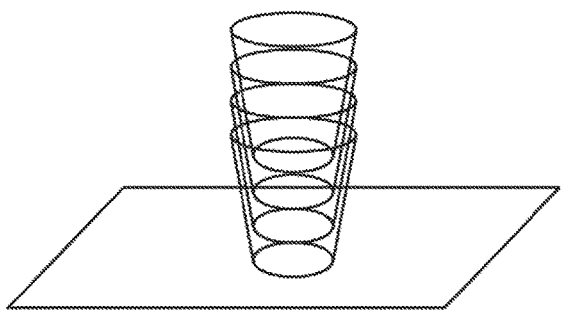
Figure 9B:
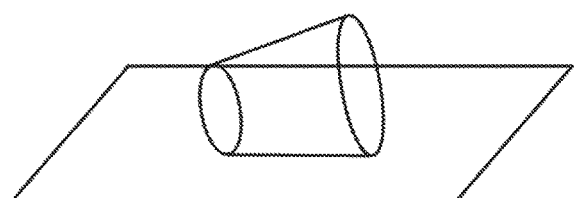

FIG. 9B corresponds to category (ii): a single vessel lying on its side on a surface and not within the threshold proximity of any other object (e.g., 2D bounding box not overlapping that of any other object or not within the threshold proximity from the 2D bounding box of any other object).

FIG. 9C corresponds to category (iii): vessels stacked (e.g., nested) with one another on the surface 900 and not within the threshold proximity of any other object.

Figure 9D:
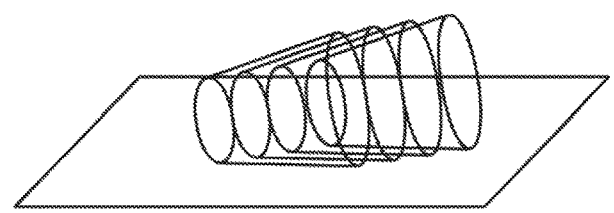

FIG. 9D may also correspond to category (iii) except that the stack of vessels are lying on their side and are also not within a threshold proximity of any other object. In some embodiments, a side-lying stacks is treated as a separate category.

Figure 9E:
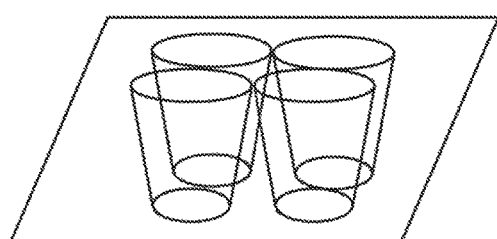

FIG. 9E may correspond to category (iv): vessels resting on the surface and within threshold proximity from one another. Category (iv) may correspond to vessels that are upright (resting on their flat bases on a surface) and packed together or may correspond to vessels that are packed together regardless of orientation. Alternatively, separate categories may be defined for packed upright vessels and packed side-lying vessels.

Figure 9F:
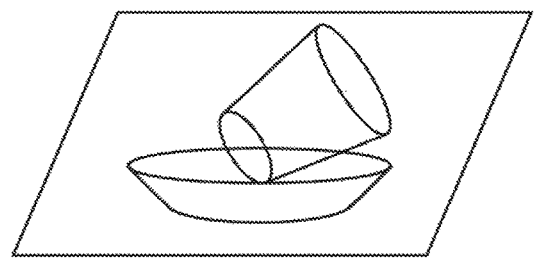

FIG. 9F may correspond to category (v): one or more vessels that do not correspond to any of categories (i)-(iv). In particular, vessels assigned to category (v) may be those that are at an arbitrary angle, e.g. neither lying on their sides nor resting upright on their flat bases.

In some embodiments, the object configuration classifier model 800 outputs a single mutually exclusive label that indicates an object configuration category to which a cluster is determined to belong.

In other embodiments, the object configuration classifier model 800 outputs confidence scores for all of (i) through (iv). If none of the confidence scores are above a threshold level, then the image portion is assigned to category (v). In other embodiments, if neither of (a) an individual confidence score for one of categories (i) through (iv) is above an individual confidence threshold and (b) an aggregation of the confidence scores for categories (i) through (iv) (e.g., sum or weighted sum) is not above an aggregate threshold, then the image portion is assigned to category (v). In yet another embodiment, the object configuration classification model 800 assigns confidence scores to categories (i) through (v) and the image portion is assigned to category (v) if the confidence score for (v) is higher than the confidence scores for (i) through (iv) or an aggregation of the confidence scores for (i) through (iv) (e.g., sum or weighted sum).

In some embodiments, categories are defined as combinations of categories (i) through (iv) or (i) through (v), e.g. some or all feasible combinations of categories. For example, a cluster including an upright vessel and a side-lying vessel may be assigned to a combined category of both (i) and (ii). Any other possible combination of vessels may also be assigned a category that is a combination of the categories (i) through (iv) or (i) through (v) to which individual vessels in the cluster belong. The object configuration classification model may be trained to assign clusters to these combined categories. Alternatively, a combined category corresponding to multiple categories may be assigned in response to the confidence scores for the multiple categories (i) through (iv) or (i) through (v) all being above a threshold, which may be the same as or different from the threshold for determining whether to assign a cluster to an individual category (i) through (iv).

Note further that the object configuration classifier model may be trained to identify configurations for other objects other than vessels or for different types of vessels. For example, categories (i) through (v) correspond to cups but other categories may be defined for various configurations of bowls, plates, flat ware, serving pieces, and the like. These categories may be for transparent or translucent objects or for opaque or reflective objects as well.

Various implementations of the object configuration classifier model 800 may be used. In one embodiment, there is a class for object configurations which contains objects with arbitrary poses. A network (e.g. convolution neural network) spontaneously selects a class, e.g. defines an object configuration category, based on the data that it has seen during the training and their associated labels. In another embodiment, the network is biased to select among the four basic categories (e.g., categories (i) through (iv) other than the category (v) associated with the arbitrary pose objects (such as via numerical weighting or network architecture). When manipulation of the classified object configuration fails and/or the classifier has very low confidence for categories (i) through (iv), the object configuration classifier model falls back to category (v), which will invoke estimation of the arbitrary pose of the objects in a given cluster.

This approach is advantageous because manipulation of the objects associated with the categories (i) through (iv) is generally faster and more reliable due to the technical challenges associated with general estimation of arbitrary poses.

The object configuration classifier may be trained using either a manual or automated approach. For a manual approach, objects can be manually placed in poses (by a human) which are then iteratively captured by one or multiple cameras at different views. These images are then labeled with the known poses in which the objects were manually placed.

In an automated approach, a robot arm can be used to randomly place objects in various translations, rotations, stacked combinations, packed configurations, and the like. For each robotically arranged pose, one or more cameras can be used to capture the pose and these images may be labeled with the category of the arranged pose.

In some embodiments, the robotic arm (the robotic arm 108 or another robotic arm) does not need to use any vision when placing and rearranging objects since the positions between consecutive poses are known. Randomization may be used to provide quasi-continuous variation in arrangement (translational position, orientation, etc.) rather than discrete variations.

Ultimately, each image of the objects should correspond to a specific label as per the pose categories (i) through (v) shown above or a category that is a combination of these categories. Additionally, an object detection framework could be used to crop the collected images for the training process so that the only the object of interest is in view.

A suitable algorithm that can be used for object configuration category recognition is a general convolutional neural network (CNN) that takes in 2D object image(s) at different views, e.g. processes images of an object form multiple angles and categorizes the object. The CNN can either be a custom network or utilize pre-trained weights (ResNet, Inception, DenseNet, etc.)

The outputs of the network may be either soft-max normalized classes which correspond to each of the object configuration categories specified above, or multi-label classes which pass through a sigmoid layer.

The input(s) for the network can be a simple image or a stack of images collected by multiple camera views. The image sizes could be resized to a size that achieves an improved logloss metric determined by the training process below. For the case with multiple views (cameras) of the same object, parallel CNNs can be used to generate features per each view which are then used to train a second level pooling network for a combined output.

To train the CNN, the collected data may be split into a training, validation, and test sets. Typically, this is 60% for training, 20 percent for validation, and 20% for testing. However, over 90% may be used for training if training data greatly, outnumbers validation or test data.

Standard methods can be used for training, including both evaluation metric (e.g. accuracy and log-loss) and loss function (e.g. cross entropy). The training process could incorporate augmentations, learning rate or weight decay, and early stopping based on validation metrics. For augmentations, care may be taken so that the pose is not disturbed (e.g. vertical flips should not be used).

Training may be performed according to the approach described in the following reference, which is submitted herewith and incorporated herein by reference:

PoseCNN: A Convolutional Neural Network for 6D Object Pose Estimation in

ClutteredScenesa arxiv.org/pdf/1711.00199.pdf

Figure 10A:
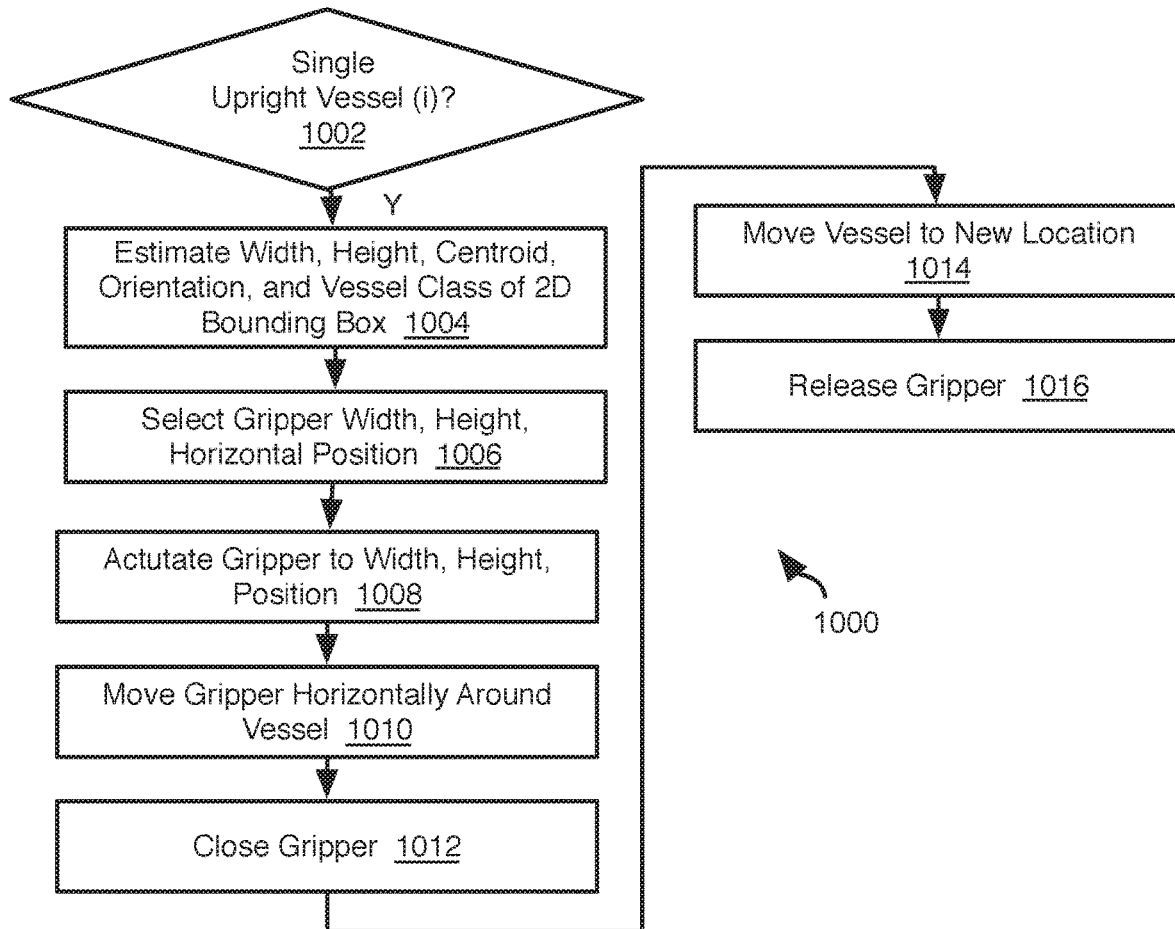
FIG. 10A is a process flow diagram of a method for manipulating a single upright vessel in accordance with an embodiment of the present invention.

FIG. 10A illustrates a method 1000 for determining 514 grasping parameters (see FIG. 5) for an image portion found 1002 to belong to category (i): a single upright vessel resting on a surface on its flat base and not within the threshold proximity to another object ("the vessel"). Note that category (i) may be one of a first subset of categories that are found 512 (see FIG. 5) to not require determining a 3D bounding box or 6D pose data. Categories (ii), (iii), and (iv) and categories that are combinations of any of categories (i), (ii), (iii), and (iv) may likewise belong to the first subset whereas category (v) belongs to a second subset.

The method 1000 may include estimating 1004 some or all of a width, height, and centroid location of an oriented 2D bounding box of the vessel. For example, referring to FIGS. 11A and 11B, the 2D object box of the vessel in a first image M1 may have a width W1 and height H1. The 2D object box may also have a location within the image that is determined when the cluster was identified at step 602: the object detection model may give a width, height, and image location (e.g., pixel position) of the 2D bounding box for a detected object, where the location is a centroid location or a location of one of the vertices. Alternatively, the 2D bounding box may be defined as two diagonally opposed vertex locations (pixel positions) within an image in which the object was detected. In either case, the width W1, height H1, and centroid location of the box may be determined using this definition of the 2D bounding box.

In some embodiments, another camera 104 may capture another image M2 at the same time (e.g., when the vessel is in the same state on the surface 400 and has not been moved since the time the image M1 was taken). A 2D bounding box of the vessel may be obtained from image M2 and have a width W2, height H2, and a centroid location determined in the same manner as for the image M1.

Figure 12:
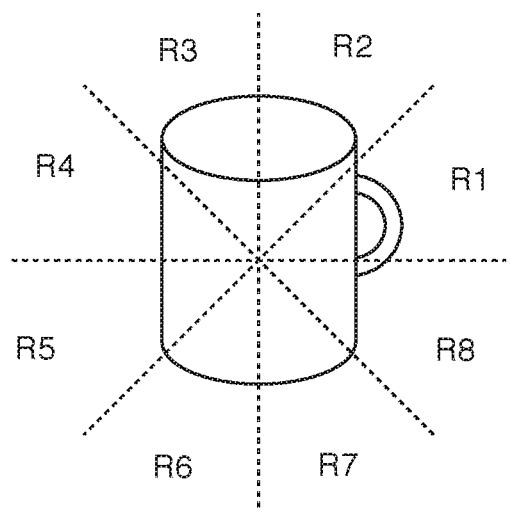
FIG. 12 illustrates angular regions for a vessel in accordance with an embodiment of the present invention.
Figure 12:
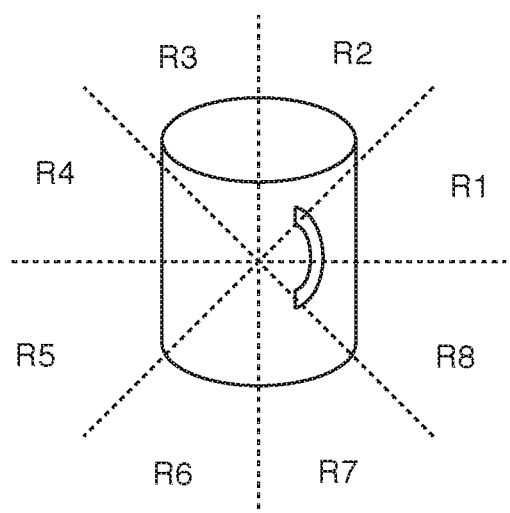

Step 1004 may include evaluating the 2D bounding boxes for the vessel in one or more images M1 and M2 to obtain an "oriented 2D bounding box" that is an extension of the 2D bounding boxes. Typical 2D bounding boxes are rectangles of different sizes and aspect ratios. Their edges are parallel to the x-axis and y-axis of the images M1, M2. Oriented 2D bounding boxes estimate an angle of rotation for the box relative to the x and y axes of the image, A machine learning model may be trained to generate an oriented 2D bounding box from one or more 2D bounding boxes of one or more images M1, M2. For example, training data may be generated by, for each image of a plurality of training images, annotating the each image with an oriented 2D bounding box indicating the four corners for the oriented box. Alternatively, the full angle (360 degrees) can be divided into R regions and human annotators selects the region for the angle that matches the desired orientation of the box (see regions R1 to R8 in FIG. 12). In some embodiment, angular position of a handle is determined by image classification with multiple labels in which each label corresponds to a range Rn of angles (e.g., of 50-60 degrees). Accordingly, determination of an oriented 2D bounding box may be omitted in such embodiments.

The orientation of the 2D oriented bounding box and the vessel represented by it may be important for vessels that are not circular or have non-circular features, such as the illustrated mug including a handle.

The input to the machine learning model that estimates the oriented bounding box is an image and the labels are the position, the width, the height, and the angle of orientation of the box. The (raining process may correspond to any of the Faster RCNN. SSD, and YOLOv3 training processes except that the non-oriented bounding box estimation is that the angle of orientation is incorporated by adding the weighted cross entropy loss to the original loss described in the training of the model for estimating the non-oriented 2D bounding boxes. Training of the machine learning model for determining the attributes (width, height, angle of orientation) of the oriented bounding box may be according to any of the following references submitted herewith and incorporated herein by reference in their entirety:

arxiv.org/pdf/1802.00520.pdf pireddie.com/media/files/papers/grasp_detection.pdf).

pireddie.com/media/files/papers/grasp_detection.pdf

In some embodiments, determining the oriented 2D bounding box for each vessel may be performed by first applying an instance segmentation model, i.e. a CNN trained to perform instance segmentation. The result of applying the instance segmentation model may be an image in which all pixels belonging to an instance (i.e., specific instance of an object detected as belonging to a class of objects the model is trained to detect) have a unique color relative to other instances of the same class or different class of objects. Likewise, the result may be a map that relates each unique color to an instance identifier of that instance. The map may also relate the instance identifier to a class of the instance (e.g., cup bowl, utensil, etc.) and a confidence score for the classification.

The oriented 2D bounding box for each instance may therefore be determined by evaluating the pixels for each instance ID and determining a size and orientation of a bounding box that encloses the pixels. For example, this may include executing a rotating caliper algorithm to determine the oriented bounding 2D bounding box.

Figure 11A:
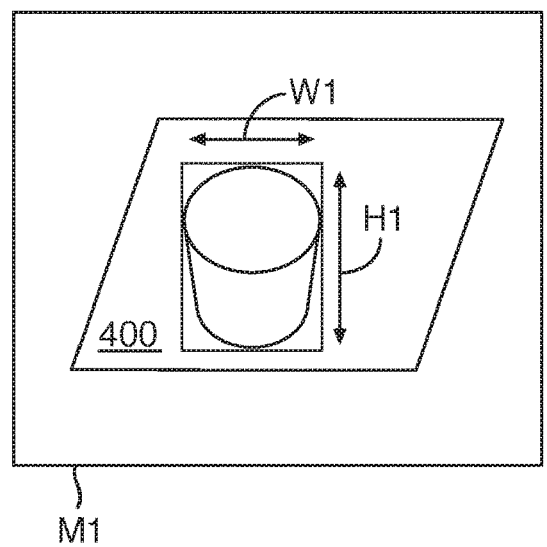
FIGS. 11A to 11C illustrate a process of determining grasping parameters for a single upright vessel in accordance with an embodiment of the present invention.
Figure 11B:
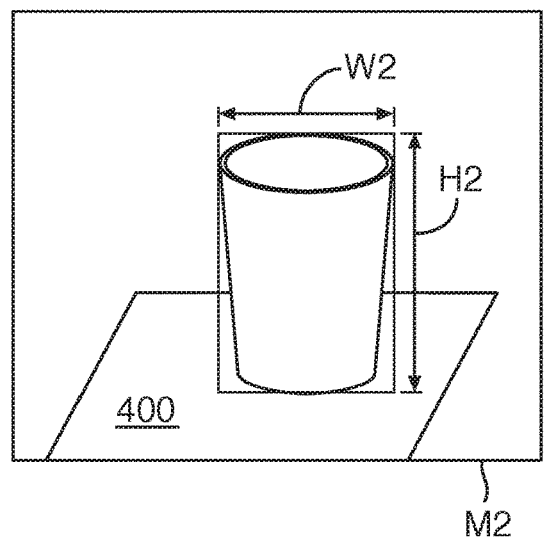

As shown in FIG. 11B, one camera 104 may be positioned at a side of the surface 400 and look across the surface 400, e.g., the optical axis of the camera being substantially parallel to the surface 400. As shown in FIG. 11A, another camera 11A may have its optical axis being closer to perpendicular, e.g. substantially perpendicular, to the surface 400 such that the camera 104 looks down on the surface 104. Although these positions orientations may be helpful, arbitrary angles and distribution of cameras 104 may also be used once the cameras 104 are calibrated.

Since the vessel is already determined to be a single upright vessel, only the horizontal position need be determined. The position and orientations of the oriented 2D bounding boxes may be evaluated to determine the horizontal position. For example, using calibration of the camera used to capture the image 11A, the horizontal position may be determined directly. For example, the calibration may relate pixel positions presumed to be on the surface 400 to 2D horizontal coordinates in a plane parallel to the surface. Accordingly, the pixel position of a centroid of a region of the surface 400 obscured by the 2D bounding box (oriented or not) may be determined and translated into a 2D horizontal coordinate.

In the case where cameras have arbitrary orientations, the camera extrinsic parameters and calibration could be used to generate a transformation that converts the bounding box parameters to "horizontal" position of an object, i.e. in a plane substantially parallel to the surface 400.

In a like manner, the vertical position of a centroid of the vessel may be determined using the horizontal position from FIG. 11A and using FIG. 11B. In particular, presuming a known horizontal location, the height in pixels of the bounding box (oriented or not) in FIG. 11B may be related to a vertical height in a 3D coordinate system with respect to which the cameras 104, robotic arm 110, and were calibrated (see discussion, above, regarding steps 502 and 504 of FIG. 5).

Various other approaches may be used to determine the horizontal position and height of the vessel. In a first alternative, there are one or more cameras with optical axis substantially perpendicular to the surface 400 and facing the surface 400. An image from these one or more cameras 104 can be used to estimate the horizontal position of an upright object and the vertical grasping point may then be determined based on the classification results which produces the object class from which the height is obtained (see discussion of FIG. 10B, below). In a second approach, there are two or more calibrated cameras at least one of which has an optical axis substantially perpendicular to the surface 400 and is facing the surface 400 and the other generates substantially side views (optical axis substantially parallel to the surface 400 and viewing across the surface 400. In this case, even without object class, it is possible to derive all the necessary grasping parameters including the height of object.

Figure 10B:
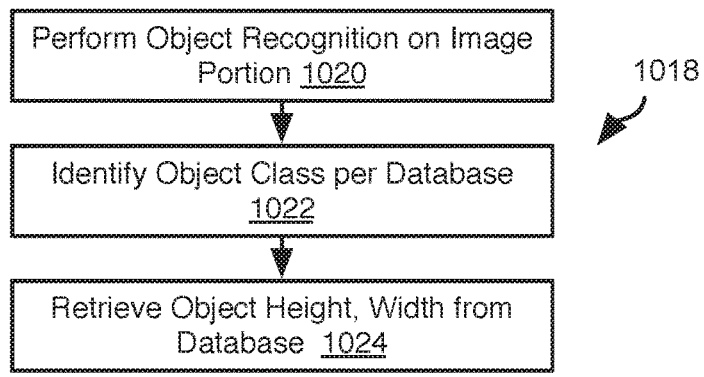
FIG. 10B is a process flow diagram of a method for classifying a vessel type in accordance with an embodiment of the present invention.
Figure 11C:
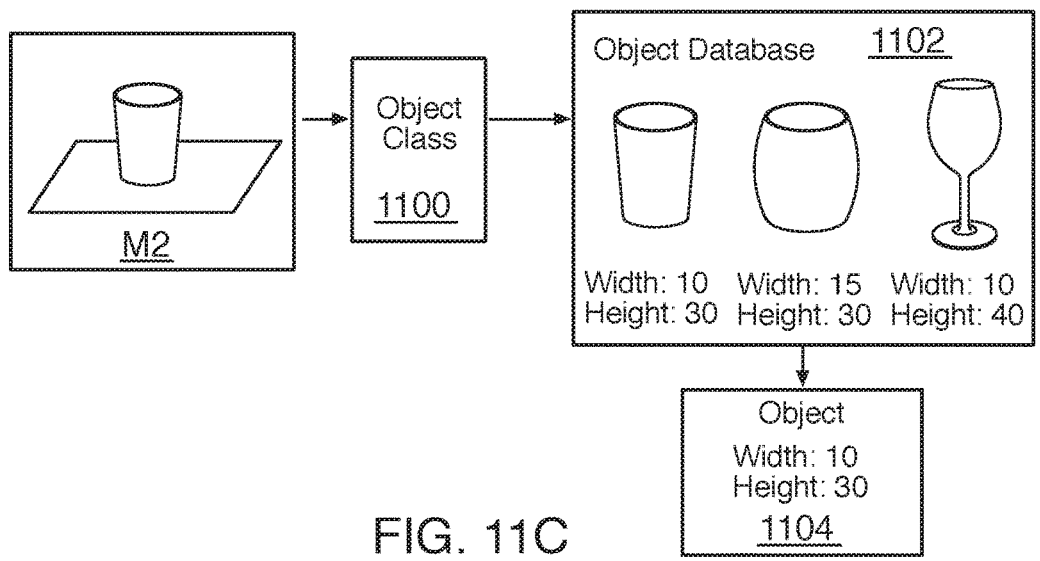

Referring to FIGS. 10B and 11C properties of the vessel may also be obtained by determining a classification of the vessel itself (as opposed to a classification of its configuration relative to the surface). For example, step 1004 may include executing the method 1018 of FIG. 10B, in which one or both of the images M1, M2 (M2 in the illustrated example) are processed 1020 using an object recognition algorithm 1100 that outputs a classification of the vessel. An entry 1104 corresponding to the classification may be identified 1022 in a database and dimensions corresponding to the classification may be retrieved 1024 from the database 1102, such as a database storing dimensions of different classes of cups as shown in FIG. 11C.

The object recognition algorithm 1100 may be the same as or different from the object detection model of step 602. Specifically, in some embodiments, the object detection model of step 602 also outputs a classification of a detected object. In some embodiments, this class may be of sufficient specificity to determine dimensions of the object using the database 1102. In other embodiments, the object classification model 1100 is a separate and more specific classifier than that used at step 602. For example, the object classification model 1100 may be trained to identify specific types of cups, as shown in FIG. 11C.

The known width and height of the object may be used to characterize the position of the vessel using the 2D bounding boxes (oriented or not) from one or more images M1 and M2. In particular, comparing the width and/or height in pixels of the 2D bounding box in an image M1 and M2 to the known width and height of the vessel, the distance from the camera that captured the image M1 and M2 may be estimated using the calibration of the camera and known transformation techniques for inferring distance based on foreshortening in an image.

A vertical angle (in a vertical plane parallel to the optical axis of the camera 104) of the object may be estimated from y (vertical) coordinate of the centroid of the 2D bounding box in the image M1, M2, and the horizontal angle (in a horizontal plane parallel to the optical axis of the camera 104) may be estimated from the x (horizontal coordinate) of the centroid of the 2D bounding box in the image M1, M2. Using these estimated angles and the estimated distance to the object, its 3D position may be determined using standard coordinate transformation techniques. Note that only one image M1 is needed but accuracy may be improved by estimating the 3D position using two or more images M1, M2 and averaging the results to obtain an average 3D position.

Referring again to FIG. 10A, the method 1000 may further include selecting 1006 grasping parameters for the robotic arm 110 and gripper 112 (or other actuator and end effector) according to the position, width, and height of the object or oriented 2D bounding box from step 1004 as determined from one or more images alone or using size data based on classification of an object represented in the one or more images.

Accordingly, one grasping parameter may be a horizontal (e.g. a point in a plane parallel to the surface 400) position of the gripper 112, which may be determined from the horizontal position of the vessel as estimated at step 1004. For example, an initial position of the gripper prior to grasping the vessel may be a horizontal position offset from the estimated horizontal position of the vessel, where the offset is based on length of the gripper fingers 114a, 114b and width of the 2D bounding box, i.e. an initial position such that the gripper may be put in that position without being incident on the vessel.

Another grasping parameter may be a height above the surface 400 at which the gripper will be positioned when engaged with the vessel, such as some fraction (e.g. 0.5 to 0.8) of the height of the vessel as determined at step 1004. In some embodiments, the database entry 1104 in the database 1102 for a classification may indicate a gripping height, accordingly this height could be used as the height at which the gripper 112 will be positioned when engaged with the vessel.

Another grasping parameter may be a gripper width, i.e. how wide the fingers 114a, 114b of the gripper are spread prior to engaging the vessel, such as some value in excess of the vessel width as estimated at step 1004. For example, 1.1 to 1.5 times the vessel width.

Figure 13:
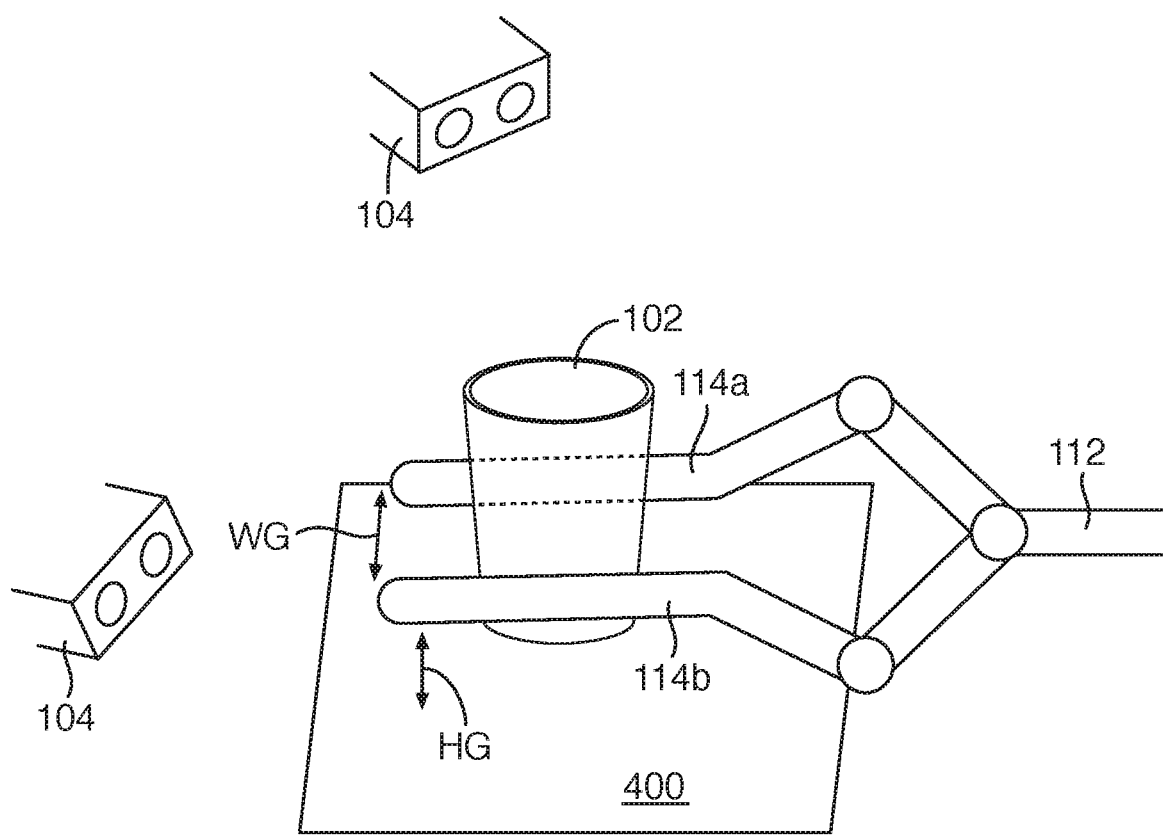
FIG. 13 illustrates grasping of a vessel using a gripper in accordance with an embodiment of the present invention.

Referring to FIG. 13 while still referring to FIG. 10, the robotic controller 108 may then actuate 1008 the robotic arm 110 and gripper 112 to achieve the horizontal positon, height HG, and gripper width WG determined at step 1010. The robotic controller 108 may then cause 1010 the robotic arm 110 to move the gripper 112 horizontally toward the vessel until the positon of the vessel determined at step 1004 is positioned between the fingers 114a, 114b of the gripper 112. The robotic controller 108 may then invoke closing 1012 of the fingers 114a, 114b of the gripper 112 around the vessel (see gripper fingers 114a, 114b and vessel 102 in FIG. 13), moving of the vessel by the robotic arm 110 to a new location, and releasing 1016 of the gripper. Some or all of steps 1008, 1010, and 1012 may be performed with feedback from the cameras 104 to verify that the fingers 114a, 114b of the gripper 112 are in fact positioned around the vessel and that the vessel does become gripped within the fingers 114a, 114b and remains gripped at least for some portion of the movement off of the surface 400. In some embodiments, step 1014 may further include invoking rotation of the gripper in order to invert the vessel, such as when placing the vessel on a dish rack for cleaning.

In embodiments where the end effector is something other than a gripper, a width of the gripper need not be selected at step 1006 and other parameters may be selected, such as a height, suction force, magnetic field strength, or other parameter suitable for the end effector to pick up the vessel when estimates of its height, width, and position are known.

Figure 14:
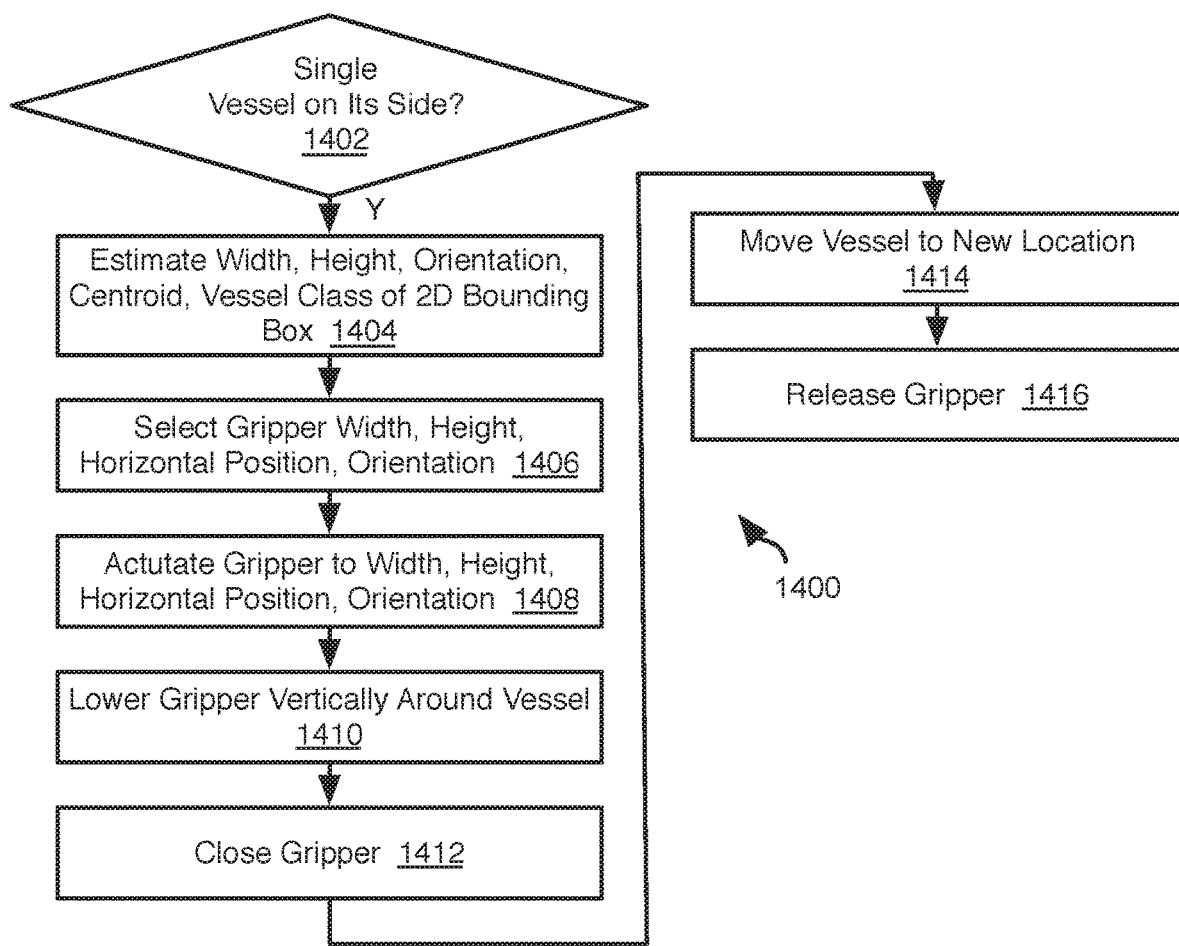
FIG. 14 is a process flow diagram of a method for determining grasping parameters for a single vessel on its side in accordance with an embodiment of the present invention.
Figure 15A:
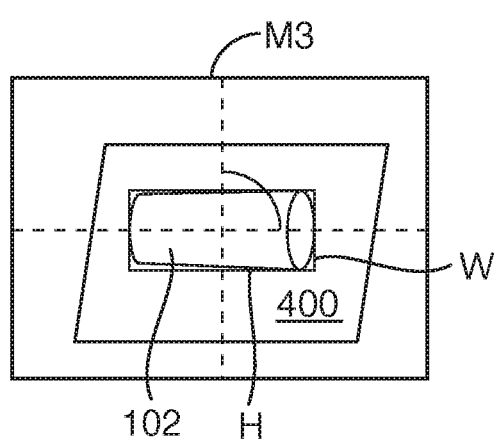
FIGS. 15A and 15B illustrate grasping of a single vessel on its side using a gripper in accordance with an embodiment of the present invention.
Figure 15B:
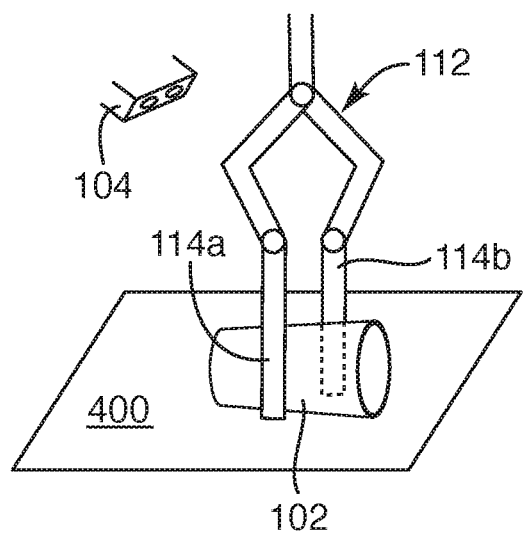
Figure 16:
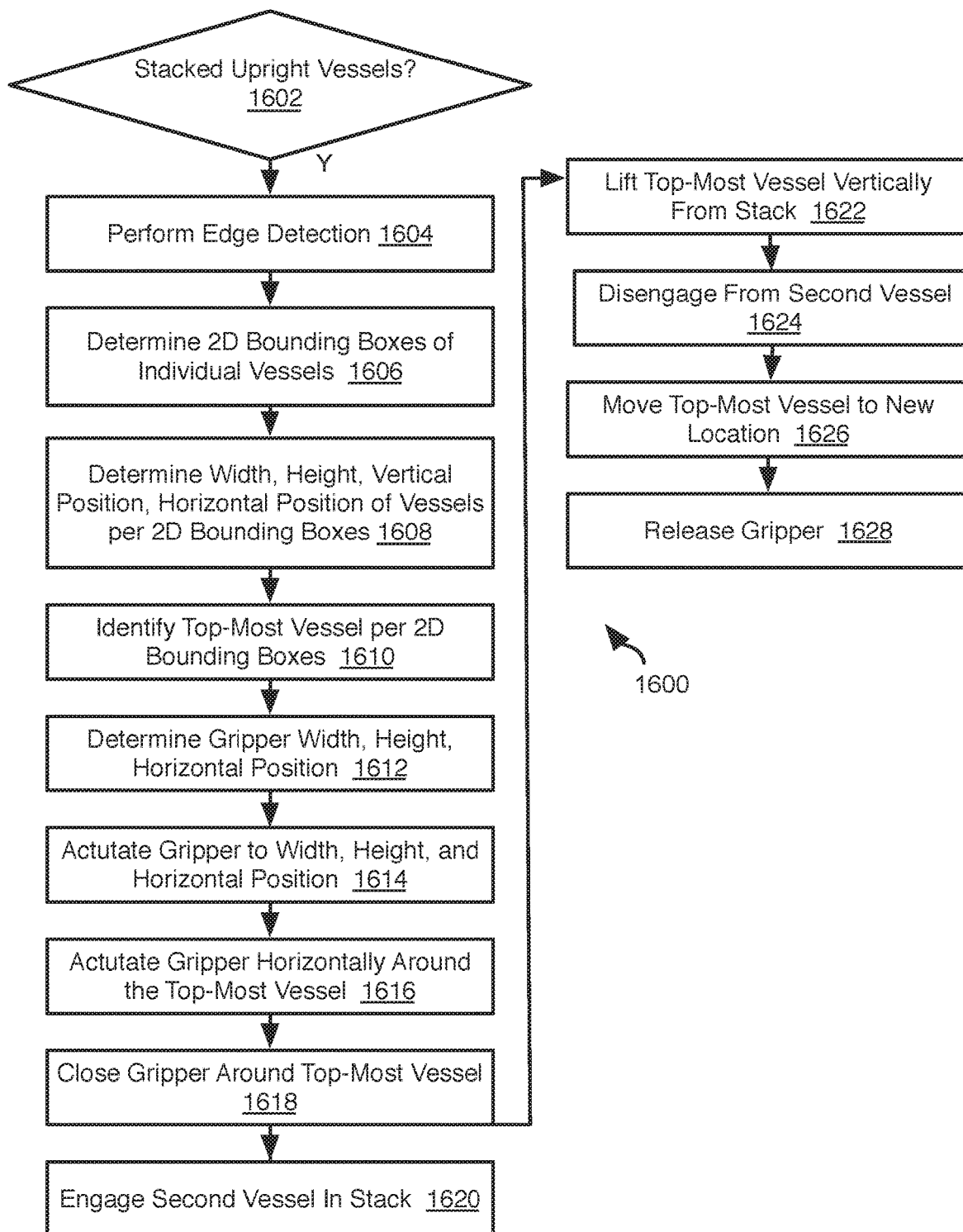
FIG. 16 is a process flow diagram of a method for manipulating stacked upright vessels in accordance with an embodiment of the present invention.

FIGS. 14, 15A, and 15B illustrate a method 1400 that may be executed by the image processor 106 and robotic controller 108 in order to process a vessel (102 in FIGS. 15A and 15B) determined 1402 to be in category (ii): a single vessel lying on its side and not within the threshold proximity of any other object.

The method 1400 may include estimating 1404 a width, height, orientation, and centroid location of an oriented 2D bounding box of the vessel. Calculating of the oriented 2D bounding box may be performed in the same manner as for category (i) as described above with respect to FIG. 10A.

The width and height may also be determined according to any of the approaches described above with respect to FIG. 10A. In particular, the vessel may be classified and its width and height retrieved from a database. Inasmuch as the object configuration category is a vessel on its side, it will be assumed that a long dimension (H in FIG. 15A) of the oriented 2D bounding box is equal to the longer of the width and height as retrieved from the database, which will be the height in the case of the illustrated cup.

Based on the known height substantially perpendicular to the surface (the width W in this case) and the known long dimension (the height H in this case) being oriented substantially parallel to the surface, the distance to the vessel and its angular position (vertical, horizontal) relative to the optical axis of one or more cameras may be determined in the same manner as for the method of FIG. 10A. The centroid location may be determined using this information in the same manner as for the method of FIG. 10A. The orientation may be determined using an image (M3, FIG. 15A) from a camera 104 looking down substantially perpendicular to the surface and calibrated with respect to the surface 400. The orientation of the oriented 2D bounding box will be apparent in such an image and may be estimated due to calibration of the camera 104 with respect to the surface 400 that relates vertices of the 2D oriented bounding box to horizontal positions in a plane parallel to the surface such that the angular orientation of the 2D oriented bounding box may be determined.

The method 1400 may then include selecting 1406, width, height, horizontal position, and orientation of the gripper 112 according to the width, height, orientation, and centroid location of the oriented 2D bounding box of the vessel. The finger separation width may be set to a multiple of the width W (e.g., 1.1 to 1.5), the height may be set to the width W (assuming a circular object) plus an offset such that fingers 114a, 114b will not be incident on the vessel when brought into position over it. The orientation may be selected as being vertical (see FIG. 15B) with the plane of movement of the fingers 114a, 114b oriented substantially vertically and intersecting the vessel at a position along the long dimension (H) of the oriented 2D bounding box and substantially perpendicular to the long dimension of the oriented 2D bounding box. The horizontal position may be placed over the vessel such that the gripper is positioned along the long dimension (H) of the oriented 2D bounding box, such as at the midpoint of the long dimension or at some offset from the midpoint. For example, the vessel shown is wider at its top and will be eventually placed upside down in a rack, the position along the long dimension may therefore be closer to the bottom, e.g. between 0.6 and 0.8 times the height H from the top.

The robotic controller 108 may invoke actuation of the robotic arm 110 and gripper 112 to the finger separation width, height, horizontal position and orientation selected at step 1406. The robotic controller 108 may then cause the gripper 112 to be lowered 1410 around the vessel and the fingers 114a, 114b closed 1412 around the vessel. The robotic controller 108 may then cause the robotic arm to move 1414 the vessel to a new location, which may include changing an orientation of the vessel (e.g., orienting it upside down for placement in a rack), and then causes the gripper to release 1416 the vessel. As for the method 10A, images from one more cameras 104 may be analyzed during steps 1408, 1410, 1412, and at least part of 1414 in order to verify that the vessel is positioned within the fingers 114a, 114b and is moving with the movement of the gripper 112.

FIGS. 16, 17A and 17B, 18A and 18B, and FIG. 19 illustrate a method 1600 for processing a cluster found 1602 to be stacked vessels (category (iii)) that are oriented substantially upright on the surface. The method 1600 may be executed by the image processor 106 and robotic controller 108.

Figure 19:
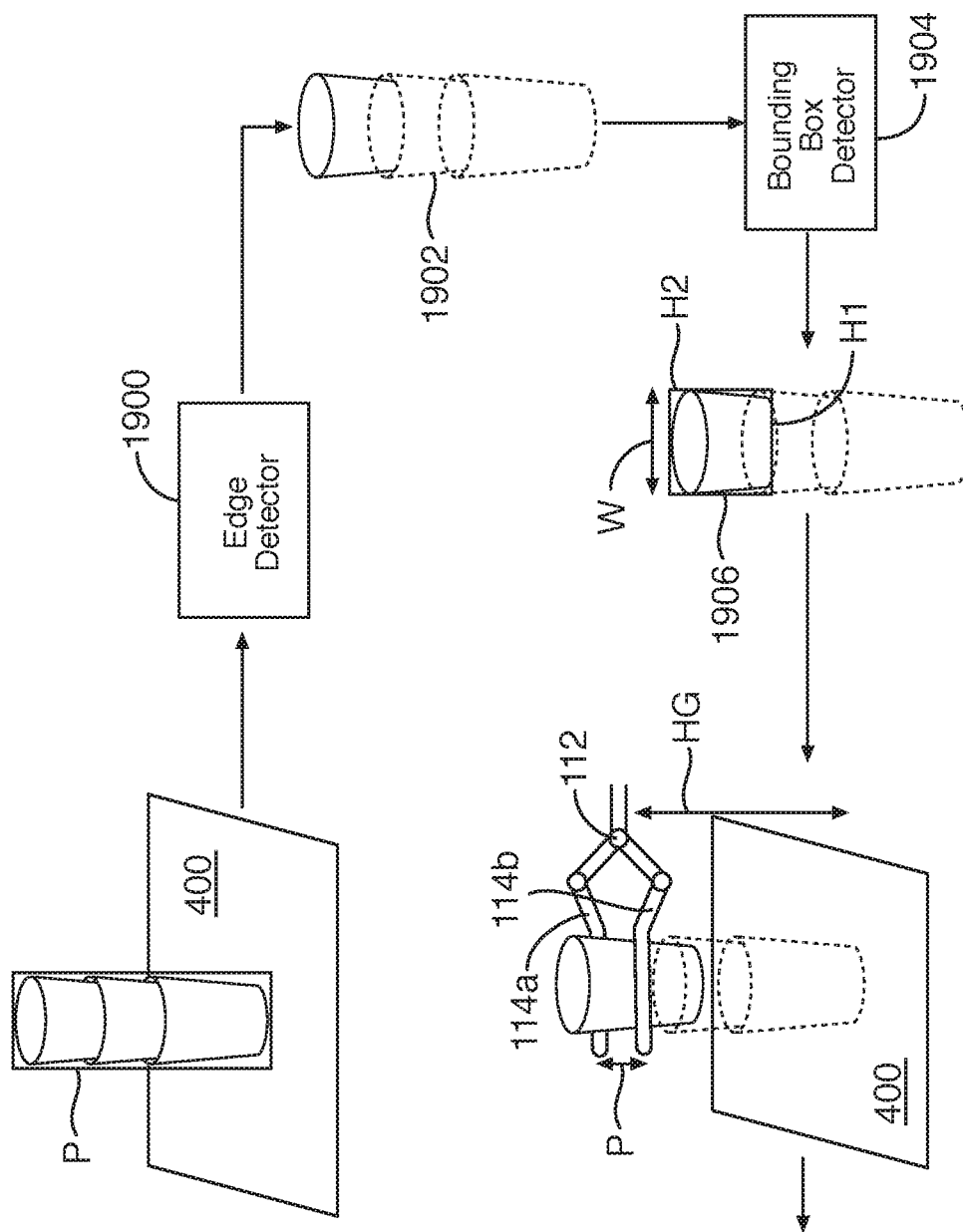
FIG. 19 illustrates the manipulation of stacked upright vessels in accordance with an embodiment of the present invention.

The method 1600 may include performing 1604 edge detection with respect to the image portion for the cluster (image P in FIG. 19). This may include performing Holistically-Nested Edge Detection (HED)

Edge detection may be performed by training a machine learning model, such as a CNN or other type of deep neural network (DNN), or other machine learning model. The machine learning model may be trained with annotated data that includes color images that have been annotated with edges by human annotators. For example, the images may be of stacks of cups or other vessels having their visible edges traced by the human annotator. For example, FIGS. 17A and 18A show images of cups whereas FIGS. 17B and 18B show just edges of the cups. FIGS. 17B and 18B indicate annotations that may be added to a figure and also illustrate what an output of the trained machine learning model would be for input images 17A and 18A, respectively.

Training of the machine learning model may be performed using any approach known in the art such as available libraries, TENSORFLOW (TensorFlow), PYTORCH (PyTorch), or other tool. The training algorithm seeks to minimize a loss function between the label (i.e., the binary edge map) and an estimated, binarized edge map, using the optimization algorithm built into TensorFlow or PyTorch.

When the machine learning model is used during grasping actions using the robotic arm 110 and gripper 112, the images captured by the calibrated cameras 104 are fed into the trained model and the outputs of the model are the edge maps including semantically meaningful edges for the given task as learned from human annotated data.

Edge detection may be performed using the approaches of the following references that are submitted herewith and incorporated herein by reference in their entirety:

Holistically-Nested Edge Detection(HED): foundation.org/openaccess/content_iccv_2015/papers/Xie_Holistically-Nested Edge Detection ICCV 2015 paper.pdf CASENet: Deep Category-Aware Semantic Edge Detection: pdfs.semanticscholar.org/1b61/41d3fbe8b97fd414ec931a47aa1d019347d9.pdf The method 1600 may further include determining 1606 oriented 2D bounding boxes of individual vessels in the stack (1906 in FIG. 19), such as using the edge map (1902 in FIG. 19) detected at step 1604. Detecting oriented 2D bounding boxes for individual vessels may be performed using a machine learning mode (bounding box detector 1904 in FIG. 19) trained for this task, such as in the same manner as the approach described with respect to FIG. 10A. However, the machine learning model may be trained using annotated edge maps, i.e. edge maps in that are further annotated with oriented 2D bounding boxes of each vessel in a stack with the loss function being a difference between oriented 2D bounding boxes generated by the machine learning model and the oriented 2D bounding boxes annotated onto a training image by a human annotator.

The method 1600 may further include determining 1608 some or all of a width, height, vertical position, and horizontal position (location in plane parallel to the surface 400 supporting the stack) of individual vessels in the stack using the oriented 2D bounding boxes. These values may be determined for the oriented 2D bounding boxes in the same manner in which these values are determined for the oriented 2D bounding box of an individual vessel as described above with respect to FIG. 10A. Inasmuch as vessels are partially occluded, the width of the oriented 2D bounding box as determined for a vessel from a database may be used to determine distance whereas the height may not be as relevant unless the non-occluded height is recorded in the database for nested vessels of a particular class. As shown in FIG. 19, determining a height of an individual vessel may include determining a height H1 corresponding to a bottom of the oriented 2D bounding box and a height H2 corresponding to a top of the oriented 2D bounding box, with H1 corresponding to the height H2 of the oriented 2D bounding box of a subsequent (lower) vessel in the stack.

The method 1600 may further include identifying 1610 a top-most vessel of the stack, e.g. the oriented 2D bounding box having the largest height (e.g., H2) as determined at step 1608. A gripper width, height, and horizontal position may be determined 1612 for the top most vessel, such as in the same manner as for an individual vessel as described above with respect to FIG. 10A. In particular, the height of the gripper may be selected to be a position between H1 and H2, e.g. (H1+H2)/2. As for the embodiment of FIG. 10A, the gripper position may be horizontally offset from the horizontal position of the centroid of the top-most vessel such that the gripper 112 may be moved to the position without the fingers 114a, 114b being incident on the top-most vessel.

The robotic actuator 108 may then actuate 1614 the robotic arm 110 and gripper 112 to move to the horizontal position, height (HG in FIG. 19), and finger separation width (WG in FIG. 19) as determined at step 1612 having the gripper oriented having the plane of movement of the fingers 114a, 114b substantially parallel to the surface 400. The robotic actuator 108 then cause 1616 the gripper 112 to move horizontally toward the top-most vessel until the top-most vessel is position between the fingers 114a, 114b as shown in FIG. 19. The robotic controller 108 may then invoke closing 1618 of the gripper fingers 114a, 114b around the top-most vessel.

The method 1600 may further include engaging 1620 a second vessel in the stack. The second vessel may be the vessel immediately below the top-most vessel with which the top-most vessel is nested or may be a different vessel in the stack, such as the lower-most vessel. Engaging 1620 the second vessel may include engaging an end effector, such as a second gripper with the second vessel. Accordingly step 1620 may include performing steps 1608-1618 with the second gripper with respect to the second vessel. The second gripper may be coupled to the same robotic arm 110. For example, the second gripper may be mounted below the first gripper 112 by a distance approximately (within 5%) equal to the difference between H1 and H2 for cups being processed using the system 100. In this manner, the second gripper will be at a vertical position to grasp the second vessel when the first gripper is positioned to grasp the top-most vessel. Engaging 1620 the second vessel may also be performed using an end effector of a different type then the gripper 112, such as a suction, magnetic, or other type of end effector.

The method 1600 may include actuating 1622 the robotic arm 110 to lift the top-most vessel from the stack while the second vessel is restrained from moving with the top-most vessel. At some point following lifting 1622, the second vessel may be disengaged 1624 as instructed by the robotic controller 108, such as by widening the fingers of the second gripper or otherwise disengaging the end effector used at step 1620.

The method 1600 may then include causing, by the robotic controller 108, the robotic arm 110 to move 1626 the top-most vessel to a new location, which may include inverting the top-most vessel. The robotic controller 108 then causes 1628 the gripper 112 to release the vessel at the new location, such as a dish rack. As for other methods disclosed herein, images from one or more cameras 104 may be analyzed during steps 1616-1622 and at least part of 1626 in order to verify that the vessel is positioned within the fingers 114a, 114b and is moving with the movement of the gripper 112.

The method 1600 may be executed repeatedly until all the vessels are removed. For example, the object configuration category may be determined again as described above after each vessel is removed until the cluster is no longer categorized as a stack. A single remaining vessel may then be removed per the method of FIG. 10A or FIG. 14.

Alternatively, the number of vessels (e.g. oriented 2D bounding boxes) in the stack may be counted and the method 1600 may be repeated one less than that number of times since the last cup will not be a stacked vessel and can be processed per the method of FIG. 10A or FIG. 14.

Figure 20:
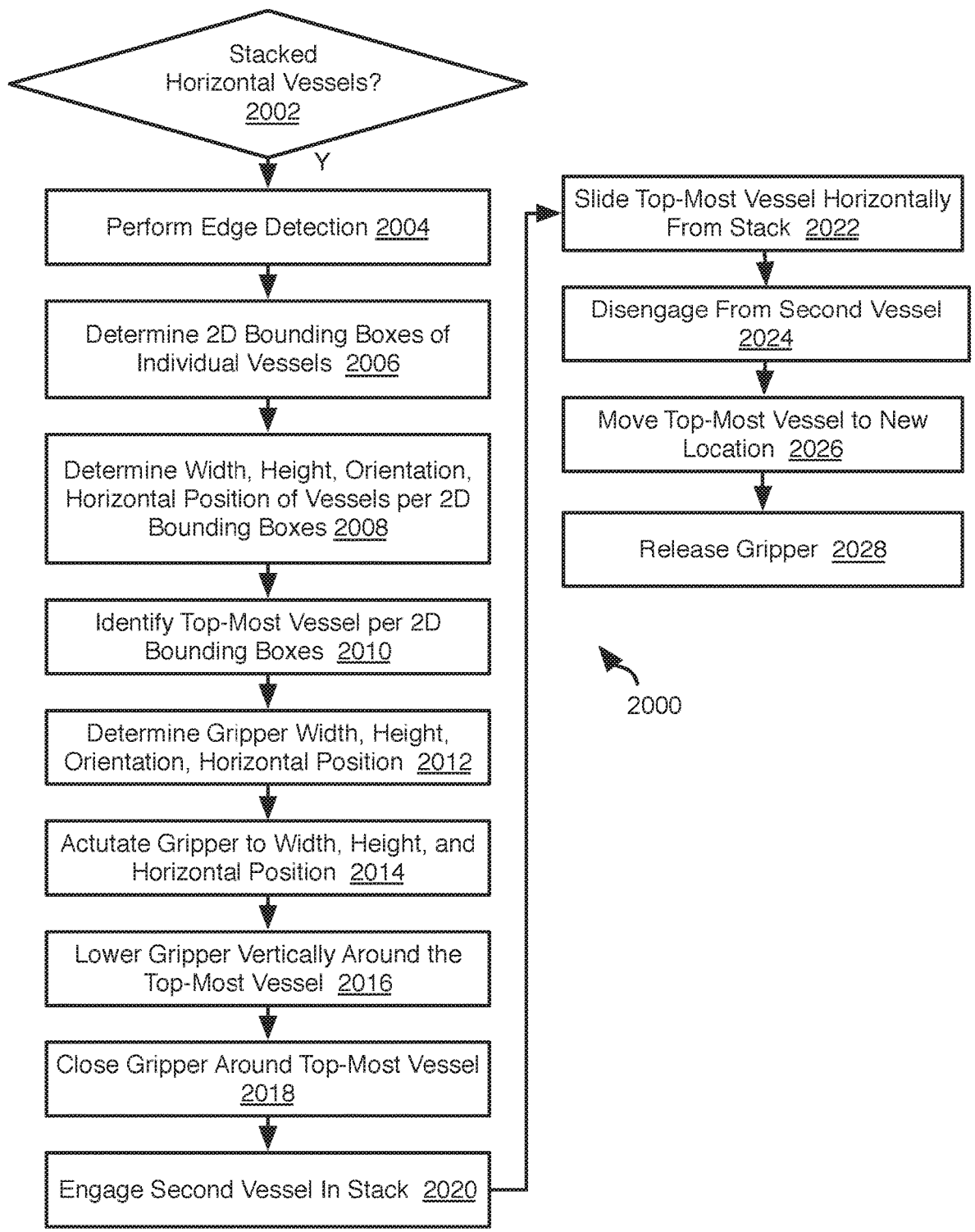
FIG. 20 is a process flow diagram of a method for processing stacked side-lying vessels in accordance with an embodiment of the present invention.
Figure 21:
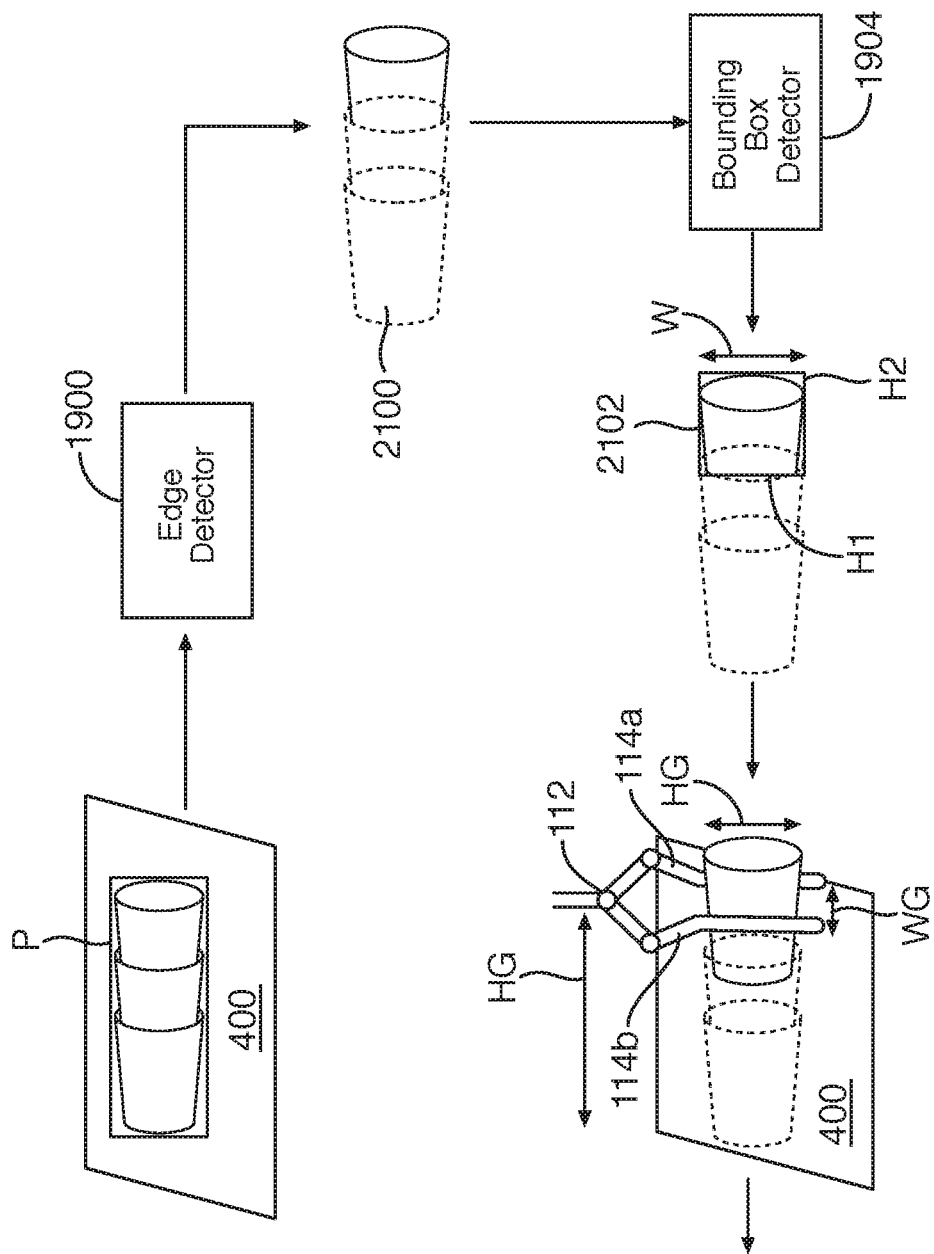
FIG. 21 illustrates the manipulation of stacked side-lying vessels in accordance with an embodiment of the present invention.
Figure 22:
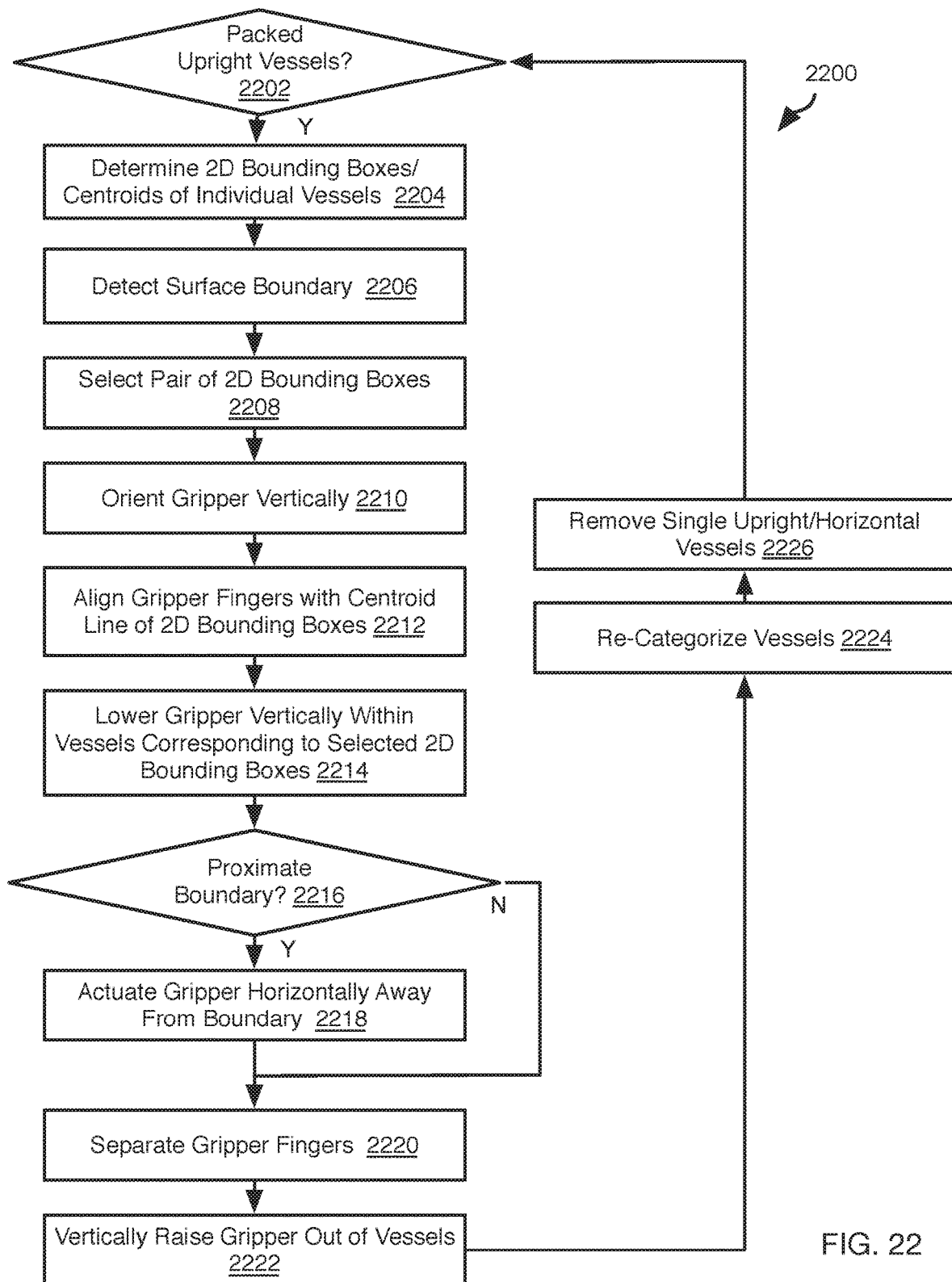
FIG. 22 is a process flow diagram of a method for preparing packed upright vessels for grasping in accordance with an embodiment of the present invention.

FIGS. 20 and 21 illustrate a method 2000 that may be executed when a cluster is found 2002 to be a stack of vessels (category (iii)) lying on its side. The method 2000 may be executed by the image processor 106 and robotic controller 108.

The method 2000 may include performing 2004 edge detection (2100, FIG. 21) and determining 2006 oriented 2D bounding boxes (2102, FIG. 21) of individual vessels from an image portion (P, FIG. 21) in the same manner as for the method 1600. The method 2000 may likewise include determining 2008 a width (W), height (H1, H2), orientation, and horizontal position of the oriented 2D bounding boxes of vessels in the stack. These values may be determined in the same manner as for a single vessel lying on its side as described above with respect to FIG. 14.

The method 2000 may include identifying 2010 the top-most vessel in the stack. For example, cups are normally flared such that the top end is wider than the bottom end. Likewise, the oriented 2D bounding box of the bottom-most cup will have larger height since it is not nested within another cup. Either of these properties may be used to identify the top most vessel: (a) the oriented 2D bounding box that is on an opposite end of the stack from the oriented 2D bounding box with the largest height or (b) the vessel at the end of the stack that is wider than the other end of the stack. In other embodiments, orientation is not a factor such that the top-most vessel may be selected arbitrarily as either end of the stack.

The method 2000 may further include determining 2012 a finger separation width (WG, FIG. 21), height (HG), orientation, and horizontal position according to the oriented 2D bounding box of the top-most vessel. These grasping parameters may be determined in the same manner as for an individual vessel lying on its side as described above with respect to FIG. 14.

The robotic controller may then actuate 2014 the robotic arm 110 and gripper 112 to achieve the finger separation width, gripper height, horizontal position, and orientation as determined at step 2012. As for the method of FIG. 14, the gripper will be oriented substantially vertically with the fingers 114a, 114b pointing downward and the plane of movement of the fingers 114a, 114b being perpendicular to the surface 400. The fingers may be positioned along the length of the stack at an intermediate position between the top of the top-most vessel and the top of the vessel in which the top-most vessel is nested.

The robotic controller 108 than causes 2014 the robotic arm 110 and gripper 112 to achieve the finger separation width, gripper height, horizontal position, and orientation as determined at step 2012. The robotic controller 108 then causes 2016, the robotic arm 110 to lower the gripper 112 around the top-most vessel and causes 2018 the gripper 112 to close around the top-most vessel.

The robotic controller 108 may also invoke a second end effector to engage 2020 a second vessel in the stack, which may be a second end effector or gripper and which may be mounted to the same robotic arm 110 or a second robotic arm. A second gripper may have any of the configurations noted above with respect to the method 1600. Engaging the second vessel may be performed by performing some or all of steps 2010-2018 except that it is the second vessel rather than the top-most vessel that is identified 2010 and otherwise processed.

The method 2000 may further include the robotic controller 108 causing 2022 the robotic arm 110 to slide the top-most vessel horizontally from the stack while the second vessel is restrained from moving with the top-most vessel. At some point after the top-most vessel is removed from the stack, the robotic controller 108 may invoke 2024 disengaging of second vessel from the second gripper or other end effector engaged with it. The method 2000 may include the robotic controller 108 invoking the robotic arm 110 to move 2026 the top-most vessel to a new location, which may include inverting the top-most vessel, and causing the gripper 112 to release 2028 the vessel at the new location.

As for other methods disclosed herein, images from one or more cameras 104 may be analyzed during steps 2016-2022 and at least part of 2026 in order to verify that the vessel is positioned within the fingers 114a, 114b and is moving with the movement of the gripper 112.

FIGS. 22 and 23A to 23E illustrate a method 2200 that may be executed when a cluster is found 2202 to be packed vessels (category (iv)) that are upright. The method 2200 may be executed by the image processor 106 and robotic controller 108.

The method 2200 may include determining 2204 oriented 2D bounding boxes and centroid positions of vessels in the pack. Method 2200 is described with respect to oriented 2D bounding boxes but may function well with non-oriented bounding boxes.

This may be performed in the same manner as for the method 10A. In particular, using a top-down viewing camera, that is calibrated with respect to the surface 400, the horizontal positions of the centroids of the vessels in the pack may be readily estimated. As will be discussed below, packed vessels may be separate from one another prior to gripping such that vessels are graspable from the side (FIG. 10A) or from above (FIG. 14).

The method 2200 may further include determining 2206 if there is a boundary within a threshold proximity of any vessel in the packed vessels, such as an edge of the surface 400, a wall 2300 (see FIG. 23D), side of a tub in which the vessels are located (see FIG. 23E), or other boundary. In some embodiments, locations of such boundaries are determined at the time of calibration and need not be performed during execution of the method 2200.

The method 2200 may include selecting 2208 a pair of oriented 2D bounding boxes, such as a pair that are at an edge of the packed vessels rather than being surrounded by other vessels of the packed vessels. The pair may also be selected as being adjacent an open area that is not occupied by other objects.

The robotic controller 108 may then invoke orienting 2210 of the gripper 112 substantially vertically with the fingers 114a, 114b pointing downwardly and the distal end of the fingers 114a, 114b being vertically above the pair of vessels. The gripper may then be substantially aligned with a line connecting the centroid positions (determined at step 2204) of the pair of grippers ("the centroid line"), e.g. the plane of movement of the fingers 114a, 114b substantially parallel to the centroid line. The fingers 114a, 114b may be separated, such as by a distance approximately (+/−10%) equal to the width of one of the oriented 2D bounding boxes of the pair of vessels.

Figure 23A:
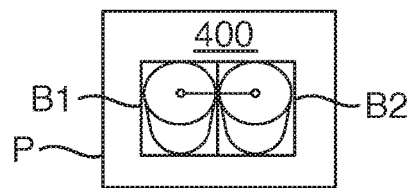
FIGS. 23A to 23E illustrate the manipulating of packed vessels to prepare for grasping in accordance with the method of FIG. 22.
Figure 23B:
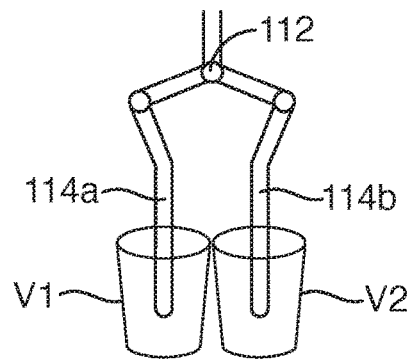
Figure 23C:
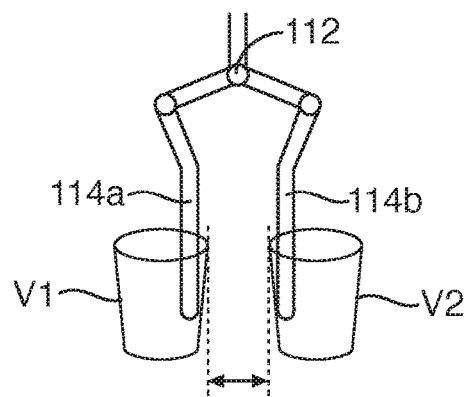
Figure 23D:
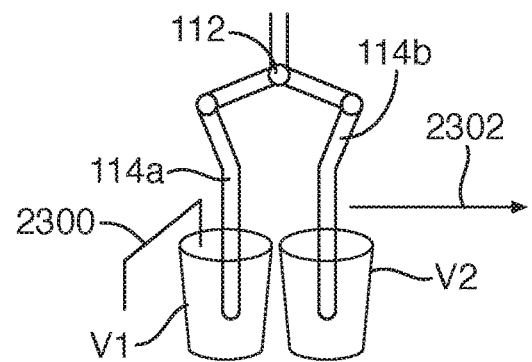
Figure 23E:
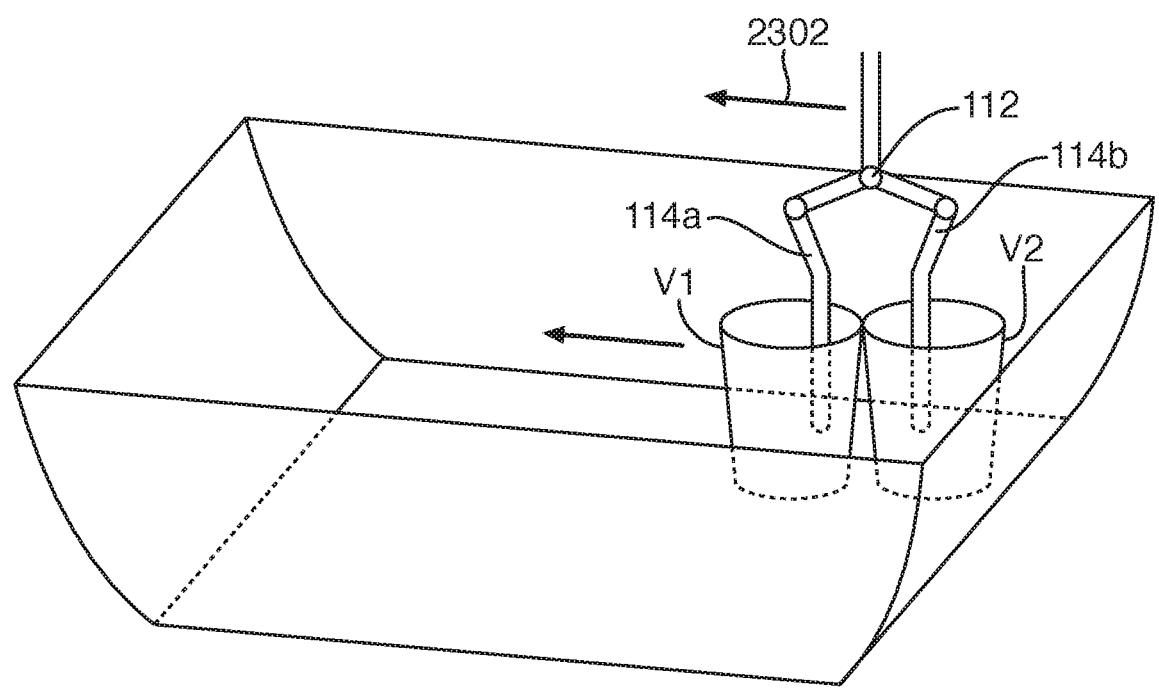

The robotic controller 108 may then cause 2214 the robotic arm 110 to lower the gripper 112 such that each finger 114a, 114b is inserted within one vessel of the pair vessels (see fingers 114a, 114b and vessels V1, V2, FIGS. 23A and 23B). The finger 114a may be inserted to a depth that will not result in tipping of the vessel, e.g., such that the distal end of the finger is no more than 0.5 H above the surface 400, where H is the estimated height of the vessel (such as determined from the 2D (oriented or not) bounding boxes B1 and B2 of the vessels V1 and V2 as described elsewhere herein.

The method 2200 may further include evaluating 2216 whether the selected pair of vessels is proximate to a boundary (e.g., within a proximity threshold for boundaries for thresholds or for proximity in general) such that one or both of the vessels cannot be grasped by the gripper 112. If so, then the robotic controller 108 causes 2218 the robotic arm 110 to shift the pair of vessels in a direction 2302 away from the boundary, such as by a distance greater than the proximity threshold or until the positions of the oriented 2D bounding boxes of both vessels are not within the threshold proximity to the boundary as verified using images from the cameras 104 to determine the current location of the oriented 2D bounding boxes of the pair of vessels.

The robotic controller 108 may cause the gripper fingers 114a, 114b to close and grip the vessels during step 2218 to avoid tipping the vessels. Step 2218 may include identifying open space on the surface 400 according to one or more images from the cameras 104 and urging the vessels toward that open space. The method 2200 may further include the robotic controller 108 instructing the gripper 112 to separate 2220 the fingers 114a, 114b such that the vessels of the pair are moved apart (see FIG. 23C). The amount of widening may be (a) a maximum amount of widening permitted by the geometry of the gripper 112, (b) a predefined amount, (c) until the oriented 2D bounding boxes of the pair of vessels are no longer within the threshold proximity of one another (e.g., the proximity used to determine that vessels should be clustered, see discussion of FIG. 6) as indicated in images captured using the one or more cameras 104. For example, the cameras 104 may capture images throughout the widening of the fingers and the widening step may stop as soon as an image is received in which the oriented 2D bounding boxes of the vessels are no longer within the threshold proximity of one another, i.e. the vessels are sufficiently separated to be gripped individually by the gripper according to the method of FIG. 10A.

The robotic controller 108 may then instruct 2222 the robotic arm 110 to raise the fingers 114a, 114b of the gripper 112 out of the pair of vessels (e.g., higher than the height of the vessels plus some additional clearance). Various processing steps may be performed following step 2222. For example, one or more images of the objects on the surface may be captured using the one or more cameras and clusters may be identified and categorized 2224 as described above with respect to FIG. 6. In some embodiments, single upright vessels or single side-lying vessels are removed 2226 and if any clusters are found 2202 to remain that include packed upright vessels, processing continues at step 2204. In other embodiments, single upright or side-lying vessels are not removed but rather the remaining packed vessels are spread apart according to steps 2208-2222 prior to gripping and removing individual vessels.

The approach by which nudging according to the methods of FIGS. 22 and 23A to 23D is implemented may take advantage of the approaches described in the following references that are submitted herewith and incorporated herein by reference in their entirety:

Learning Synergies between Pushing and Grasping with Self-supervised Deep
  Reinforcement
  Learning arxiv.org/pdf/1803.09956.pdf
  More than a Million Ways to e Pushed: A High-Fidelity Experimental Dataset of Planar Pushing arxiv.org/abs/1604.04038
  A probabilistic data-driven model for planar pushing arxiv.org/abs/1704.03033

The teachings of these references may also be used to implement the other nudging operations of FIGS. 24 through 31B.

Figure 24:
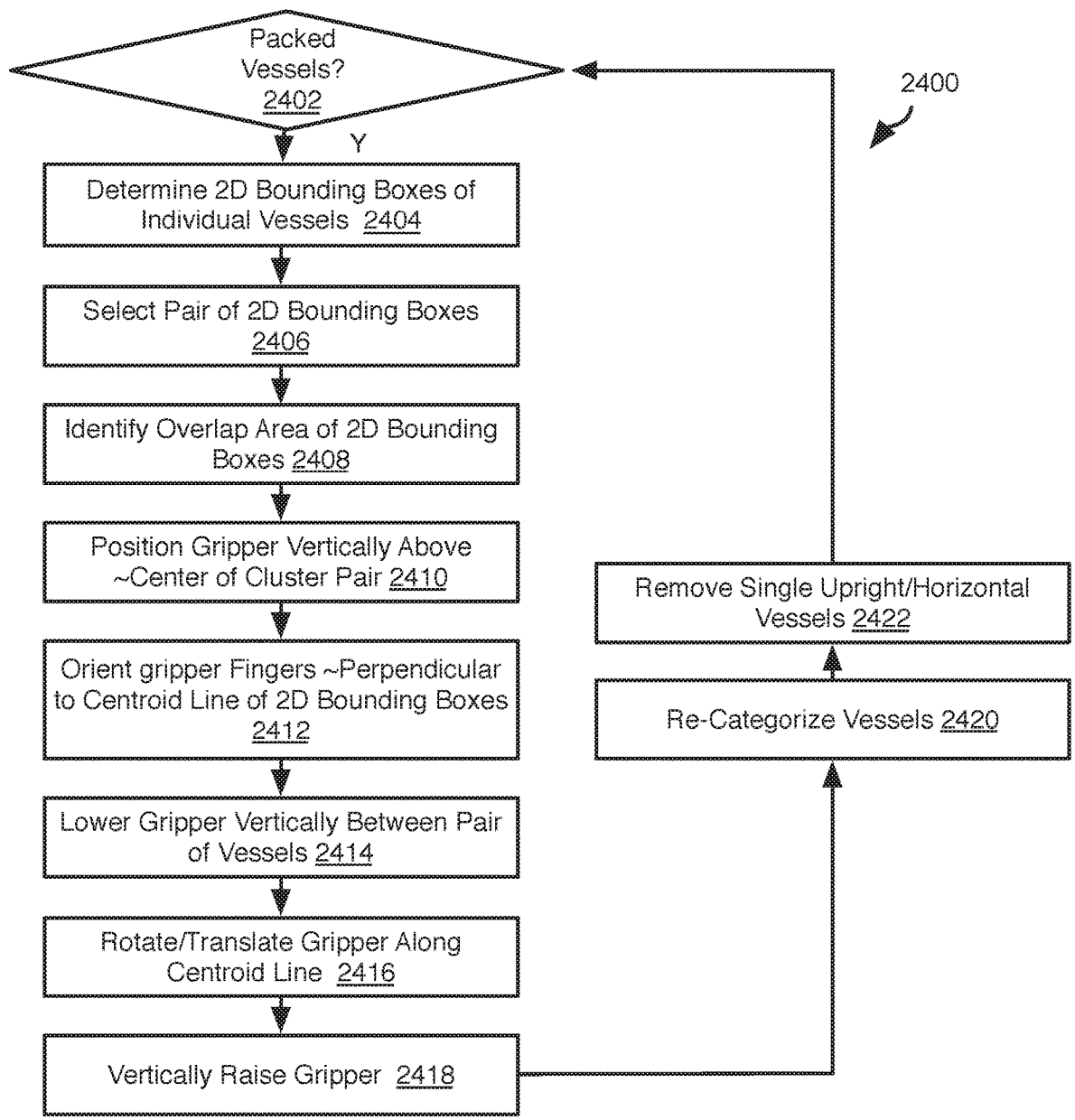
FIG. 24 is a process flow diagram of another method for preparing packed upright vessels for grasping in accordance with an embodiment of the present invention.
Figure 25A:
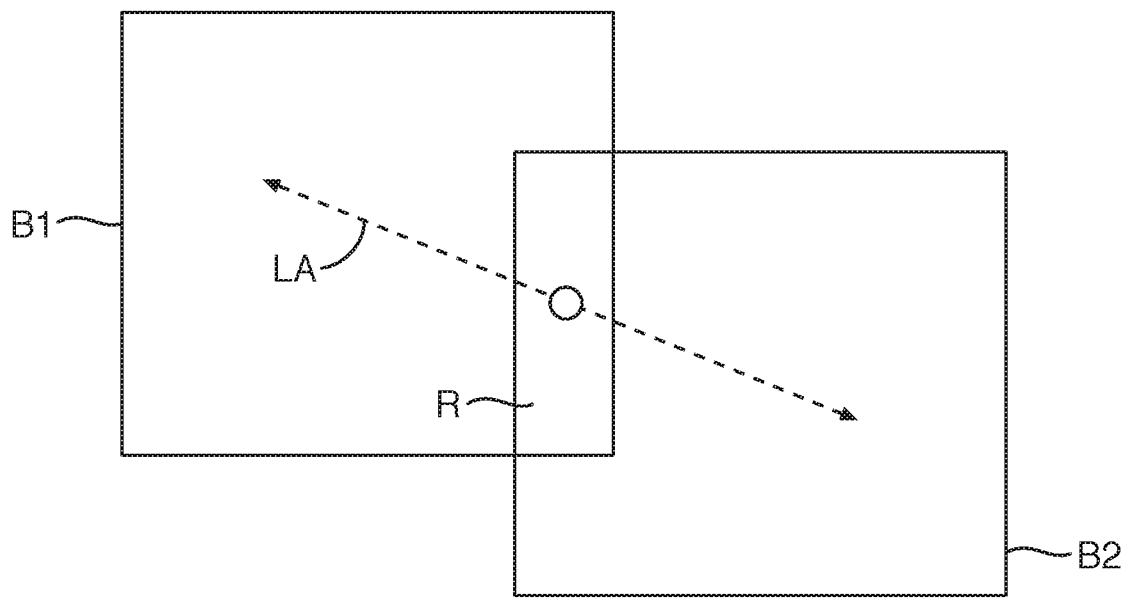
FIGS. 25A and 25B illustrate the manipulating of packed vessels to prepare for grasping in accordance with the method of FIG. 24.
Figure 25B:
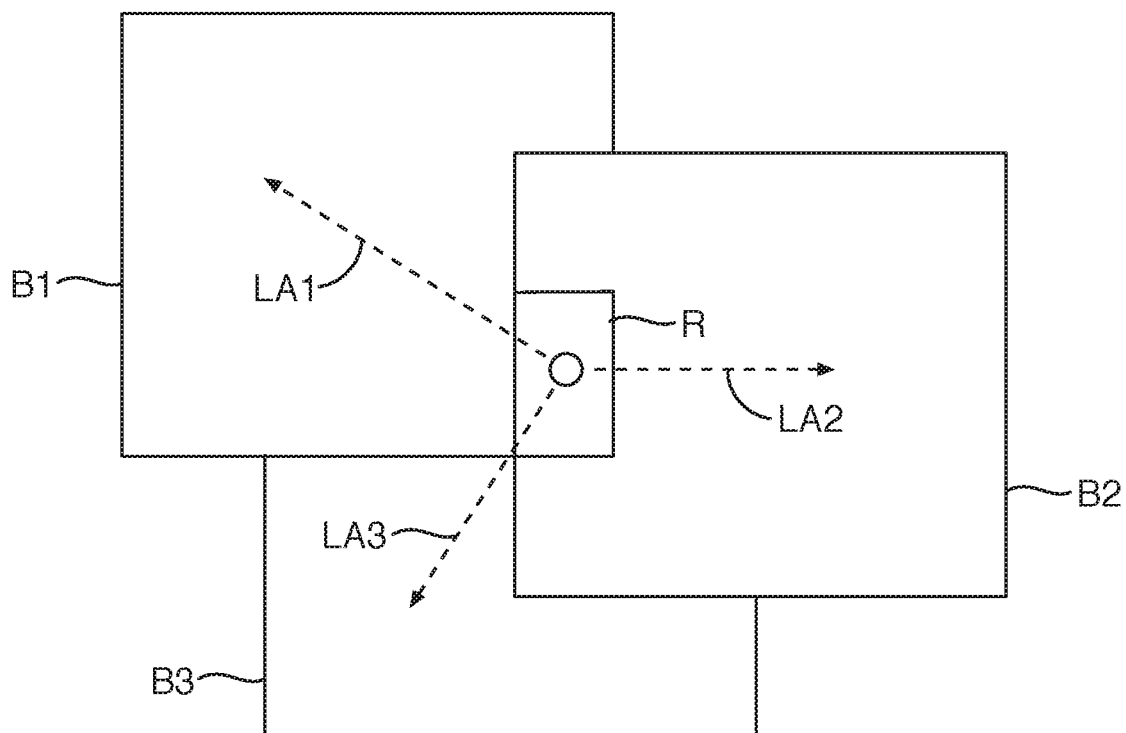

FIGS. 24, 25A, and 25B illustrate a method 2400 that may be executed when a cluster is found 2402 to be packed vessels (category (iv)) that may include vessels that are upright or side-lying. The method 2400 may be executed by the image processor 106 and robotic controller 108.

The method 2400 may include determining 2404 oriented 2D bounding boxes of the vessels in the cluster and selecting 2406 a pair of oriented 2D bounding boxes that are overlapping. Method 2400 is described with respect to oriented 2D bounding boxes but may function well with non-oriented bounding boxes instead.

The pair of oriented 2D bounding boxes (and their corresponding pair of vessels) may be selected 2406 as being at an edge of the cluster and not surrounded by other vessels. The method 2400 may include identifying 2408 an overlapped region (R in FIG. 25A) between the pair of oriented 2D bounding boxes (B1, B2 in FIG. 25A).

The method 2400 may further include the robotic controller instructing the robotic arm 110 and gripper 112 to achieve 2410 a position horizontally aligned with and vertically above the region R and to orient 2412 the gripper substantially perpendicular to the centroid line of the pair of oriented 2D bounding boxes, i.e. the axis of rotation of the fingers 114a, 114b substantially parallel to the centroid line. The fingers 114a, 114b may be in either a closed or opened position. An open position may enable the fingers 114a, 114b to be positioned on either side of a contact point between the pair of vessels.

The robotic controller 108 may then instruct the gripper to lower 2414 vertically into the region between the pair of vessels, for example such that the gripper fingers 114a, 114b are slightly (1 to 5 mm) above the surface 400. The gripper 112 may then be moved in one or more ways that will separate the pair of vessels. For example, the robotic controller 108 may instruct the robotic arm 110 to rotate 2416 the gripper 112 with the fingers 114a, 114b being spread apart such that the fingers 114a, 114b are incident on the pair of vessels and urge them apart. The robotic controller 108 may instruct the robotic arm 110 to move 2416 the gripper 112 in one or both directions along a line of action (LA, FIG. 25A) substantially parallel to the centroid line effective to urge the pair of vessels apart, such as by an amount at least as large as the threshold proximity required to cluster objects together as defined above with respect to FIG. 6. The amount of movement along the centroid line may be performed until images captured from the cameras 104 indicate that the oriented 2D bounding boxes of the pair of vessels are no longer within the threshold proximity from one another.

The method 2400 may then include vertically raising 2418 the gripper such that the gripper is above the vessels of the pair of vessels (e.g., the height of the vessels plus some clearance). Various processing steps may be performed following step 2418. For example, one or more images of the objects on the surface may be captured using the one or more cameras and clusters may be identified and categorized 2420 as described above with respect to FIG. 6. In some embodiments, single upright vessels or single side-lying vessels are removed 2422 and if any clusters are fond 2402 to remain that include packed upright vessels, processing continues at step 2404. In other embodiments, single upright or side-lying vessels are not removed but rather the remaining packed vessels are spread apart according to steps 2406-2418 prior to gripping and removing individual vessels.

FIG. 25B illustrates a case in which three vessels have their corresponding bounding boxes B1, B2, and B3 overlapping in a region R. This case may be handled by selecting one pair of 2D bounding boxes (B1 and B2, B2 and B3, or B1 and B3) and processing it according to the method 2400. This case may also be processed by inserting the gripper into the region R as for the method 2400 and moving the gripper along one or more lines of action LA1, LA2, LA3 to separate the vessels represented by the bounding boxes. The lines of action LA1, LA2, LA3 may extend from the region R substantially (within 5 degrees) toward centroids of the 2D bounding boxes B1, B2, and B3, respectively.

Figure 26:
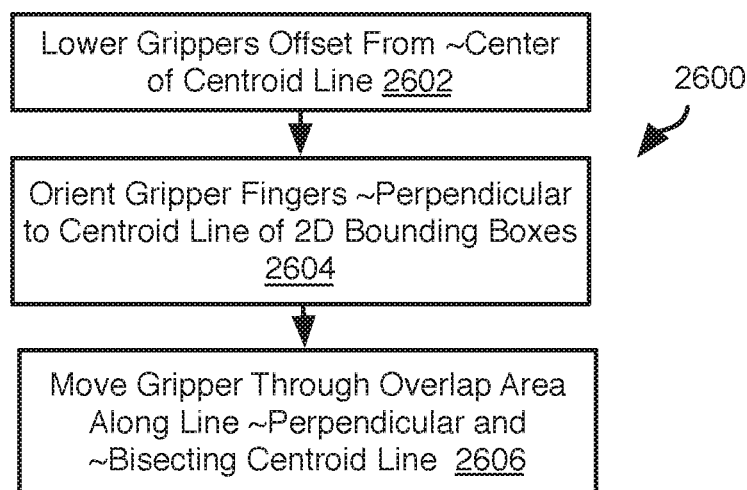
FIG. 26 is a process flow diagram of an alternative movement for separating packed vessels in accordance with an embodiment of the present invention.
Figure 27:
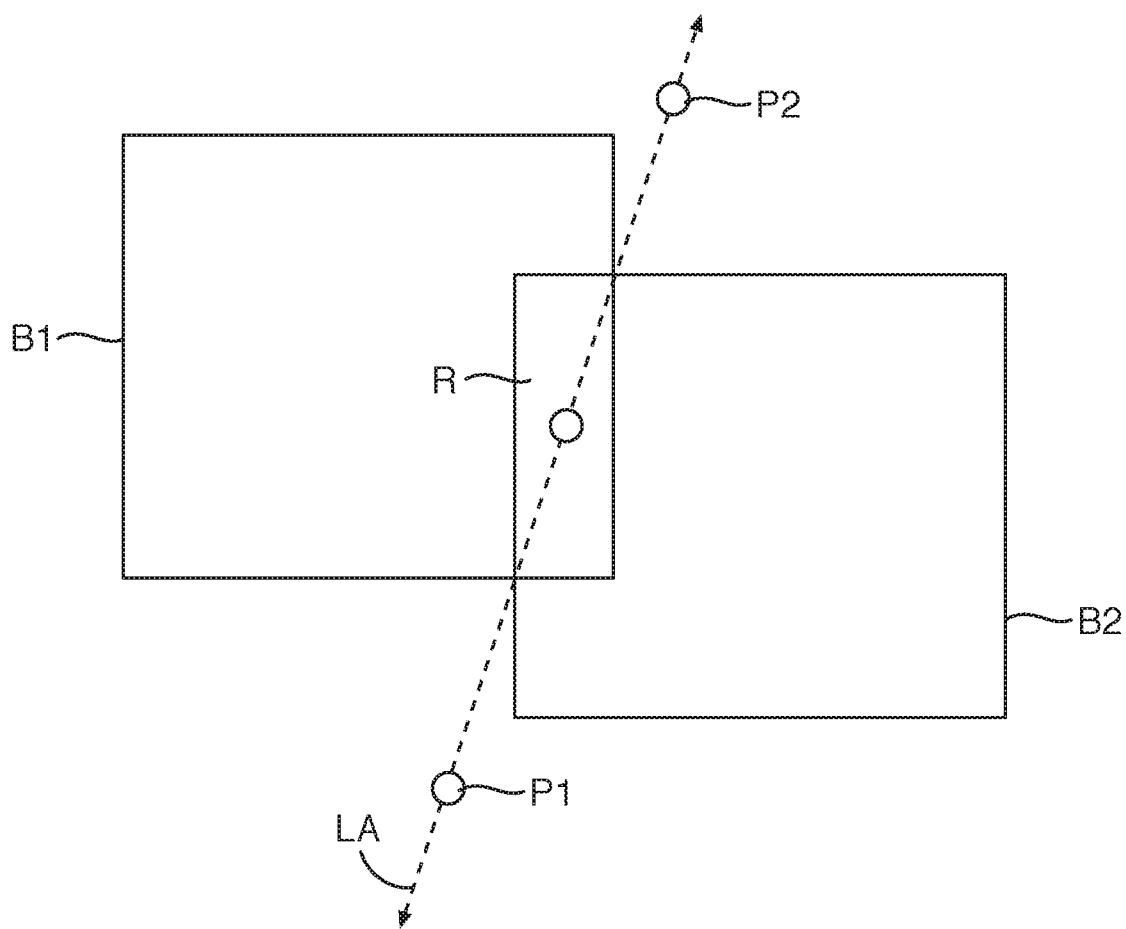
FIG. 27 is a diagram illustrating execution of the movement of FIG. 26.
Figure 28:
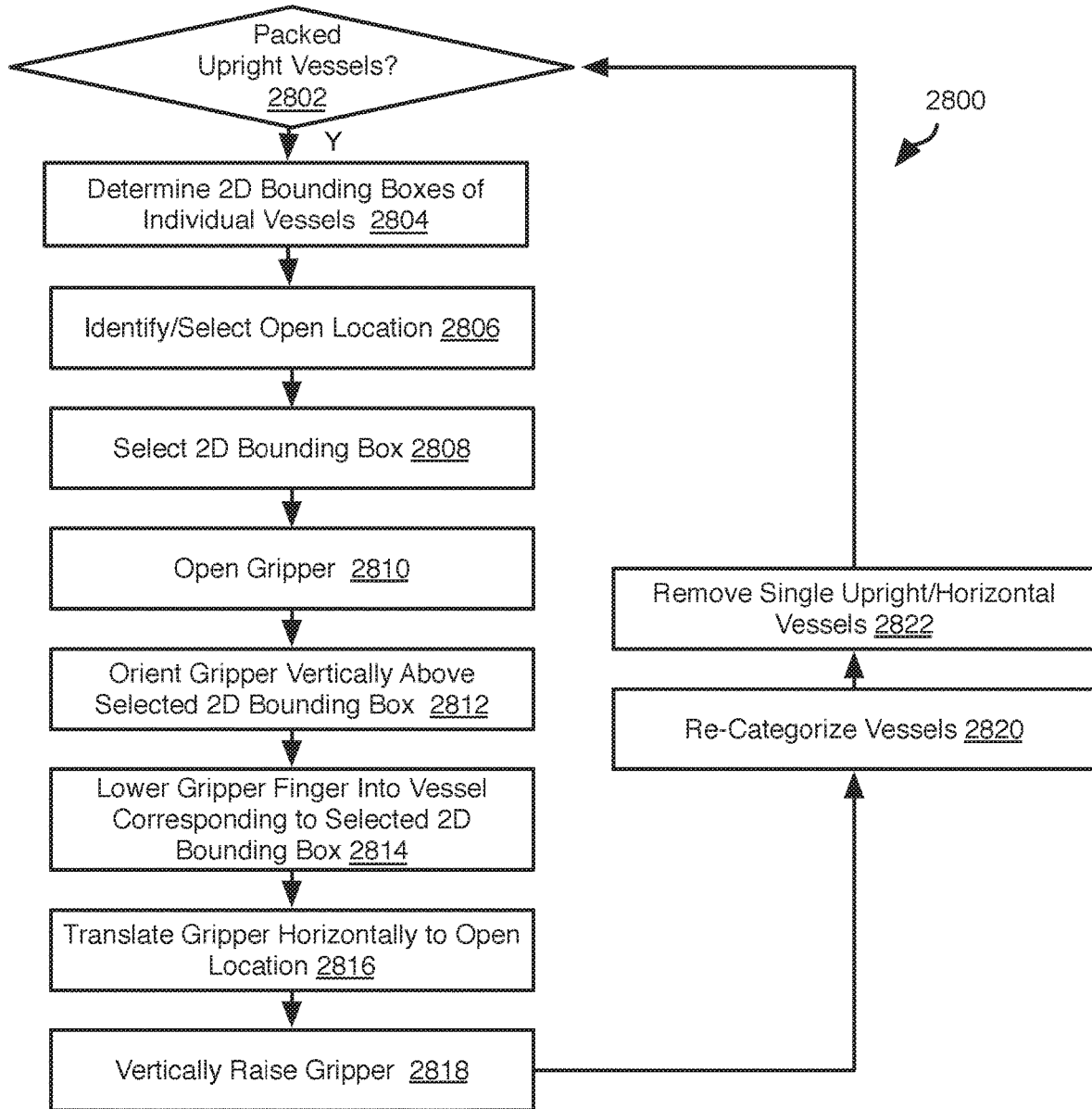
FIG. 28 is a process flow diagram of another method for preparing packed vessels for grasping in accordance with an embodiment of the present invention.

FIGS. 26 and 27 illustrate an alternative method 2600 that may be performed in the place of steps 2412-2416 of the method 2400 in order to separate a pair of vessels having overlapping oriented 2D bounding boxes or that are otherwise too close to one another to be grasped by the gripper 112. The method 2600 may include the robotic controller 108 invoking lowering 2602 of the gripper 112 oriented substantially vertically with the fingers 114a, 114b pointing downward and slightly above the surface, e.g. 1 to 5 mm from the surface offset. The griper is lowered at a point P1 (FIG. 27) that is offset from region R such that the gripper 112 is not incident on the vessels represented by the 2D bounding boxes B1 and B2. The robotic controller 108 may cause the grippers to be oriented substantially perpendicular to the centroid line of the bounding boxes B1 and B2, e.g. the axis of rotation of the fingers 114a, 114b being substantially parallel to the centroid line. The fingers 114a, 114b may be closed or spread apart.

The robotic controller 108 then instructs the robotic arm 110 to move 2606 the gripper horizontally through the region R along a line of action LA that is substantially perpendicular to the centroid line of boxes B1 and B2 and that intersects the centroid line approximately (within 10% of the length of the centroid line) at its midpoint. The robotic controller 108 may instruct movement of the gripper from point P1 to a point P2 that is on an opposite side of the region R than the point P1. The point P2 may be offset such that the gripper is not touching either of the vessels corresponding to boxes B1 and B2. Processing may then continue as described above with respect to FIG. 24, such as starting from step 2418 or 2420.

FIGS. 28 and 29A to 29C illustrate a method 2800 that may be executed when a cluster is found 2802 to be packed vessels (category (iv)) that are upright. The method 2800 may be executed by the image processor 106 and robotic controller 108.

The method 2800 may include determining 2804 oriented 2D bounding boxes of the vessels in the cluster and identifying 2806 one or more open areas around the cluster. Method 2800 is described with respect to oriented 2D bounding boxes but may function well with non-oriented bounding boxes. In particular, open areas that are immediately adjacent the cluster and adjoining the oriented (or not) 2D bounding boxes of the vessel cluster. For example, as shown in FIG. 29, bounding boxes B1, B2, and B3 are surrounded by free area F of the surface 400 that is not occupied by another object. The open area may be identified by evaluating the 2D bounding boxes of all clusters and masking out areas of the surface occupied by clusters of objects identified as described hereinabove. The area of the surface 400 that is not masked is therefore open.

Figure 29A:
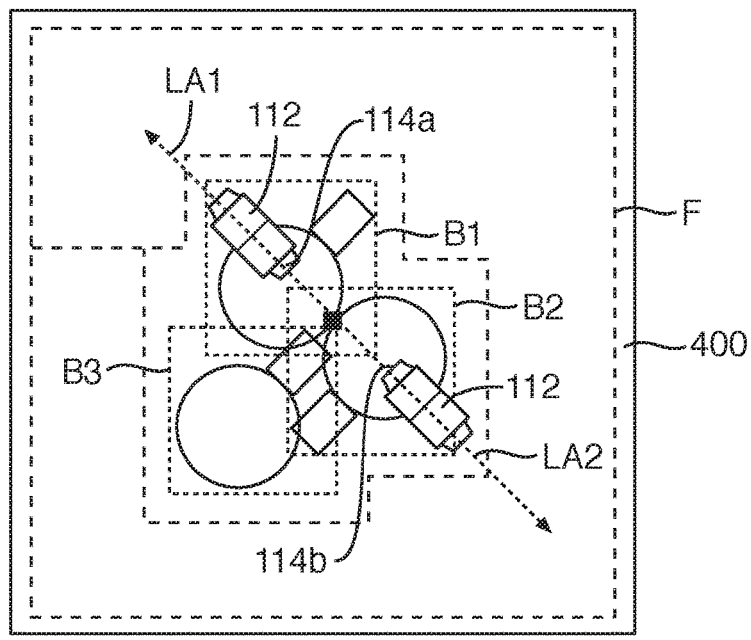
FIGS. 29A to 29C illustrate execution of the method of FIG. 28.

The method 2800 may include selecting 2808 one of the oriented 2D bounding boxes of the cluster to move. For example, as shown in FIG. 29A, either of B1 and B2 may be selected inasmuch as they are close to large open areas and therefore have many options for movement out of the cluster.

The method 2800 may further include the robotic controller 108 instructing the gripper 112 to open 2810 and the robotic arm 110 and gripper 112 to achieve 2812 a position in which one finger 114a, 114b ("the aligned finger") of the gripper 112 is horizontally aligned with and vertically above the selected bounding box. The robotic controller 108 that causes the robotic arm 110 to lower 2814 the aligned finger into the vessel corresponding to the selected bounding box and to translate 2816 the gripper and the vessel horizontally to a portion of the open area identified at step 2806. The robotic controller 108 that invokes raising 2818 of the gripper such that the aligned finger is vertically above the vessel (e.g., the height of the vessel plus some clearance).

Various processing steps may be performed following step 2818. For example, one or more images of the objects on the surface may be captured using the one or more cameras and clusters may be identified and categorized 2820 as described above with respect to FIG. 6. In some embodiments, single upright vessels or single side-lying vessels are removed 2822 and if any clusters are fond 2802 to remain that include packed upright vessels, processing continues at step 2804.

Figure 29B:
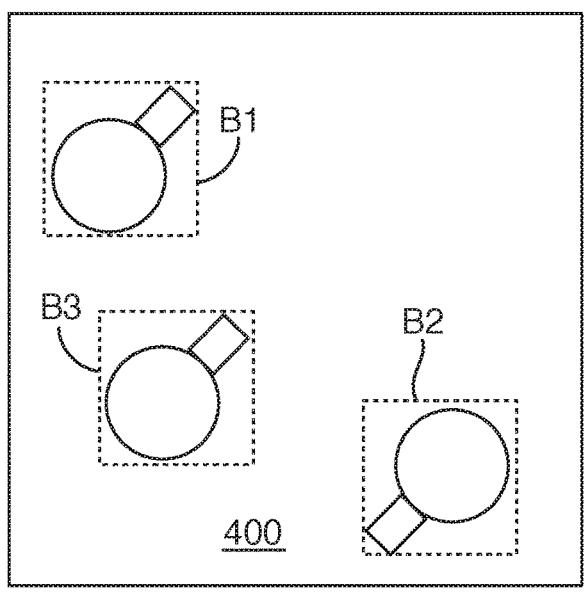
Figure 29C:
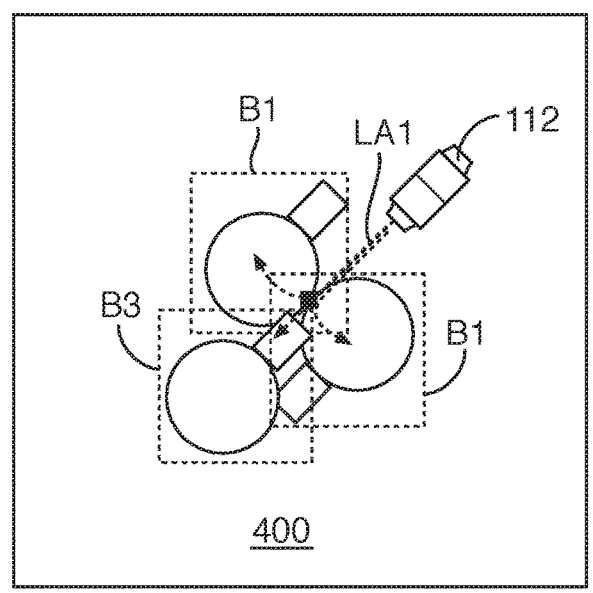

In other embodiments, single upright or side-lying vessels are not removed but rather the remaining packed vessels are spread apart according to steps 2806-2818 prior to gripping and removing individual vessels. For example, as shown in FIG. 29B, vessels corresponding to bounding boxes B1 and B2 are both moved according to the method 2800 prior to picking up any of the vessels. The vessels corresponding to B1, B2, and B3 may then be picked up as individual upright vessels (see FIG. 10A and corresponding description).

Note that the method 2800 may further include performing any other of the moves for separating packed vessels discussed herein. For example, referring to FIG. 29C, vessels for 2D bounding boxes B1 and B2 may be separated by moving the gripper along line of action LA that substantially bisects and is substantially perpendicular to the centroid line of the 2D bounding boxes B1 and B2 according to the method 2600 described above with respect to FIGS. 26 and 27. The movements of FIGS. 24 and 25A to 25B may also be performed.

Figure 30:
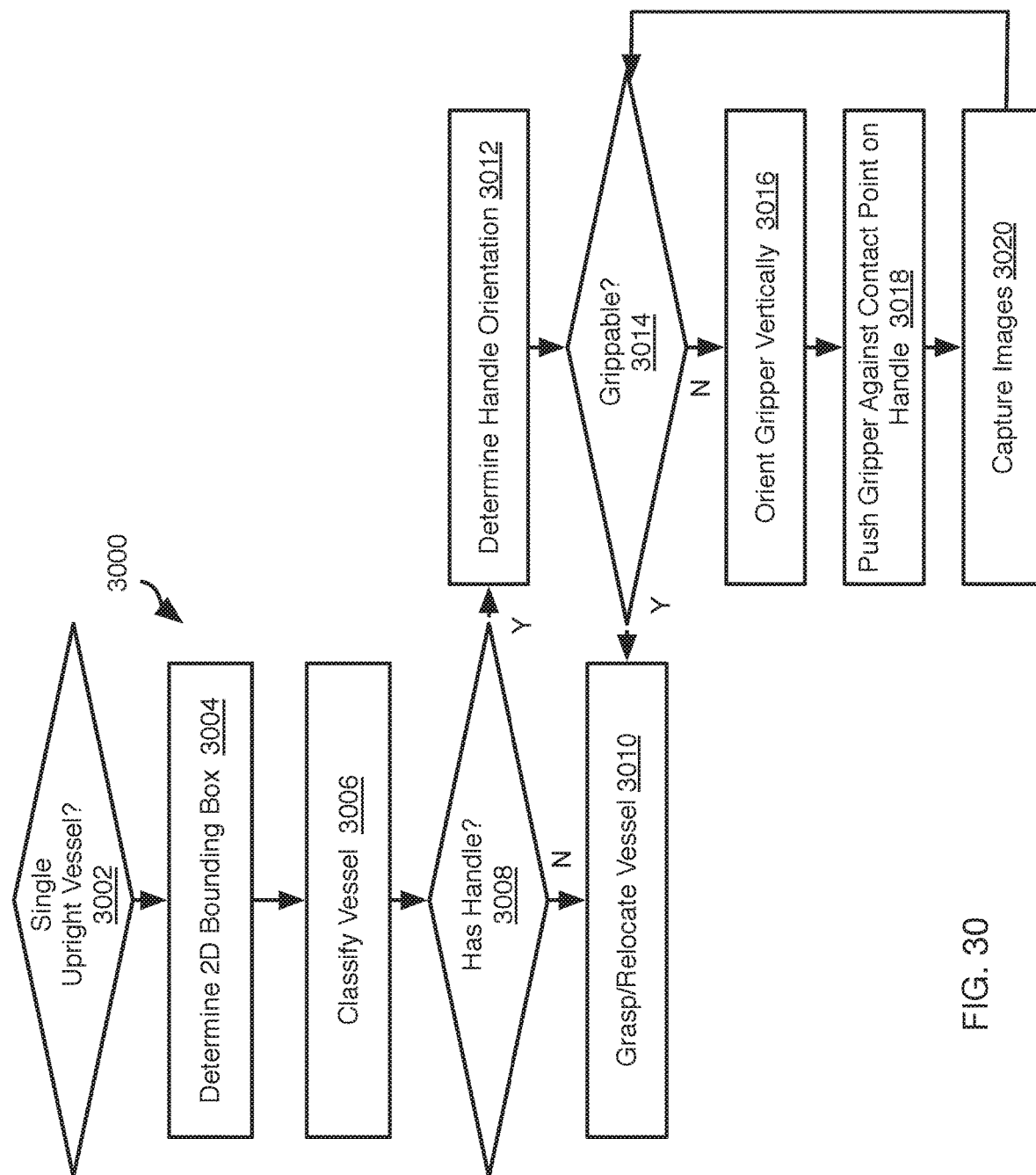
FIG. 30 is a process flow diagram of a method for reorienting vessels with handles to facilitate grasping in accordance with an embodiment of the present invention.
Figure 31A:
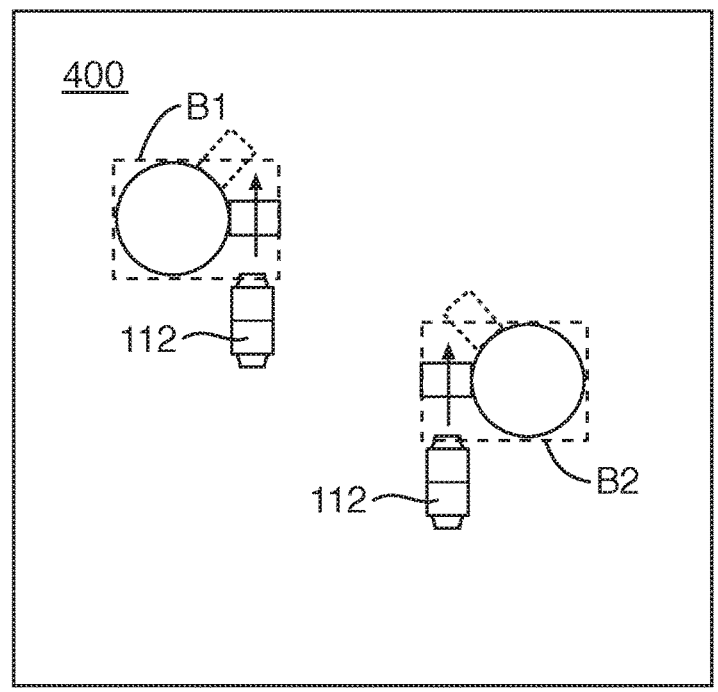
FIGS. 31A and 31B illustrate execution of the method of FIG. 30.
Figure 31B:
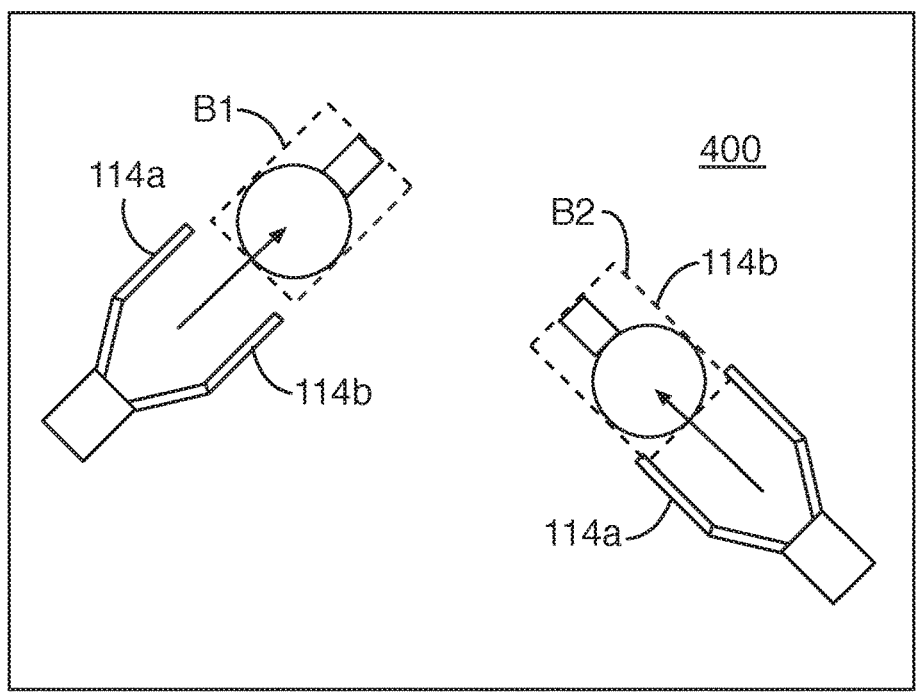

FIGS. 30, 31A, and 31B illustrate a method 3000 that may be executed by the imaging system 106 and robotic controller 108 when an object is found 3002 to be a single upright vessel (category (i)). The method 3000 may be executed in conjunction with the method 3000, such as after the oriented 2D bounding box is found at step 1004 but before grasping parameters are determined at step 1006. The method 3000 may be executed in conjunction with the method 10B in order to determine the class of a vessel, particularly whether the vessel belongs to a class of vessels including a handle.

Alternatively, the method 3000 may include determining 3004 the oriented 2D bounding box of the vessel and classifying 3006 the vessel according to the approaches described with respect to FIGS. 10A and 10B where such steps have not already been performed.

The method 3000 may include evaluating 3008, whether the class of the vessel is one that has a handle. If not, then the robotic controller 108 may invoke 3010 grasping and relocating of the vessel as described above with respect to FIG. 10A. If so, the method 3000 may include evaluating 3014 whether the orientation of the handle is such that it will interfere with grasping of the vessel from the side. For example, it may be undesirable and result in unpredictable behavior if the handle is contacting one of the gripper fingers 114a, 114b of the gripper 112. Likewise, the angles at which the gripper may approach the vessel to grasp it may be limited (i.e. be less than 360 degrees). Accordingly, there may be some orientations of the handle that are not graspable.

Step 3014 may include determining an angle of the handle according to the oriented 2D bounding box or by performing additional analysis to identify a bounding box of the handle and its angular position about the centroid of the oriented 2D bounding box or a bounding box of the cup portion excluding the handle. For example, a classifier (machine learning model, CNN, other machine vision algorithm) may be trained to identify the handle of an object and its oriented or non-oriented 2D bounding box in an image.

If the angle defined by the 2D bounding box of the handle is found to be in a predefined range of angles that are indicated to be ungrippable in programming of the robotic controller 108, the result of step 3014 is negative. Otherwise, the result is positive and the vessel is grasped and relocated 3010 as described above.

If the handle is found 3014 to be ungrippable, the method 3014 may include the robotic controller 108 causing the robotic arm 110 and gripper 112 to orient the gripper 112 substantially vertically (see FIG. 31A) with the fingers 114a, 114b pointed downwardly toward the surface and at a vertical height sufficiently low to engage the handle, e.g. the ends of the fingers 114a, 114b below a midpoint of the height of the oriented 2D bounding box B1, B2 above the surface 400, where the height of the bounding box is estimated according to an image from a camera 104 with a substantially horizontally oriented optical axis as described above with respect to FIG. 10A.

The method 3000 may then include the robotic controller 108 instructing the robotic arm 112 to push 3018 one or both of the gripper fingers 114a, 114b against the handle, e.g. the location of the 2D bounding box of the handle as determined at step 3014 toward an angular position about the centroid of the oriented 2D bounding box of the vessel that is not in the range of ungrippable angles (see FIG. 31B). For example, in the illustrated geometry, a grippable angle is the handle angled substantially 45 degrees (left figure) or −45 degrees (right figure) from the vertical axis.

Following 3018, one or more images 3020 from the one or more cameras 104 may be captured 3020 and processed to again identify the oriented 2D bounding box of the vessel and the 2D bounding box of the handle (oriented or not), such as according to the approach described above with respect to FIG. 10A. The orientation of the handle may again be evaluated at step 3014. If the handle is found 3014 to be grippable following step 3018 (see FIG. 29B), the vessel is gripped and moved according to step 3010, otherwise, steps 3016-3020 may be repeated again to again adjust the position of the handle.

Figure 32:
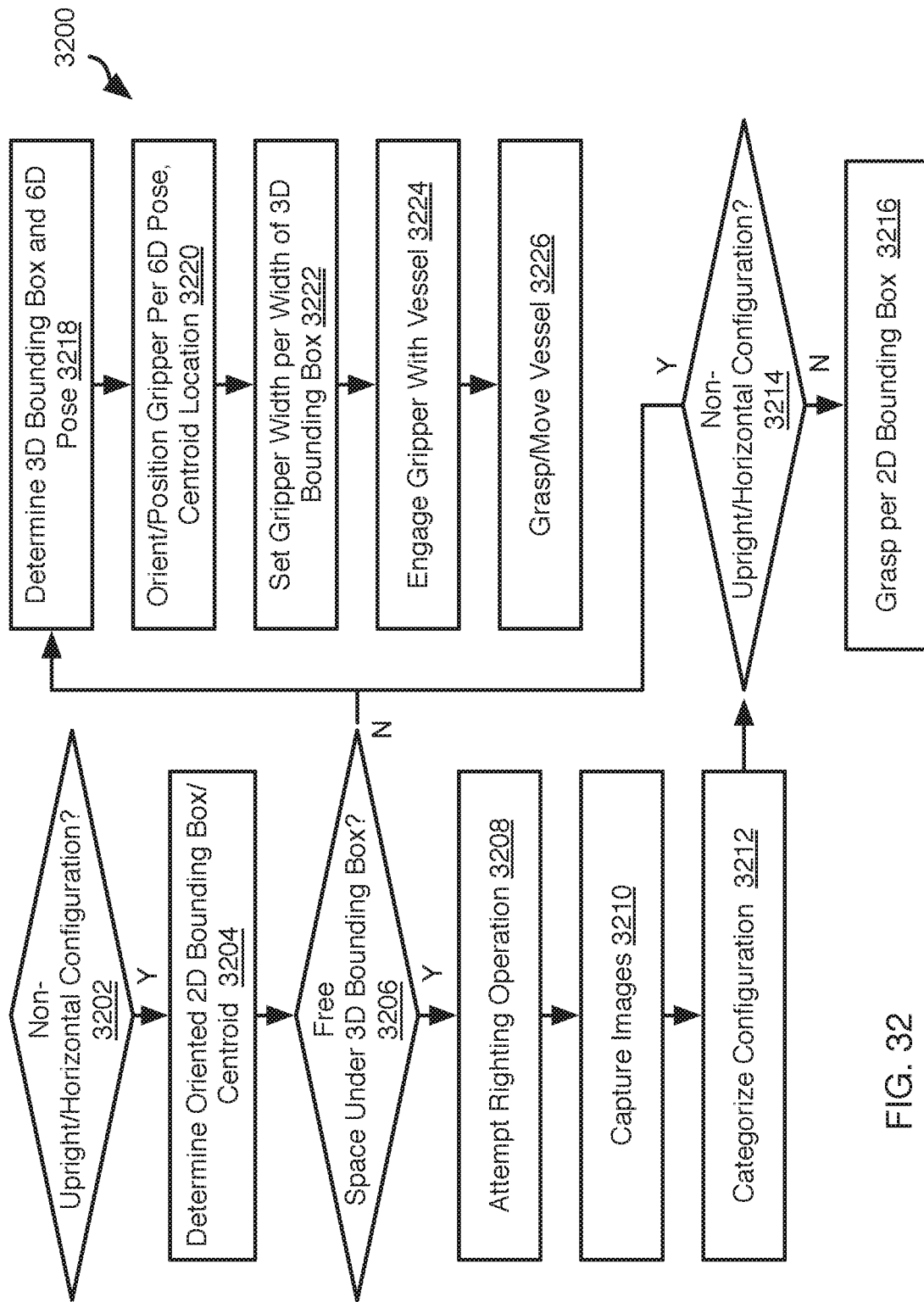
FIG. 32 is a process flow diagram of a method for manipulating an object that is neither upright nor side lying in accordance with an embodiment of the present invention.

FIG. 32 illustrates a method 3200 that may be executed by the image processor 106 and robotic controller 108 for clusters that are found 3202 to be neither upright nor lying on their sides (category (v)), i.e. at an arbitrary angle. This may include vessels such as cups that are leaning against other objects and are thus not clearly upright nor side-lying.

The method 3200 may include determining 3204 one or more oriented 2D bounding box for one or more vessels in the cluster. In some embodiments, an oriented 2D bounding box may be estimated for each object in each cluster in each image. Accordingly, an image that is represented in multiple images from multiple cameras 104 will have multiple corresponding oriented 2D bounding boxes determined 3204 for each image in which the object is represented.

The method 3200 may further include evaluating 3206 the one or more oriented 2D bounding boxes relative to the surface 400 to determine if there is space under the vessel as indicated by the one or more oriented 2D bounding boxes. In particular, step 3206 may include evaluating whether another object (e.g., the oriented 2D bounding box of another object) is positioned in a space between the oriented 2D bounding box and the surface. Step 3206 may further include evaluating the size of this space, i.e., determining whether the space is larger than a diameter of a finger 114a, 114b of the gripper 112.

If so, then the method 3200 may include attempting 3208 a righting operation. Examples of righting operations are described below with respect to FIGS. 35, 36, 37, 38A to 38C. As described below, the righting operation is intended to urge the vessel into a category other than (v), such as preferably (i) (upright) or category (iv) (packed with other vessels) in an upright pose.

Following performing 3208 the righting operation, one or more images 3210 are again captured with the one or more cameras and the object configuration of the vessel is assigned 3212 to a category as described above (see discussion of FIG. 6, above). If the category is found 3214 to be either upright (category (i)), side-lying (category (ii)), or packed (category (iv)) and upright, then the method 3200 may include grasping 3216 the vessel and moving it to a new location according to the methods described above for these categories, which may include additional separation or nudging operations prior to grasping in the case of category (iv) as described above.

Figure 33A:
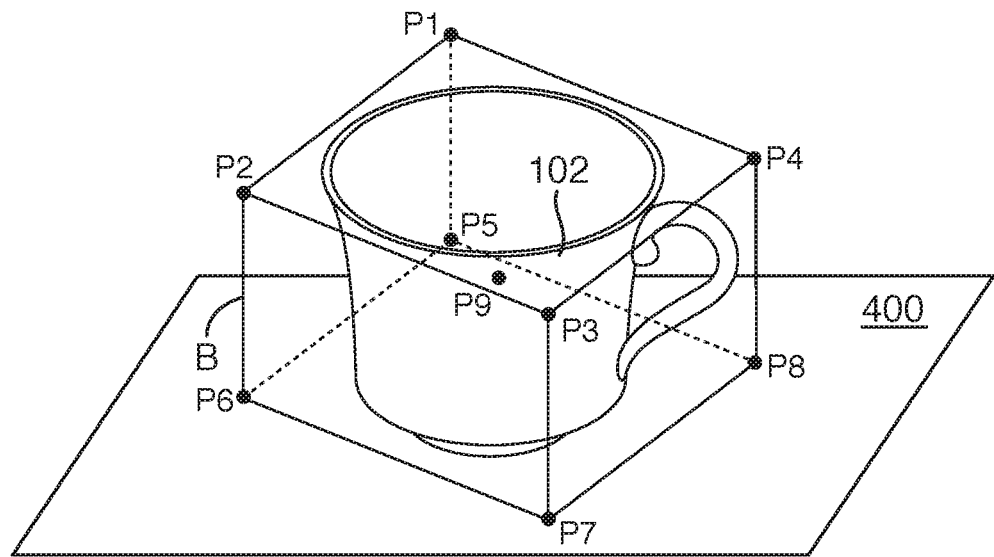
FIGS. 33A and 33B illustrate 3D bounding boxes of vessels.
Figure 33B:
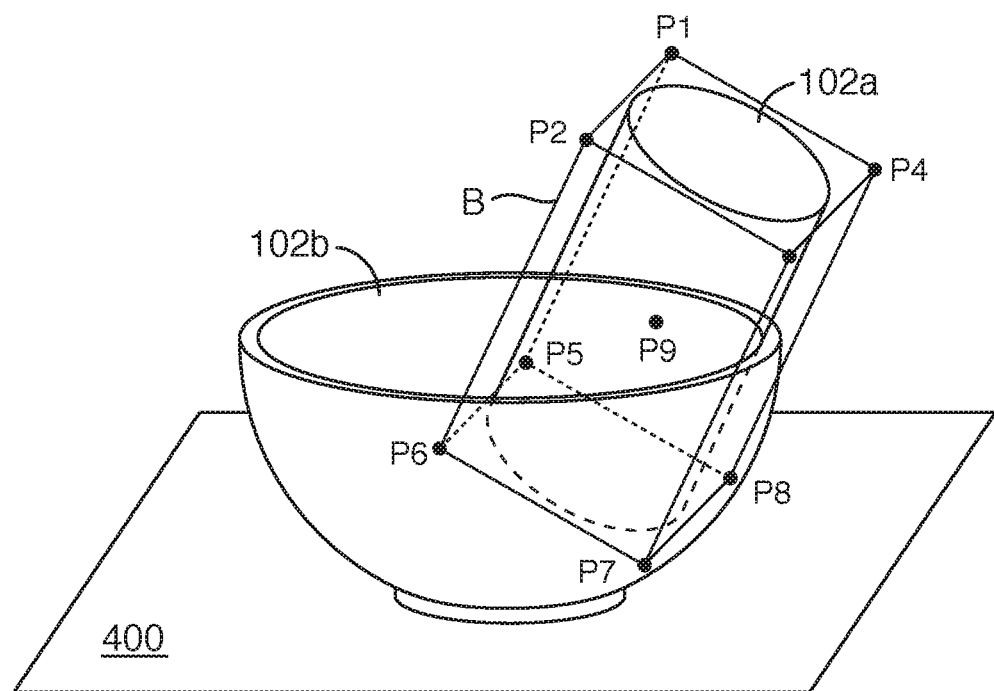

If the category after performing 3208 is still found 3214 to not belong to one of categories (i) through (iv) and the vessel is instead neither upright nor lying on its side, the method 3200 may include again performing 3208 a righting operation. For example, N (N being 1 or more) attempts may be made to tight the In the illustrated embodiment, after performing 3208 one or more times, the method 3200 includes attempting to grasp the vessel while it is still configured according to category (v) as defined herein. Likewise, if there is not space under the oriented 2D bounding box as determined at step 3206, an attempt may be made to grasp the vessel while it is still configured according to category (v) as defined herein. Referring to FIGS. 33A and 33B, while still referring to FIG. 32, this may include determining 3218 a 3D bounding box of the vessel and a 6D pose of the 3D bounding box. FIGS. 33A and 33B illustrate 3D bounding boxes for vessels including points P1 to P8 that are 3D coordinates of corners of the 3D bounding box and P9, which is the 3D coordinate of the centroid of the 3D bounding box.

Depending on the amount of clutter around the object of interest, multiple cameras from different perspectives would in general generate different 3D bounding boxes that may contain a part of the object. Ideally, these 3D bounding boxes should be oriented in the same manner, but in general it would not be true and some of them suffer from low accuracy due to occlusion and confusion by the clutter. In such cases, the multiple sets of 9 control points (the 8 corners and the center) can be grouped and placed in a single 3D coordinate frame since all the cameras are calibrated to each other. This generates many more points for general 6D pose estimation than 9 points and generally yield much higher accuracy in the estimated pose also is much more robust to noise and other sources of errors and the incompleteness of information in any of the single images. Such multiple groups of control points placed in a single 3D coordinate frame are then passed to a computer vision algorithm for pose estimation such as Perspective-n-Point (PnP) algorithms to produce an estimate of the 6D pose of the object.

Alternatively, in another embodiment, the 3D bounding box from each image is used to estimate a 6D pose of an object using the pipeline described for a single image including the PnP algorithm. For multiple images, this action is repeated so that there are many 6D poses, all of which should ideally be the same 6D pose, but again in general due to many sources of errors and fundamental difficulties such as occlusion, the poses are not equal and the multiple poses could be used to remove outliers or used to perform more intelligent voting based on the confidence scores associated with each 6D pose to generate a final estimate of a 6D pose of the object that is used as described below for determining grasping parameters.

In some embodiments, 3D bounding boxes are estimated by extending 2D object detector described previously also by training a deep CNN to identify 3D bounding boxes In particular, the deep CNN is trained to estimate the orientation and dimension of an object by estimating the 3D centroid location and the 3D dimensions of a 3D box that tightly encloses the object.

The deep CNN may be trained by providing images including objects and that are annotated with the eight corners of the 3D bounding box and its centroid location by a human annotator. Alternatively, the centroid may be derived from the locations of the eight corners without being annotated. Optionally, the center point of the 3D hounding box made of eight corners can be annotated to provide well spread data points for training.

Figure 34:
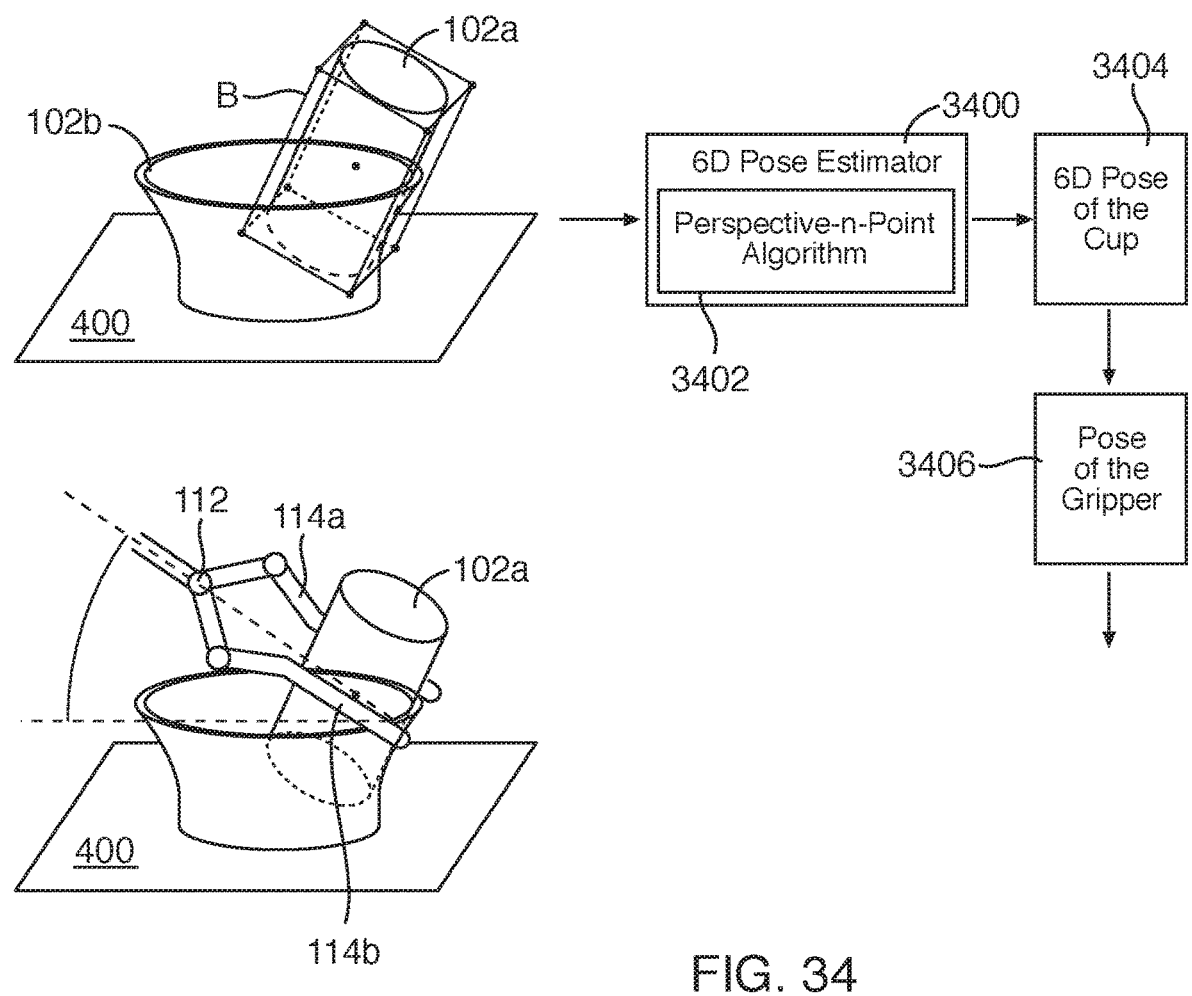
FIG. 34 illustrates a process of determining the 6D pose of a vessel in accordance with an embodiment of the present invention.

The deep CNN may then be trained with the annotated images. Example training algorithms may include Faster RCNN or YOLOv3. The inputs to the models are the annotated image and the outputs from the models are the nine points that compose the 3D bounding box and its centroid location. The model is trained to output the 3D bounding box corner locations and centroid location for a given input image including a representation of an object FIG. 34 illustrates a process of finding the 6D pose of the 3D bounding box. In particular, given a vessel 102a with 3D bounding box B that is configured according to category (v) (resting in another vessel 102b in the illustrated example), the 3D bounding box B (i.e., the nine coordinates of bounding box B) may be processed by a 6D pose estimator 3400, which may, for example, implement a perspective and point (PnP) algorithm 3402.

The 6D pose may be determined using the approaches described in the following references that are submitted herewith and incorporated herein by reference in their entirety:

V. Lepetit, F. Moreno-Noguer, and P. Eua. EPnP: An Accurate O(n) Solution to the PnP problem. IJCV, 2009 Real-Time Seamless Single Shot 6D Object Pose Prediction: arxiv.org/pdf/1711.08848.pdf The output of the 6D pose estimator 3400 is the 6D pose 3404 of the vessel 102a, which may be a 3D coordinate for its centroid and three angular dimensions describing its orientation with respect to three axes, such as the x, y, and z axes of a 3D coordinate system, such as the 3D coordinate system with respect to which the cameras 104 and robotic arm 110 are calibrated according to the method 500.

The method 3200 may further include orienting and positioning 3220 the gripper 112 by the robotic controller 108. In particular, as shown in FIG. 34, a pose 3406 for the gripper 112 may be determined from the 6D pose 3404. For example, the 3D bounding box is a cuboid shape defined by the eight vertices and its centroid location. Accordingly, the long dimension of this cuboid parallel to one of the edges of the centroid may be determined. The angular orientation of an edge having the long dimension may be determined. The gripper 112 may then be positioned parallel to a plane that is perpendicular to that edge, e.g. the axis of rotation of the fingers 114a, 114b being parallel to the edge and a plane of movement intersecting the fingers 114a, 114b also intersecting the edge, such as approximately at its midpoint (e.g., within 15 percent of the length of the edge). In some embodiments, this orientation may be substantially perpendicular to the plane of the bottom of the 3D bounding box, i.e. the base of a vessel on which it can be placed and remain upright on a surface. This may be the case where the axis of rotation of the fingers 114a, 114b is substantially perpendicular to the bottom surface.

The position of the gripper 112 may be selected to be vertically above the vessel as shown in FIG. 34. For example, an upper most edge of the edges having the long dimension may be identified or an upward facing face of the cuboid defined by the 3D bounding box. The gripper 112 may then be initially positioned by the robotic controller 108 above that edge or face and offset therefrom such that the fingers 114a, 114b are not incident on the volume occupied by the 3D bounding box and are oriented according to the pose as described above.

The separation width of the fingers 114a, 114b may be set 3220 by the robotic controller 108 according to a width (a dimension perpendicular to the long dimension) of the 3D bounding box, such as some multiple of that width, e.g., 1.1 to 2.

The robotic controller 108 may then cause the gripper 112 to engage with the vessel, such as by moving the gripper 112 perpendicular to the long dimension toward the vessel until the vessel is positioned between the gripper fingers 114a, 114b (see vessel 102a between gripper fingers 114a, 114b in FIG. 34).

Figure 35:
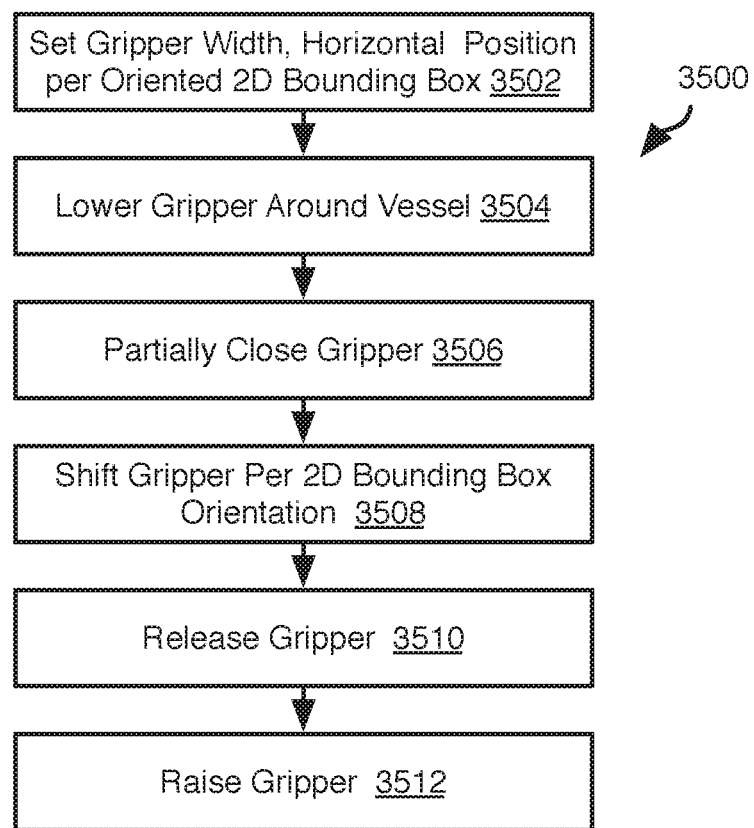
FIG. 35 is a process flow diagram of a method for righting a vessel in accordance with an embodiment of the present invention.
Figure 36A:
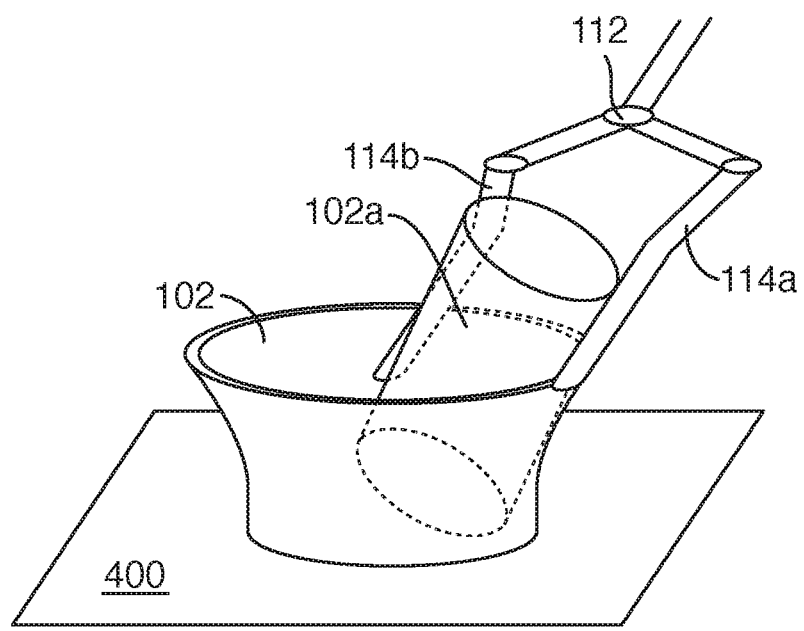
FIGS. 36A and 36B illustrate execution of the method of FIG. 35.
Figure 36B:
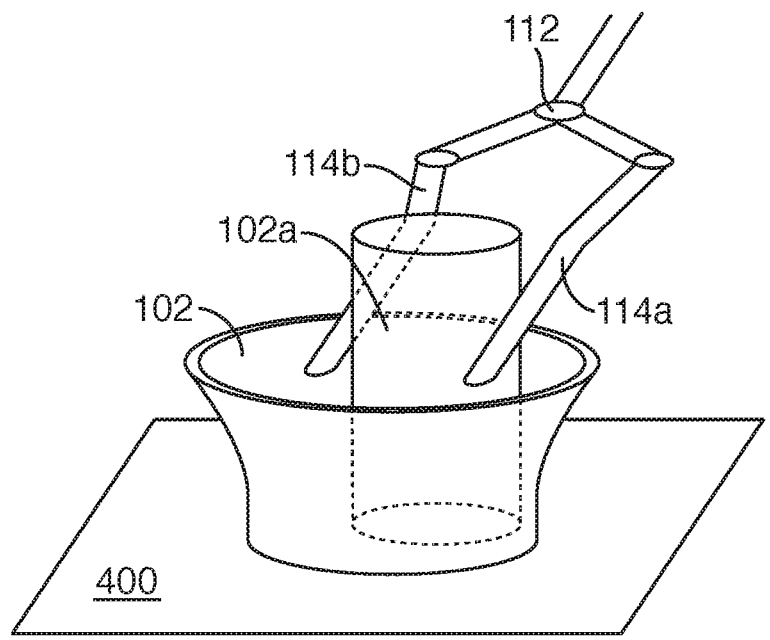
Figure 37:
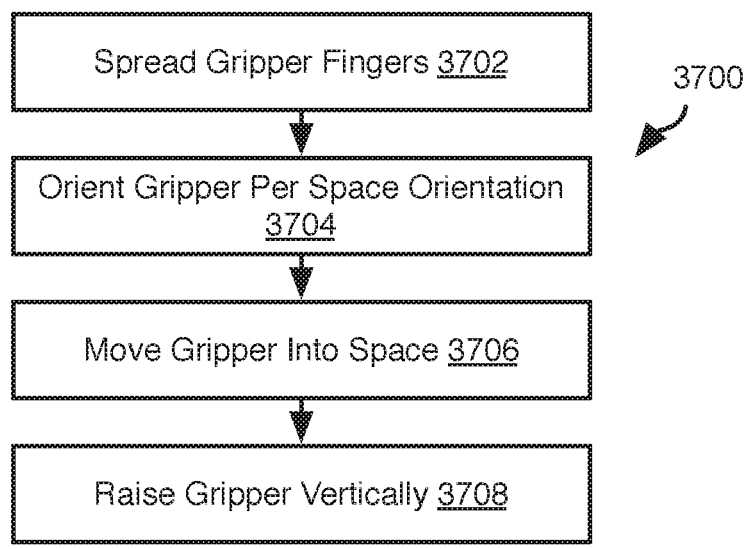
FIG. 37 is a process flow diagram of another method for performing a righting operation in accordance with an embodiment of the present invention.

The robotic controller 108 may then cause 3226 the gripper 112 to grasp the vessel (e.g., close the fingers 114a, 114b around the vessel), the robotic arm 110 to move the vessel to a new location (which may include inverting the vessel), and the gripper 112 to release the vessel (separate the fingers 114a, 114b) to the new location, FIGS. 35, 36A, and 36B illustrate a method 3500 for performing a righting operation for a vessel by the image processor 106 and robotic controller 108. The righting operation may advantageously be performed without needing to determine a 3D bounding box or 6D pose of the vessel and may succeed in urging the vessel into a configuration such that it may be grasped using only one or more oriented 2D bounding boxes obtained from the one or more cameras 104. The method 3500 may include the image processor 106 setting 3502 an initial gripper width, horizontal position, and orientation of the gripper 12 according to the oriented 2D bounding box of the vessel.

In particular, the robotic controller 108 may cause the fingers 114a, 114b to be oriented substantially parallel to the surface 400 (axis of rotation of the fingers 114a, 114b substantially perpendicular to the surface 400). The orientation may be selected such that the finger 114a, 114b point toward the vessel substantially perpendicular to a long dimension of the oriented 2D bounding box as determined from a substantially top down camera image or a substantially side view camera image. The horizontal position of the fingers 114a, 114b may be selected such that the horizontal position of the vessel as determined from the oriented 2D bounding box is positioned between the fingers 114a, 114b. The fingers 114a, 114b may be spread wider than the long dimension of the oriented 2D bounding box.

The robotic controller 108 may then lower 3504 the gripper 112 around the vessel, such as to a point such that the fingers 114a are positioned vertically between a top and midpoint of the vessel along a vertical direction perpendicular to the surface 400 as determined from one of the one or more oriented 2D bounding boxes. The robotic controller 108 may then partially close 3506 the gripper 112 such that one or both of the fingers 114a, 114b engage the vessel. Alternatively, step 3506 may be omitted, i.e. only a subsequent shifting step 3508 is used for righting.

The robotic controller 108 may then shift 3508 the gripper 112 horizontally. For example, if an oriented 2D bounding box is from a side-viewing camera (optical axis substantially parallel to the surface 400) it may be apparent from the oriented 2D bounding box that one end is higher than the other. Accordingly, shifting 3508 may include shifting the gripper toward the original position of the lower end in order to urge the vessel toward an upright position. For example, such that the finger 114a, 114b that was initially farthest from the lower end prior to shifting 3508 is offset from the original position of the lower end by approximately (within 10%) of half the width of the vessel (e.g., as determined from classification and look up in the database 1102).

If the gripper was closed at step 3506, then the robotic controller may release 3510 the gripper 112 by spreading the fingers 114a, 114b, such as to the width from step 3502. In either case, the robotic controller vertically raises 3512 the gripper 112 such as to the height of the vessel plus some clearance or to some other predetermined height intended to provide clearance. The raising of step 3512 may further urge the vessel into an upright position.

FIGS. 36A and 36B illustrate execution of the method 3500. As shown in FIG. 36A, the gripper 112 is brought down around the vessel 102a that is angled within vessel 102b. The gripper 112 is then urged toward the lower end of the vessel 102a (left). The gripper may then be vertically raised out of engagement with the vessel 102a, which is now in an upright position.

FIG. 37 and FIGS. 38A to 38C illustrate n alternative method 3700 for performing a righting operation with respect to a vessel. The method 3700 may include the robotic controller 108 spreading 3702 the gripper fingers 114a, 114b, such as to a maximum separation defined by the geometry of the gripper 112 or some other predefined limit. The robotic controller 108 may then orient 3704 one of the fingers of the gripper (114a in this example) according to an orientation of one or both of (a) the one or more oriented 2D bounding boxes corresponding to the vessel and (b) an orientation of the space below the one or more oriented 2D bounding boxes. In particular.

Figure 38A:
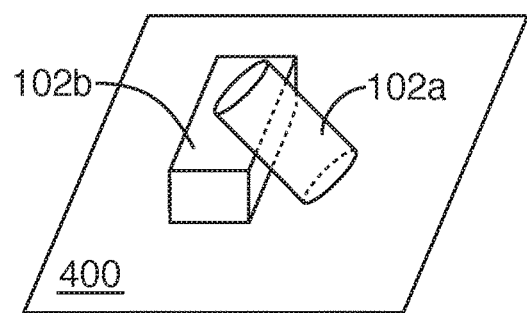
FIGS. 38A to 38C illustrated execution of the method of FIG. 37.
Figure 38B:
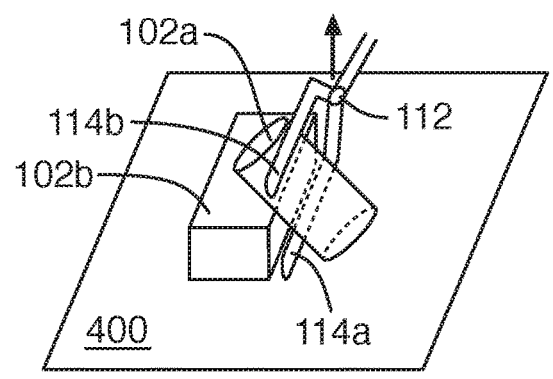
Figure 38C:
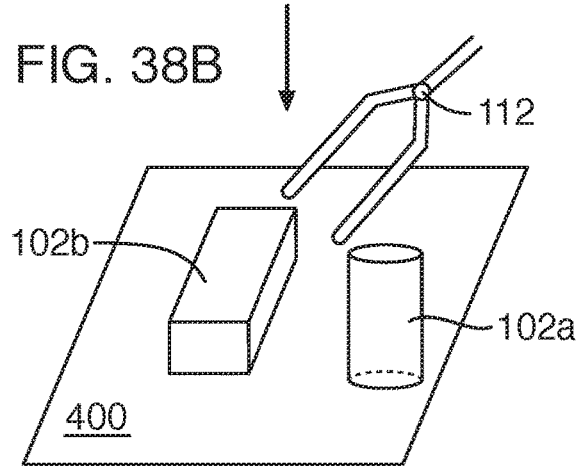

For example, referring to FIG. 38A, the space under vessel 102a may be identified as being a space that is not occupied by the oriented 2D bounding boxes of vessel 102a or object 102b and that is bounded by the oriented 2D bounding boxes of vessel 102a, object 102b, and the surface 400, The robotic controller 108 may therefore orient the finger 114a such that it is directed toward the space without being directed toward estimated 3D positions of the oriented 2D bounding boxes of the vessel 102a and object 102d. The robotic controller 108 then moves 3706 the finger 114a toward the space and under the vessel 102a (see FIG. 38B). The robotic controller 108 then vertically raises 3708 the finger 114a which will tend to urge the vessel 102a into an upright position in many cases (see FIG. 38C).

Figure 39:
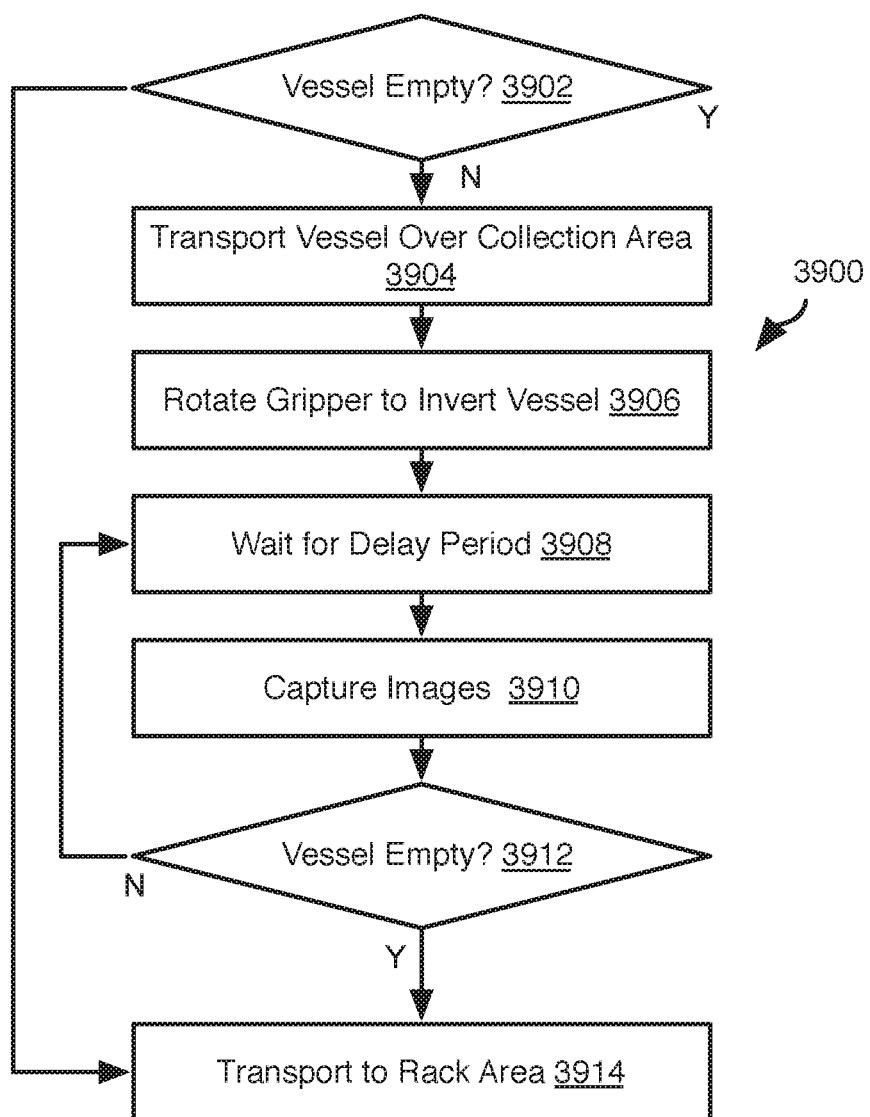
FIG. 39 is a process flow diagram of a method for removing matter from a vessel in accordance with an embodiment of the present invention.

FIG. 39 illustrates a method 3900 that may be executed by the imaging system 106 and robotic controller 108. The method 3900 may include evaluating 3902 whether a vessel 102 is empty (see FIG. 40A). Step 3902 may be performed after picking up the vessel according to the methods disclosed herein or using the same image or images used to determine the object configuration category of the vessel 102 and to determine grasping parameters for picking up the vessel 102 according to the methods described above.

Step 3902 may include using a machine vision algorithm programmed to detect whether a transparent or translucent vessel contains matter (food, beverage, other material). The machine vision algorithm, or a separate algorithm may determine whether an image showing the interior of an opaque vessel indicates that the vessel contains matter. The machine vision algorithm may be a machine learning algorithm such as a CNN. For example, images of vessels may be annotated to indicate whether the vessel in the image contains matters. Images of empty and matter-containing vessels may be included in the training data set. The machine learning model may then be trained to distinguish between matter-containing and empty vessels.

Figure 40A:
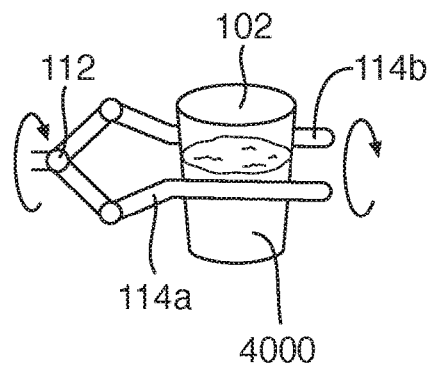
FIGS. 40A to 40C illustrate execution of the method of FIG. 39.
Figure 40B:
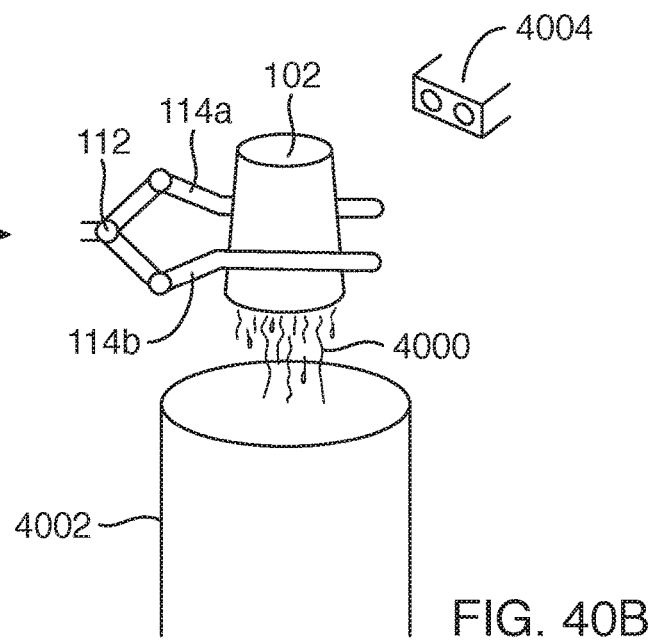
Figure 40C:
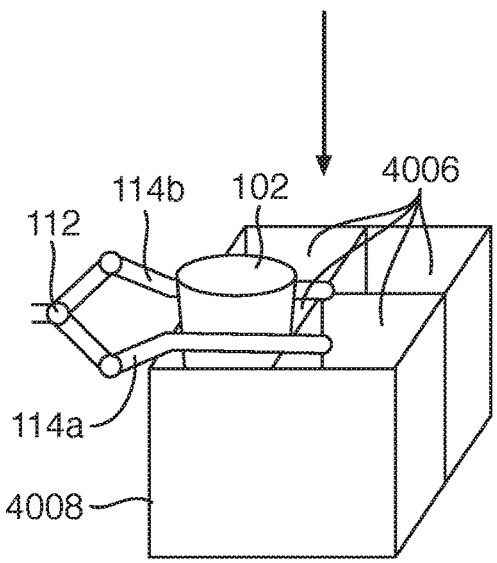
Figure 41:
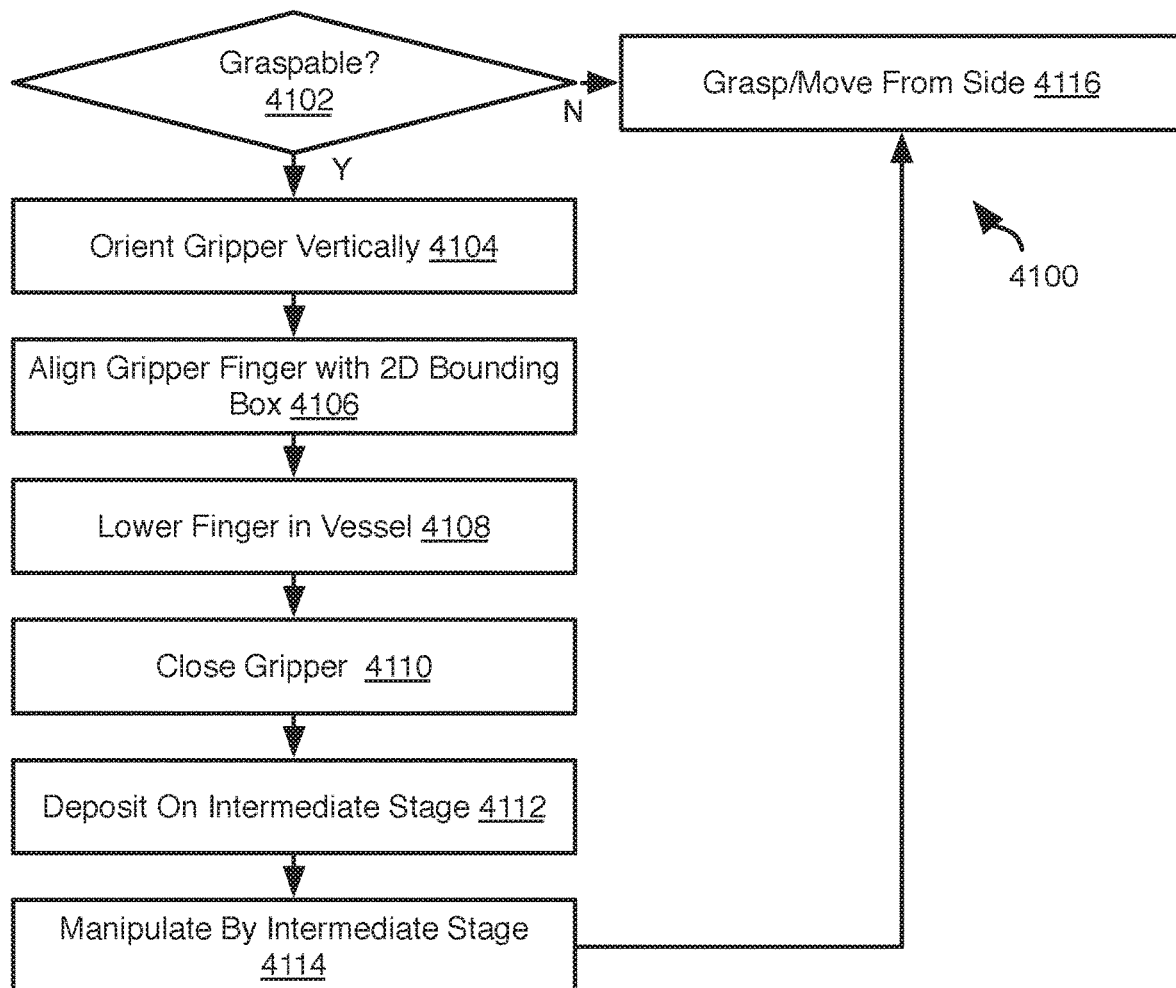
FIG. 41 is a process flow diagram of a method for using an intermediate stage to grasp vessels in accordance with an embodiment of the present invention.

If the vessel 102 is found 3902 to contain matter 4000, the robotic controller 108 may cause the robotic arm to transport the vessel 102 over a collection area 4002, e.g. a garbage bin, drain, compost bit, or other collection container (see FIGS. 40A and 40B). The robotic controller then causes 3906 the robotic arm 110 and/or gripper 112 to rotate the vessel such that it is inverted, i.e. the open end positioned below the gripper 112 (FIG. 40B). The method 3900 may then include waiting 3908 for a delay period (e.g. 0.5 to 2 seconds) for matter to fall from the vessel.

Following the delay period, one or more images of the vessel may be captured 3910, such as by means of a camera 4004 having a region over the collection area 4002, which may be the same as or different from the cameras 104 having the surface 104 in their field of view. For example, where one or more cameras 104 are mounted to the robotic arm 110 or gripper 112, these cameras may be used at step 3910.

The one or more images from step 3910 may be evaluated 3912, such as in the same manner as the evaluation of step 3902. If the vessel is still found 3912 to contain matter, then the method 3900 may include waiting 3908 for another delay period followed by repeating steps 3910 and 3912. Steps 3910 and 3912 may include capturing 3910 a video clip and evaluating 3912 whether motion in the clip indicates fluid or other matter is still falling from the vessel. If so, the vessel is determined 3912 to not be empty.

Steps 3908-3912 may be performed for a finite number of times before the method 3900 ends. In some embodiments, if the vessel is found 3912 not to be empty after a number of iterations of step 3908-3912, the method 3900 may include taking other action such as generating an alert to a human operator (audible alert, flashing light, electronic message to a device of the human operator etc.).

In some embodiments, if a predefined maximum number of iterations of steps 3908-3912 are performed without the vessel being found 3912 to be empty, the method 3900 may further include the robotic controller 108 invoking shaking (vertical, lateral, or rotational) of the vessel using the robotic arm 110 and gripper. If shaking does not result in the vessel determined 3912 to be empty according to subsequently captured images, an alert may be generated.

If the vessel is found to be empty at step 3902 or an iteration of step 3912, the robotic controller 408 may instruct 3914 the robotic arm and gripper to move the vessel to a racking area and causing the gripper to release the vessel 102 over a pocket 4006 of a rack 4008. Step 3914 may include inverting the vessel prior to adding to a rack if not already inverted according to step 3906.

Note that in some embodiments, all vessels are presumed to contain matter and are inverted over a collection area prior to being added to a rack such that the method 3900 may be omitted. However, processing may be accelerated by omitting this step for empty vessels according to the method 3900.

Referring to FIG. 41 and FIGS. 42A to 42C, the illustrated method 4100 may be executed with respect to vessels 4102 that are below a height required for gripping. In particular, the geometry of the gripper 112 may be such that it can only grasp objects from the side above some minimum height, such as due to interference of structures of the gripper 112 or robotic arm 110 with the surface 400. Accordingly, even single upright vessels that are below this height might not be graspable from the side according to the approach described above with respect to FIG. 10A. Note further that the method 4100 may enable gripping of a vessel that are packed with other vessels such that the gripper 112 may not engage the vessels from the side due to interference from the other vessels. Accordingly, the method 4100 may also be used to process packed vessels in the place of the various approaches for processing clusters of category (iv) described above.

In either case, if a vessel is not found to be grippable from the side due to being below the minimum height or being packed with other vessels, the method 4100 may include the robotic controller 108 causing the robotic arm 110 and gripper 112 to orient 4104 the gripper vertically with one finger 114a, 114b (take 114a in this example) aligned 4106 with the 2D bounding box of the vessel, and then lower 4108 the gripper vertically such that the finger 114a is inserted within the vessel. Alternatively, the vessel could be grasped using the outer surface so the fingers are placed vertically relative to surface 400 and lowered sufficiently such that the cup is placed in between the two fingers. After the fingers are properly placed, the two fingers are closed to grasp the object. Inserting fingers into a vessel may not be desirable if the vessel contains matter.

Steps 4104-4108 may be performed in the manner described above with respect to the method 2800 of FIG. 28.

Figure 42A:
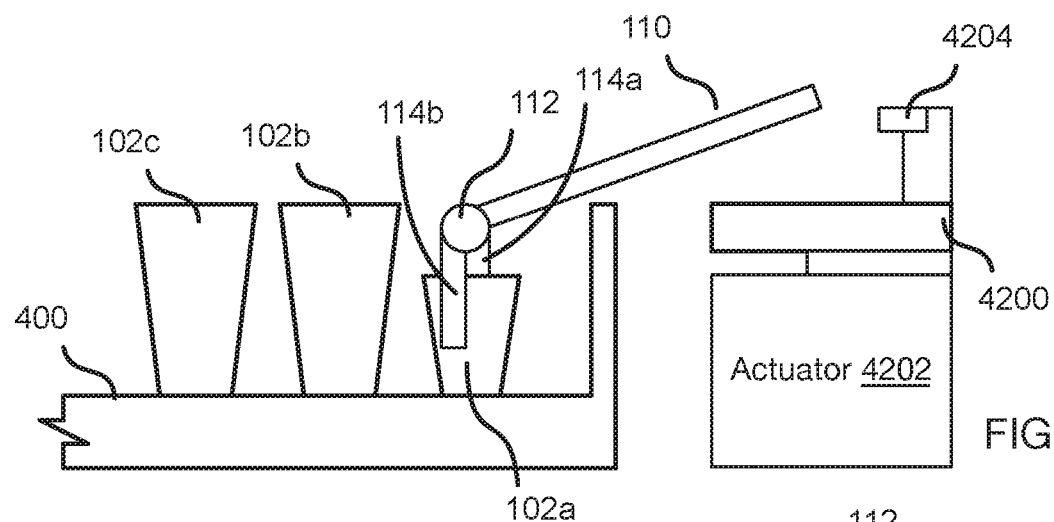
FIG. 42A to 42C illustrate execution of the method of FIG. 41.

Steps 4104 through 4108 are illustrated in FIG. 42A, which shows a vessel 102a that may either be below the minimum height or not be graspable due to being surrounded by other vessels 102b, 102c and/or being within a threshold proximity to a barrier. Accordingly, the gripper 112 is vertically lowered such that finger 114b is inserted within the vessel 102a. Alternatively, the gripper is positioned and lower such that both fingers 114a, 114b are outside of the vessel 102a with the vessel positioned between them.

Figure 42B:
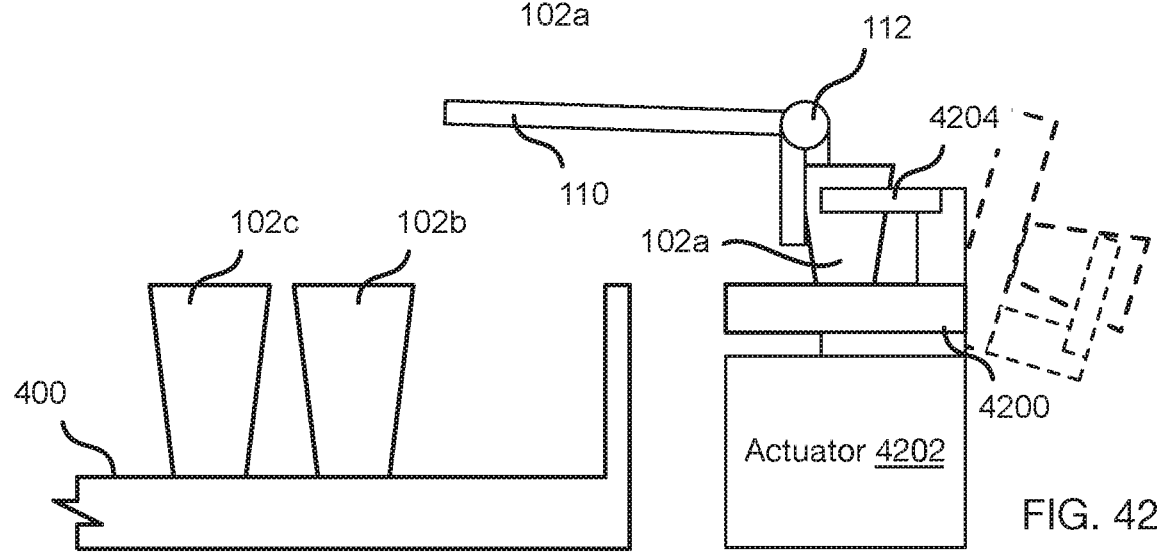

The robotic controller 108 may then invoke closing 4110 of the fingers 114a, 114b of the gripper effective to grasp the vessel with sufficient clamping force to support lifting of the vessel. The robotic controller 108 then causes the robotic arm 110 to lift and transport the vessel to an intermediate stage and deposit 4112 the vessel on the intermediate stage by spreading apart the fingers 114a, 114b. The robotic controller 108 may then raise the gripper 112 such that the finger 114a is not in the vessel. This step is shown in FIG. 42B, which shows the robotic arm 110 depositing the vessel 102a on a platform 4200.

The method 4100 may further include manipulating 4114 the vessel while it is on the intermediate stage. For example, the platform 4200 may be mounted to an actuator 4202 that rotates the platform 4200. This may be used to rotate the vessel such that a handle of the vessel does not interfere with gripping (see FIGS. 30 and 31). For example, camera may have the platform 4200 in its field of view and being coupled to a processing system that is also coupled to the actuator 4200. If an image of the vessel 102 indicates a handle is not oriented appropriately to be gripped (see discussion of FIGS. 30 and 31), the processing system may cause the actuator 4202 to rotate the platform 4200 until the handle is oriented appropriately to be gripped.

In another example, the actuator 4202 is operable to flip the platform 4200 in order to dump the contents of the vessel 102a. Accordingly, a gripper 4204 may be mounted to the platform 4200 and be caused by the processing system grip the vessel 102a when the processing system causes the actuator 4202 to perform the flipping operation (see dotted representation in FIG. 42B) and then release the vessel 102a.

Figure 42C:
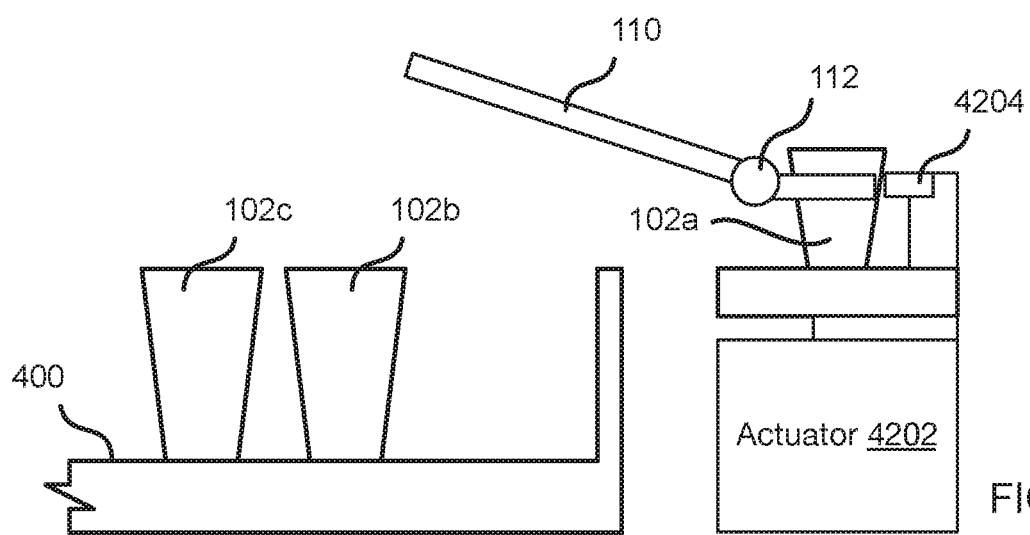

The robotic controller 108 may then cause 4116 the robotic arm to grasp the vessel 102a from the side and move the vessel to a new location, such as a rack, as shown in FIG. 42C. Grasping from the side may be performed according to the approach described above with respect to FIG. 10A. In particular, one or more cameras having the platform in their field of view may be calibrated and used to locate and grasp the vessel 102a on the platform 102a using the same approach described above with respect to FIG. 10A.

Likewise, if the vessel is found 4102 to be graspable, then it may be processed according to the approach of FIG. 10A while still on the surface 400.

Figure 43A:
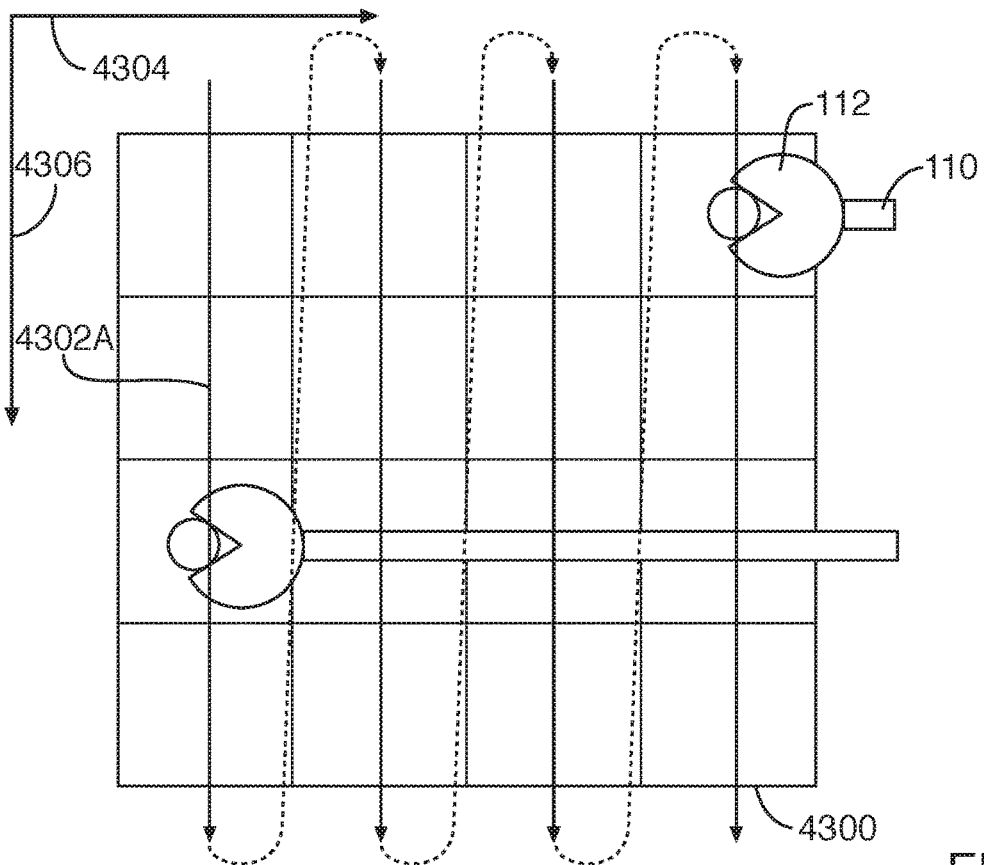
FIGS. 43A and 43B illustrate examples of racking orders in accordance with an embodiment of the present invention.
Figure 43B:
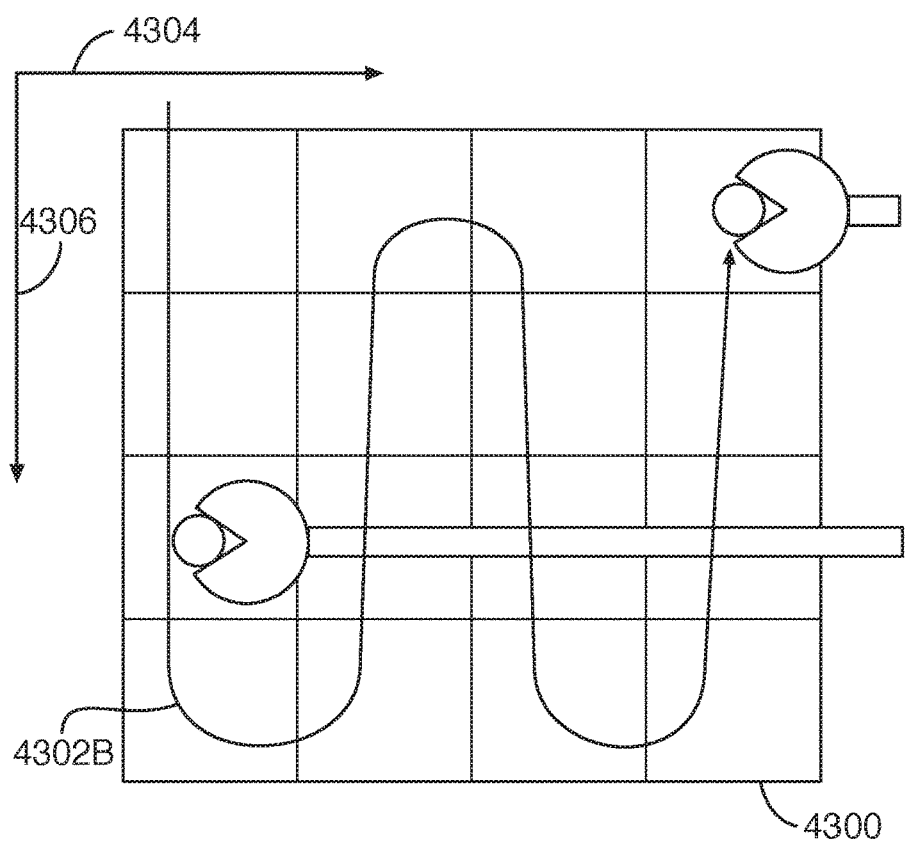
Figures 44A, 44B:
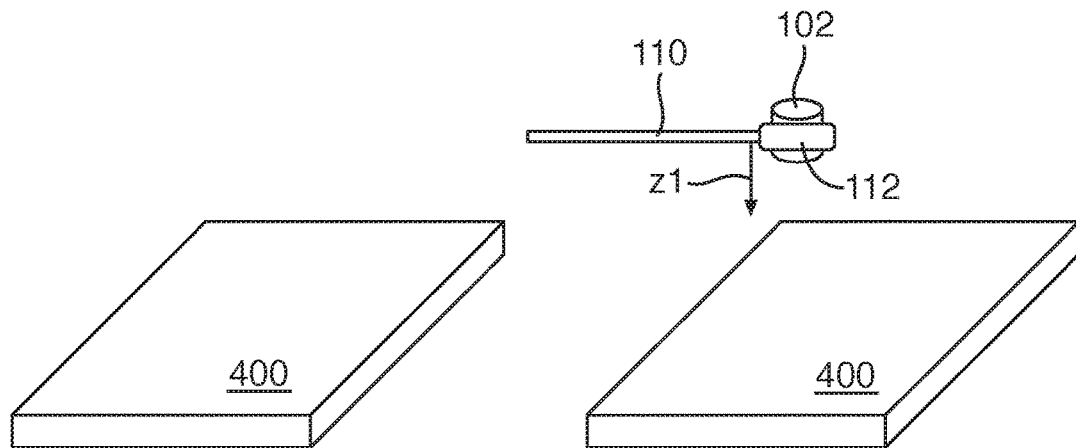
FIGS. 44A to 44E illustrate an approach for placing objects in accordance with an embodiment of the present invention.
Figures 44C, 44D:
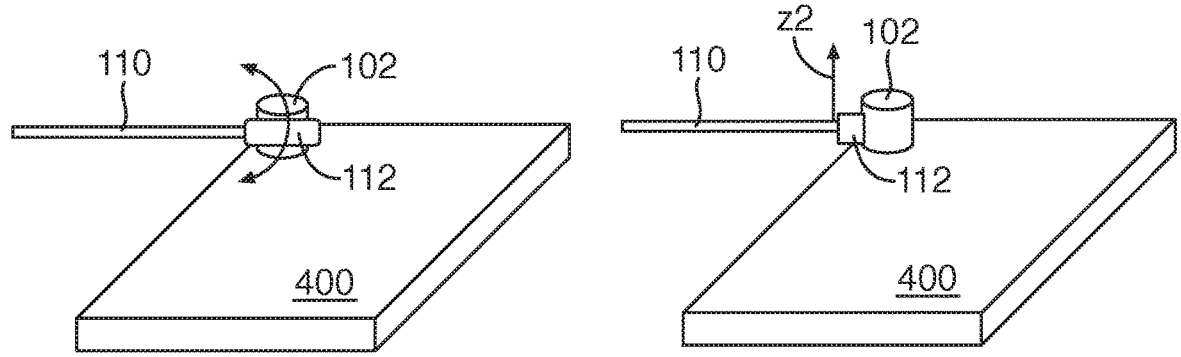
Figure 44E:
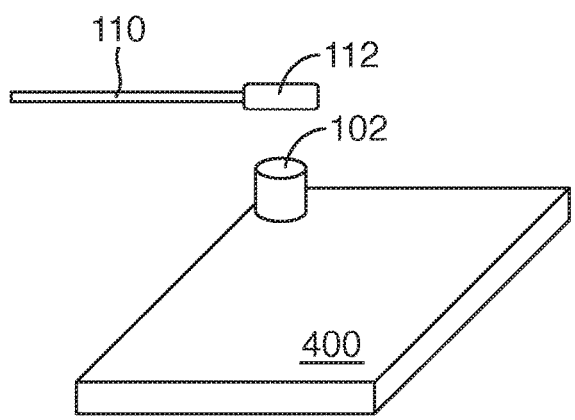

Referring to FIGS. 43A and 43B, the robotic controller 108 may deposit cups in a rack 4300 according to the illustrated paths 4202a, 4202b. For example, let the rack define a grid of pockets or placement locations defining a row dimension 4304 and a column dimension 4306, with rows being oriented vertically and columns being oriented horizontally in the illustrated view. In the illustrated example, the row along the row dimension 4304 that is furthest from the robotic arm 110, i.e. furthest from a fixed base of the robotic arm 110.

Generally, racks for any type of kitchenware can be modeled as a flat X x Y checkerboard (where angle normal to Z is 0) with each box or circle size corresponding to the object being racked. Alternatively, rack positions may be arranged in a honeycomb fashion. Racking order can either be by type or by position. By type may be performed such that objects of a certain class may only be placed on a rack with other objects of that class or one or more predefined classes of object that are deemed compatible. An example is silverware: each silverware is grouped together in a single rack location (cup or box). Another example is if a stack of the same type of glassware is needed in a specific location.

Racking by position is the general case for dishware (plates/bowls) and cups (mugs/glasses) where items are consecutively and adjacently placed in order with respect to positions in the rack. For positional racking, the sequence is generally to move from one end of the rack to the other to minimize possible arm contact or collision with the rack or objects therein. Two examples are shown in FIGS. 43A and 43B.

In some racking requirements, the orientation of the racked object matters, so the robot arm will need to invert the object prior to vertical descent at (2) as described above, where the polarity is determined by pose estimation methods, such as those described herein. For example, a wide end of cup or bowl may be identified by classifying a 2D bounding box including the image and oriented facing downward.

In the example of FIG. 43A, the grid locations are filled by filling the furthest row moving in a first direction (top to bottom) along the column dimension 4306. The next furthest row is also filled moving in the first direction and so on until each row is filled. In this manner, potential collisions of the gripper 112 with previously placed vessels are reduced.

In the example of FIG. 43B, the grid locations are filled by filling the furthest row moving in a first direction (top to bottom) along the column dimension 4306. The next furthest row is also filled moving in a second direction along the column dimension that is the opposite of the first dimension. Accordingly, a first row (furthest) is filled starting at the top in the illustrated example, the second row is filled starting at the bottom, the third row is filled starting at the top, and so on until each row is filled. In this manner, potential collisions of the gripper 112 with previously placed vessels are also reduced.

In some embodiments, a camera having the rack in its field of view, such as a camera with a substantially vertical optical axis pointing down at the surface and substantially (within 0.2 of a length or width of the rack) with the center of the rack may capture images of the rack. Images from the camera may be classified by the image processor 106 using a machine learning model to identify the location of each rack position and classify the rack positions as being open or full. The robotic controller 108 may then use this information to determine the (x, y) coordinate of empty rack positions in order to positon vessels above the empty rack positions and lower the vessels into the rack positions.

In some embodiments, the surface on which the rack rests may be actuated. The robotic controller 108 may actuate the surface in combination with images received from the camera in order to align the rack with a desired orientation, such as by moving the surface such that an image of the rack on the surface conforms more closely to a reference image, such as due to the rack being closer to a position and orientation of a rack represented in the reference image.

FIGS. 44A to 44E illustrate movement of the robotic arm 110 and gripper 112 that may be invoked by the robotic controller 108 when placing an individual vessel 102 on a rack or other surface, such as in a position in a racking order according to either of FIGS. 43A and 43B.

For example, the robotic arm 110 brings the gripper 112 having a vessel 102 grasped therein over the surface 400 (FIGS. 44A and 44B) at or above a height Z1, such as over a (x, y) position above a racking position according to the racking pattern of FIG. 43A or FIG. 43B, either with or without rotation depending on the polarity (upright: rotate, upside down: don't rotate) of the vessel. The robotic arm 110 then lowers the gripper 112 vertically a distance z1 to a height Z2 that is lower than height z1 (see FIGS. 44B and 44C) while remaining at substantially the same (e.g., within 1 cm) (x,y) position. The gripper 112 is then opened to release the vessel 102 on the rack (see FIGS. 44C and 44D). The robotic arm 110 then rises a distance z2 to at or above the height Z1 and moves away, such as to grasp another vessel 102 for grasping. The height Z1 may be selected to be higher than a height of vessels to be processed when placed in the rack plus some additional height for additional clearance, e.g. 1 to 3 cm.

Figure 45:
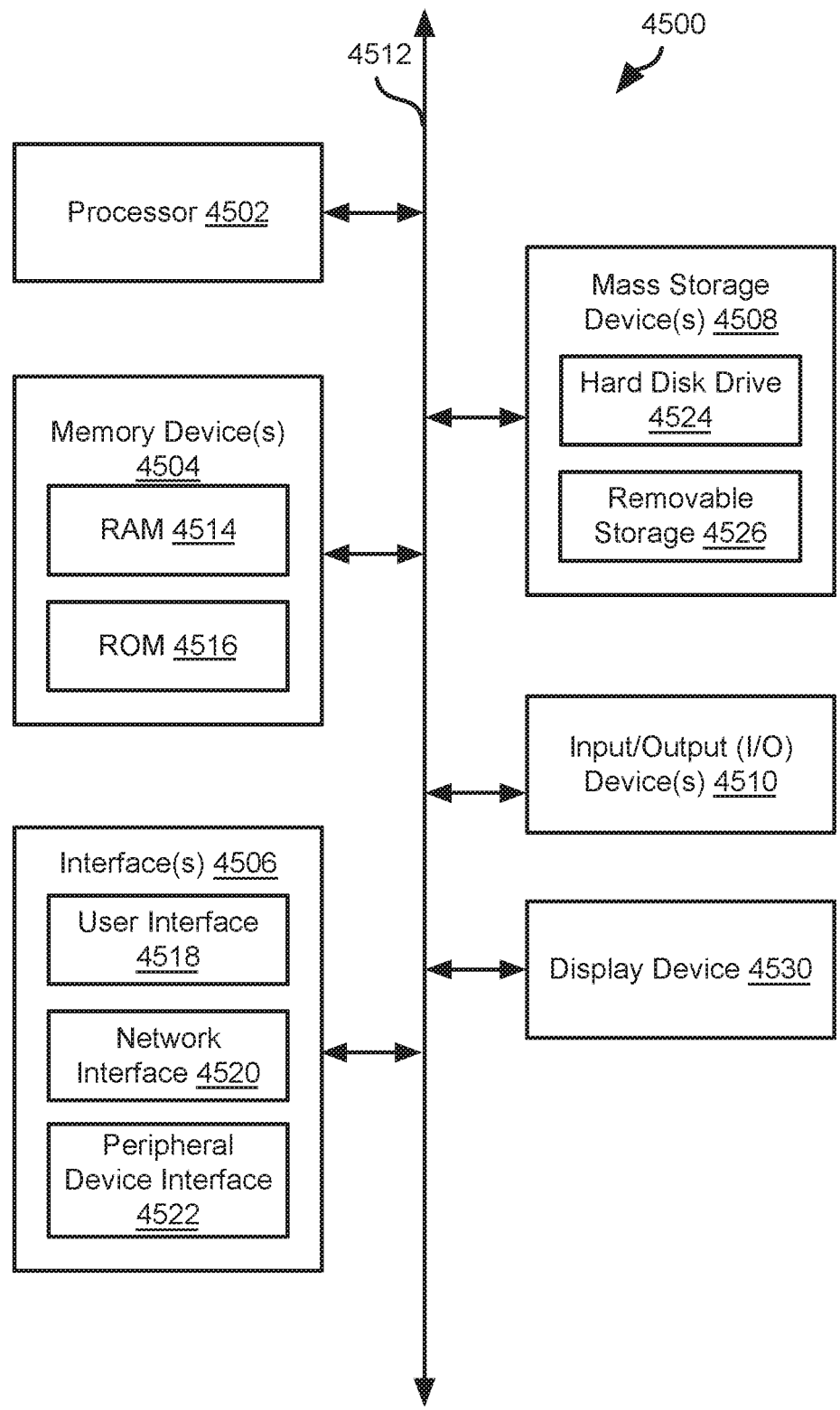
FIG. 45 is a schematic block diagram of a computer system.

FIG. 45 is a block diagram illustrating an example computing device 4500. Computing device 4500 may be used to perform various procedures, such as those discussed herein. The image processor 106 and robotic controller 108 may be implemented by one or more devices that may have some or all of the attributes of the computing device 4500.

Computing device 4500 includes one or more processor(s) 4502, one or more memory device(s) 4504, one or more interface(s) 4506, one or more mass storage device(s) 4508, one or more Input/Output (I/O) device(s) 4510, and a display device 4530 all of which are coupled to a bus 4512. Processor(s) 4502 include one or more processors or controllers that execute instructions stored in memory device(s) 4504 and/or mass storage device(s) 4508. Processor(s) 4502 may also include various types of computer-readable media, such as cache memory.

Memory device(s) 4504 include various computer-readable media, such as volatile memory (e.g., random access memory (RAM) 4514) and/or nonvolatile memory (e.g., read-only memory (ROM) 4516). Memory device(s) 4504 may also include rewritable ROM, such as Flash memory.

Mass storage device(s) 4508 include various computer readable media, such as magnetic tapes, magnetic disks, optical disks, solid-state memory (e.g., Flash memory), and so forth. As shown in FIG. 45, a particular mass storage device is a hard disk drive 4524. Various drives may also be included in mass storage device(s) 4508 to enable reading from and/or writing to the various computer readable media. Mass storage device(s) 4508 include removable media 4526 and/or non-removable media.

I/O device(s) 4510 include various devices that allow data and/or other information to be input to or retrieved from computing device 4500. Example I/O device(s) 4510 include cursor control devices, keyboards, keypads, microphones, monitors or other display devices, speakers, printers, network interface cards, modems, lenses, CCDs or other image capture devices, and the like.

Display device 4530 includes any type of device capable of displaying information to one or more users of computing device 4500. Examples of display device 4530 include a monitor, display terminal, video projection device, and the like.

Interface(s) 4506 include various interfaces that allow computing device 4500 to interact with other systems, devices, or computing environments. Example interface(s) 4506 include any number of different network interfaces 4520, such as interfaces to local area networks (LANs), wide area networks (WANs), wireless networks, and the Internet. Other interface(s) include user interface 4518 and peripheral device interface 4522. The interface(s) 4506 may also include one or more peripheral interfaces such as interfaces for printers, pointing devices (mice, track pad, etc.), keyboards, and the like.

Bus 4512 allows processor(s) 4502, memory device(s) 4504, interface(s) 4506, mass storage device(s) 4508, I/O device(s) 4510, and display device 4530 to communicate with one another, as well as other devices or components coupled to bus 4512. Bus 4512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 4500, and are executed by processor(s) 4502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices, 3GPP entities, computer cloud etc. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising:
one or more cameras each having a surface in its field of view;
an actuator, the actuator being a positional and rotational actuator;
an end effector coupled to the actuator; and
a computer system operably coupled to the one or more cameras, the actuator, and the end effector, the computer system programmed to:
receive one or more images from the one or more cameras;

when an object is represented in the one or more images, determine an object configuration category of the object:
    invoke positioning of the end effector by the actuator according to the object configuration category; and
    interact with the object using the end effector to move the object to a new position;
wherein the computer system is programmed to select from available options of:
1) when the object configuration category of the object belongs to a first subset of categories:
    calculate first grasping parameters according to only one or more two-dimensional (2D) bounding boxes determined from the one or more images and including the object without determining a three-dimensional (3D) bounding box for the object according to the one or more images; and
invoke positioning of the end effector by the actuator according to the first grasping parameters; and
2) when the object configuration category of the object belongs to a second subset of categories:
    calculate second grasping parameters according to a 3D bounding box for the object according to the one or more images; and
    invoke positioning of the end effector by the actuator according to the second grasping parameters.

2. The system of claim 1, wherein:
the first subset includes:
    (i) the object is upright on the surface;
    (ii) the object is lying on its side on the surface;
    (iii) the object is in a stack of vessels on the surface; and
    (iv) the object is one of a plurality of objects packed together on the surface; and
the second subset includes:
    (v) the object is not oriented according to any of (i), (ii), (iii), and (iv).

3. The system of claim 2, wherein the one or more images are one or more first images and the object configuration category is a first object configuration category, the computer system being further programmed to:
    when the first object configuration category of the object belongs to the second subset:
        (a) determine a righting operation according to the one or more 2D bounding boxes determined for the object according to the one or more first images; and
        (b) actuate the actuator and the end effector according to the righting operation;
        (c) after performing, (a) and (b):
            receive one or more second images from the one or more cameras;
            determine a second object configuration category of object according to the one or more second images;
            when the second object configuration category belongs to the first subset, calculate second grasping parameters according to one or more 2D bounding box determined from the one or more second images and including the object without determining a 3D bounding box for the object according to the one or more second images; and
            when the second object configuration category belongs to the second subset, calculate the second grasping parameters according to the 3D bounding box for the object according to the one or more second images; and
            invoke positioning of the end effector by the actuator according to the second grasping parameters.

4. The system of claim 3, wherein the computer system is further programmed to determine the righting operation by:
    identifying a gap under the object according to the one or more first images; and
    determining the righting operation as including:
        moving the end effector into the gap; and
        moving the end effector upwardly from the surface effective to urge the object toward an upright configuration.

5. The system of claim 2, wherein the computer system is further programmed to, when the object configuration category is (i):
    orient the end effector parallel to the surface;
    move the end effector parallel to the surface according to a location of the 2D bounding box such that the object is engaged with the end effector;
    actuate the actuator to move the object to a new position; and
    release the object from the end effector.

6. The system of claim 2, wherein the end effector is a gripper, the computer system being further programmed to:
    adjust a width of the gripper according to a width the 2D bounding box;
    orient the gripper parallel to the surface;
    move the gripper parallel to the surface according to a location of the 2D bounding box such that the object is positioned within the gripper;
    close the gripper around the object;
    actuate the actuator to move the object to a new position; and
    release the object from the gripper.

7. The system of claim 2, wherein the computer system is further programmed to, when the object configuration is (ii):
    orient the end effector perpendicular to the surface;
    lower the end effector perpendicular to the surface according to a location of the 2D bounding box such that the object is engaged with the end effector;
    actuate the actuator to move the object to a new position; and
    release the object from the end effector.

8. The system of claim 2, wherein the end effector is a gripper and the computer system is further programmed to, when the object configuration category is (ii):
    adjust a width of the gripper according to a width the 2D bounding box;
    orient the actuated gripper perpendicular to the surface and parallel to the width of the 2D bounding box;
    move the actuated gripper to a position above the object according to a position of the 2D bounding box;
    move the actuated gripper perpendicular to the surface such that the object is positioned within the gripper;
    close the actuated gripper around the object;
    actuate the actuator to move the object to the new position; and
    release the object from the actuated gripper.

9. The system of claim 2, wherein the computer system is further programmed to, when the object configuration category is (v):
    determine a three dimensional (3D) bounding box of the object from the one or more images;
    determine a six-dimensional (6D) pose of the 3D bounding box;
    orient the end effector according to the 6D pose;
    engage the end effector with the object;
    actuate the arm to move the object to a new position; and
    release the object from the end effector.

10. The system of claim 2, wherein the end effector is a gripper and the computer system is further programmed to, when the object configuration category is (v):
- determine a three dimensional (3D) bounding box of the object from the one or more images;
- determine a six dimensional (6D) pose corresponding to the 3D bounding box;
- determine a width associated with the 3D bounding box;
- adjust a width of the gripper according to the width associated with the 3D bounding box;
- orient the actuated gripper parallel to a face corresponding to the 3D bounding box according to the 6D pose;
- move the actuated gripper such that the object is positioned within the actuated gripper;
- close the actuated gripper around the object;
- actuate the actuator to move the object to the new position; and
- release the object from the gripper.

11. The system of claim 2, wherein the end effector is a first end effector and the system further comprises a second end effector; and
- wherein the computer system is programmed to, when the object configuration category is (iii):
  - perform edge detection on the one or more images to identify edges of the objects, the edges being unoccluded edges of the objects;
  - identify 2D bounding boxes of unoccluded portions of individual objects in the stack of objects according to the edges of the objects;
  - engage the first end effector with a top-most object of the stack of objects according to the 2D bounding box of the top-most vessel;
  - engage the second end effector with a second object in the stack of objects according to the 2D bounding box of the second vessel; and
  - actuate at least one of the first end effector and the actuator to remove the top-most object from the stack of objects.

12. The system of claim 2, wherein the end effector is a first end effector and the system further comprises a second end effector; and
- wherein the computer system is programmed to, when the object configuration category is (iii):
  - perform edge detection on the one or more images;
  - identify 3D bounding boxes of individual objects in the stack of objects having the object configuration category (iii) according to edges detected during edge detection;
  - engage the first end effector with a top-most object of the stack of objects having the object configuration category (iii) according to the 3D bounding box of the top-most vessel;
  - engage the second end effector with a second object in the stack of objects having the object configuration category (iii) according to the 3D bounding box of the second vessel; and
  - actuate at least one of the first end effector and the actuator to remove the top-most object from the stack of objects having the object configuration category (iii).

13. The system of claim 2, wherein the computer system is further programmed to, when the object configuration category is (iv):
- determine a first two-dimensional (2D) bounding box of the object, the object being a first object;
- determine a second 2D bounding box of a second object of the other objects;
- when the first 2D bounding box is within a threshold proximity to the second 2D bounding box, engage the end effector with at least one of the first object and the second object effective to increase separation between the first object and the second object.

14. The system of claim 13, wherein the computer system is further programmed to engage the first object and the second object effective to increase the separation between the first object and the second object by:
- (a) inserting the end effector into the first vessel and urging the first vessel away from the second vessel.

15. The system of claim 14, wherein the computer system is further programmed to repeat (a) with different pairs of vessels of the plurality of vessels as the first vessel and the second vessels, the vessels of the different pairs being within a threshold proximity of one another;
- continue repeating (a) until all vessels of the plurality of vessel are not within the threshold proximity of one another.

16. The system of claim 13, wherein the computer system is further programmed to engage the first object and the second object effective to increase the separation between the first object and the second object by:
- (a) identifying a first line connecting a centroid of the first 2D bounding box to a centroid of the second 2D bounding box; and
- (b) moving the end effector parallel to the surface along a second line substantially bisecting the first line and being substantially perpendicular to the first line.

17. The system of claim 16, wherein the computer system is further programmed to repeat (a) and (b) with different pairs of objects of the plurality of objects as the first object and the second object, the objects of the different pairs being within a threshold proximity of one another;
- continue repeating (a) and (b) until all objects of the plurality of objects are not within the threshold proximity of one another.

18. The system of claim 13, wherein:
- the end effector is a gripper including a first finger and a second finger;
- the plurality of objects are a plurality of vessels, the first object being a first vessel and the second object being a second vessel; and
- the computer system is further programmed to, engage the at least one of the first object and the second object effective to increase the separation between the first object and the second object by:
  - (a) inserting the first finger into the first vessel;
  - (b) inserting the second finger into the second vessel; and
  - (c) separating the first finger and the second finger effective to separate the first vessel from the second vessel.

19. The system of claim 18, wherein the computer system is further programmed to repeat (a), (b), and (c) with different pairs of vessels of the plurality of vessels as the first vessel and the second vessels, the vessels of the different pairs being within a threshold proximity of one another;
- continue repeating (a), (b), and (c) until all vessels of the plurality of vessel are not within the threshold proximity of one another.

20. The system of claim 2, wherein the computer system is further programmed to, when the object configuration category is (iv):
- determine 2D bounding boxes of the plurality of objects identify one or more unoccupied locations on the surface according to the one or more images;

select a selected object of the plurality of objects;
lower the end effector into engagement with the selected object; and
move the end effector to urge the selected object to one of the one or more unoccupied locations.

21. The system of claim 2, wherein the computer system is further programmed to, when the object configuration category is (iv):
determine 2D bounding boxes of the plurality of objects identify one or more unoccupied locations on the surface according to the one or more images;
select a selected object of the plurality of objects, the plurality of objects being a plurality of vessels;
insert the end effector into the selected object; and
move the end effector to urge the selected object to one of the one or more unoccupied locations.

22. The system of claim 2, wherein the computer system is further programmed to, when the object configuration category is any of (i), (ii), and (iv):
(a) determine that the 2D bounding box of the object is within threshold proximity to a boundary according to the one or more images;
in response to (a), engage the end effector with the object and urge the object away from the boundary.

23. The system of claim 1, wherein the one or more cameras comprise a plurality of statically mounted two-dimensional cameras and the computer system is calibrated to relate images from the two-dimensional cameras to a three-dimensional coordinate system and to position the end effector within the three-dimensional coordinate system.

24. The system of claim 1, wherein the one or more cameras comprise one or more cameras mounted to at least one of the end effector and the actuator.

25. The system of claim 1, wherein the computer system is programmed to determine the object configuration category of the object by processing the one or more images using one or more machine vision algorithms.

26. The system of claim 25, wherein the machine vision algorithm is a machine learning algorithm.

27. The system of claim 26, wherein the machine learning algorithm is a convolution neural network.

28. The system of claim 26, wherein the machine learning algorithm is an object detection network with one or more stages.

29. The system of claim 26, wherein in-the machine learning algorithm is a segmentation model.

30. The system of claim 29, wherein the segmentation model is one of a fully convolutional network, one or more staged convolutional neural network, and an encoder-decoder architecture based convolutional neural network that generates one of instance and class segmentation masks.

31. The system of claim 1, wherein the object is a vessel and the computer system is further programmed to:
identify an orientation of a handle of the vessel using one or more machine vision algorithms; and
when the orientation is unsuitable for grasping by the end effector, prior to engaging the vessel with the end effector, nudge the handle with the end effector effective to rotate the vessel such that the vessel is oriented suitably for lifting by the end effector.

32. The system of claim 31, wherein the machine vision algorithm is a machine learning algorithm.

33. The system of claim 32, wherein the machine learning algorithm is one of a classification model, object detection model, and object segmentation model.

34. The system of claim 33, wherein the classification model is a convolutional neural network; the object detection model is a one or more staged convolutional neural network; the segmentation model is one of a fully convolutional network, one or more staged convolutional neural network, and encoder-decoder architecture based convolutional neural network that generates one of instance and class segmentation masks.

35. The system of claim 1, wherein the object is a vessel and the computer system is further programmed to:
evaluate whether (a) the object is a vessel that contains contents according to one of the one or more images and one or more second images from the one or more cameras;
when (a) is true, lift the vessel with the end effector, transport the vessel over a disposal location, and invert the vessel with the end effector.

36. The system of claim 1, wherein the object is a vessel and the computer system is further programmed to
detect, according to the one or more images, (a) when the vessel is not graspable with the end effector oriented horizontally parallel to the surface; and
in response to (a):
insert the end effector vertically into the vessel;
raise the vessel to an intermediate platform;
release the vessel on the intermediate platform; and
engage the end effector with the vessel having the end effector oriented parallel to the platform.

37. The system of claim 1, wherein the object is a vessel and the computer system is further programmed to
detect, according to the one or more images, (a) when the vessel is not graspable without further manipulation; and
in response to (a):
insert the end effector vertically into the vessel;
raise the vessel to an intermediate platform;
release the vessel on the intermediate platform;
(b) manipulate the vessel on the intermediate platform; and
engage the end effector with the vessel having the end effector oriented parallel to the platform.

38. The system of claim 37, wherein the computer system is programmed to perform (b) by invoking rotation of the intermediate platform.

39. The system of claim 37, wherein the computer system is programmed to perform (b) by causing the intermediate platform to invert the vessel.

40. The system of claim 1, wherein the object is at least one of a vessel and a utensil and the computer system is further programmed to:
evaluate a polarity of the object according to one of the one or more images and one or more second images from the one or more cameras;
rotate the object according to the polarity using the end effector when the polarity is different from a desired polarity;
move the object over a racking area; and
deposit the object into a racking position in the racking area using the end effector.

* * * * *